US011370873B2

(12) United States Patent
Moctezuma Espiricueto et al.

(10) Patent No.: US 11,370,873 B2
(45) Date of Patent: Jun. 28, 2022

(54) COUNTER TAPERED THERMOPLASTIC ELASTOMERS

(71) Applicant: Dynasol Elastómeros, S.A. de C.V., Altamira (MX)

(72) Inventors: Sergio Alberto Moctezuma Espiricueto, Altamira (MX); Jesús Alberto Mexicano García, Madero (MX); Elisa Tierrablanca Maldonado, Madero (MX); Gabriel Hernández Zamora, Tampico (MX); Alejandro Claudio Esquivel de la Garza, Madero (MX)

(73) Assignee: Dynasol Elast¿meros, S.A. de C.V., Altamira (MX)

( * ) Notice: Subject to any disclaimer, the term of this patent is extended or adjusted under 35 U.S.C. 154(b) by 39 days.

(21) Appl. No.: 15/417,193

(22) Filed: Jan. 26, 2017

(65) Prior Publication Data

US 2017/0210841 A1  Jul. 27, 2017

Related U.S. Application Data

(60) Provisional application No. 62/286,974, filed on Jan. 26, 2016.

(51) Int. Cl.
| | | |
|---|---|---|
| C08C 19/44 | (2006.01) | |
| C08F 297/04 | (2006.01) | |
| C09J 123/22 | (2006.01) | |
| C08L 95/00 | (2006.01) | |
| C09J 153/02 | (2006.01) | |

(52) U.S. Cl.
CPC .......... *C08F 297/044* (2013.01); *C08C 19/44* (2013.01); *C08L 95/005* (2013.01); *C09J 123/22* (2013.01); *C09J 153/02* (2013.01); C08L 2207/04 (2013.01); C08L 2555/84 (2013.01)

(58) Field of Classification Search
CPC ........ C08L 53/00; C08L 53/02; C08L 95/005; C08L 95/00; C08L 9/06; C08F 297/004; C08F 297/04; C08C 19/44; C09J 123/22; C09J 153/02; C09D 153/02
See application file for complete search history.

(56) References Cited

U.S. PATENT DOCUMENTS

| | | | |
|---|---|---|---|
| 3,265,765 A | 8/1966 | Holden et al. | |
| 4,073,831 A | 2/1978 | Tabana et al. | |
| 4,086,298 A | 4/1978 | Fahrbach et al. | |
| 4,152,370 A * | 5/1979 | Moczygemba | C08F 297/046 525/314 |
| 4,208,356 A | 6/1980 | Fukawa et al. | |
| 4,248,984 A * | 2/1981 | Bi | C08G 81/022 525/314 |
| 4,402,844 A | 9/1983 | Trepka | |
| 4,939,207 A | 7/1990 | Fasulo et al. | |
| 5,100,938 A * | 3/1992 | Vitkuske | C08L 95/005 524/60 |
| 5,250,618 A * | 10/1993 | Fasulo | C08L 23/02 525/89 |
| 5,545,690 A | 8/1996 | Trepka et al. | |
| 5,605,946 A * | 2/1997 | Planche | C08L 95/00 524/68 |
| 5,614,579 A * | 3/1997 | Roggeman | C08F 297/04 524/457 |

(Continued)

FOREIGN PATENT DOCUMENTS

| | | |
|---|---|---|
| EP | 0646607 A2 | 4/1995 |
| EP | 2848650 A1 | 3/2015 |

(Continued)

OTHER PUBLICATIONS

International Search Report and Written Opinion dated May 25, 2017 for corresponding International Application No. PCT/IB2017/00117.

*Primary Examiner* — Peter D. Mulcahy
(74) *Attorney, Agent, or Firm* — Stephen S. Hodgson

(57) ABSTRACT

A counter tapered thermoplastic elastomer composition comprising: (a) a counter tapered diblock A-[A/B] copolymer with a peak molecular weight from 20,000 to 250,000, which includes a monovinyl aromatic homopolymer block A with a peak molecular weight of at least 8,000 and a counter tapered copolymer block [A/B] with a vinyl content of at least 15 weight percent based on the amount of conjugated diene units in the diblock copolymer; and (b) a block copolymer selected from the group consisting of linear triblock copolymers having a peak molecular weight that is at least about 1.5 times the peak molecular weight of the counter tapered diblock A-[A/B] copolymer described in (a), multiarm coupled block copolymers having a peak molecular weight that is at least about 2.5 times the peak molecular weight of the counter tapered diblock A-[A/B] copolymer described in (a), and mixtures thereof; and (c) wherein the ratio of (a) to (b) in the counter tapered thermoplastic elastomer composition is from about 1:5 to about 5:1. The counter tapered thermoplastic elastomer compositions provide in the applications: i) easy processing such as short dispersion time, low mixing temperature, low viscosity, excellent storage stability; and ii) better reinforcement such as high elastic response, wide range of performance grade, high adherence, higher filler loading capacity, and better compromise between high and low temperature properties; which make them suitable for a broad range of applications such as road paving, roofing, shingles, waterproofing membranes, adhesive tapes and labels, contact and sprayable adhesives, and sealants.

70 Claims, 4 Drawing Sheets

(56) References Cited

U.S. PATENT DOCUMENTS

| | | |
|---|---|---|
| 5,910,546 A | 6/1999 | Trepka et al. |
| 6,221,968 B1 | 4/2001 | Atwood et al. |
| 6,759,454 B2 | 7/2004 | Stephens et al. |
| 7,138,456 B2 | 11/2006 | Bening et al. |
| 7,169,848 B2 | 1/2007 | Bening et al. |
| 7,244,785 B2 | 7/2007 | Bening et al. |
| 7,772,322 B2 | 8/2010 | Kosaka et al. |
| 8,222,346 B2 | 7/2012 | Cao et al. |
| 8,569,422 B2 | 10/2013 | Shan et al. |
| 2003/0176574 A1 | 9/2003 | St. Clair et al. |
| 2003/0176582 A1 | 9/2003 | Bening et al. |
| 2007/0225427 A1 | 9/2007 | Wright et al. |

FOREIGN PATENT DOCUMENTS

| | | |
|---|---|---|
| JP | 2008106149 A | 5/2008 |
| WO | WO 2005123834 A1 | 12/2005 |

\* cited by examiner

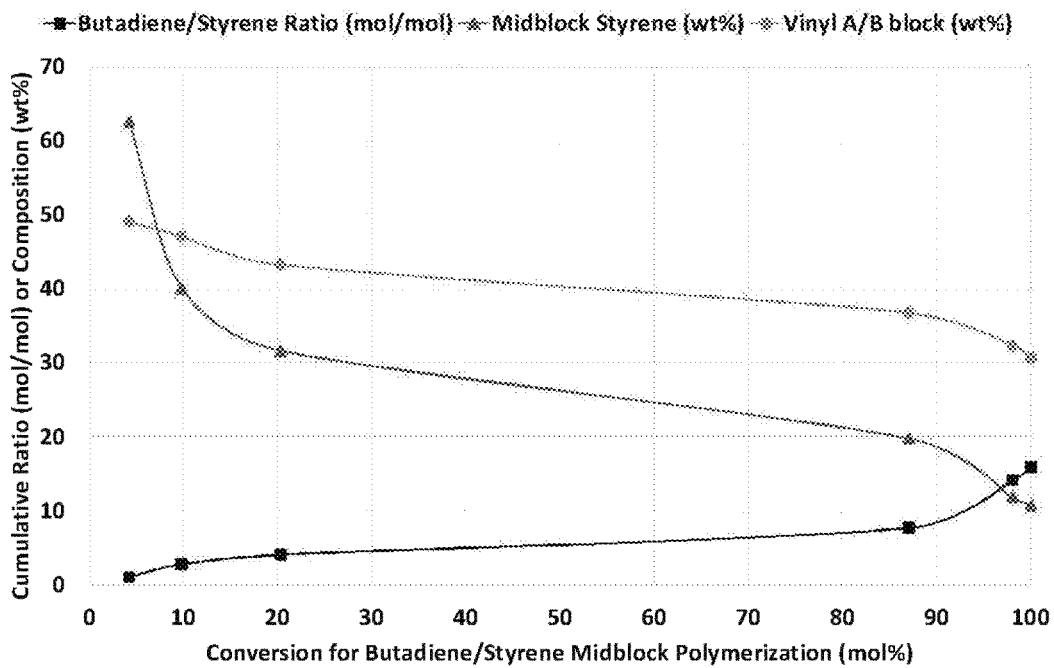
Figure 1. Monomer Distribution in [A/B] Midblock of (A-[A/B])n Counter Tapered Thermoplastic Elastomer CTTE 14.
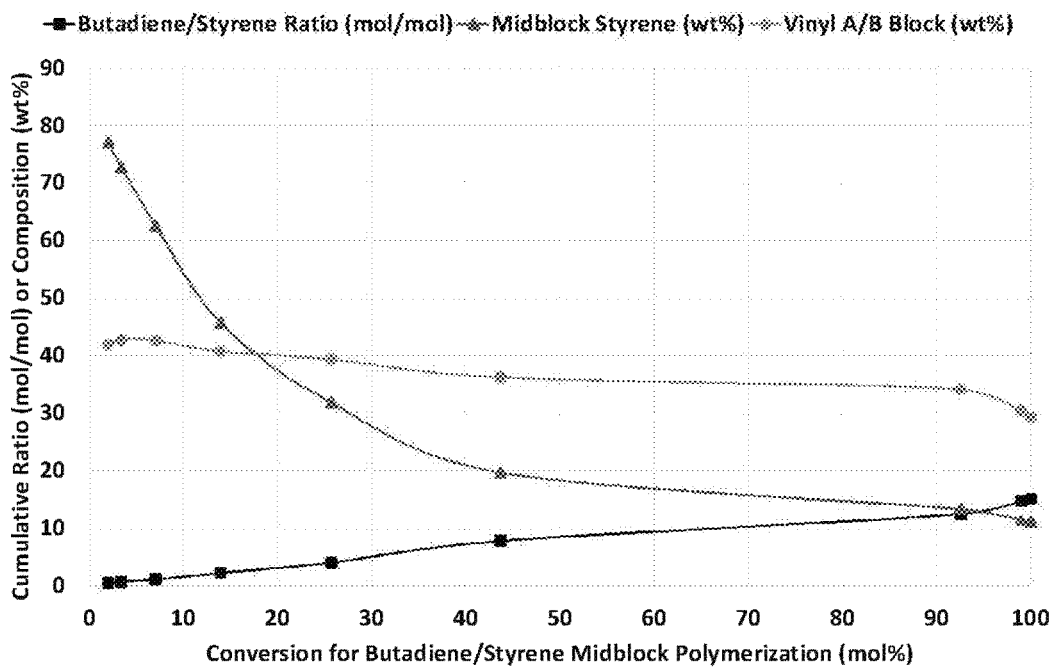
Figure 2. Monomer Distribution in [A/B] Midblock of Counter Tapered Thermoplastic Elastomer CTTE 16.

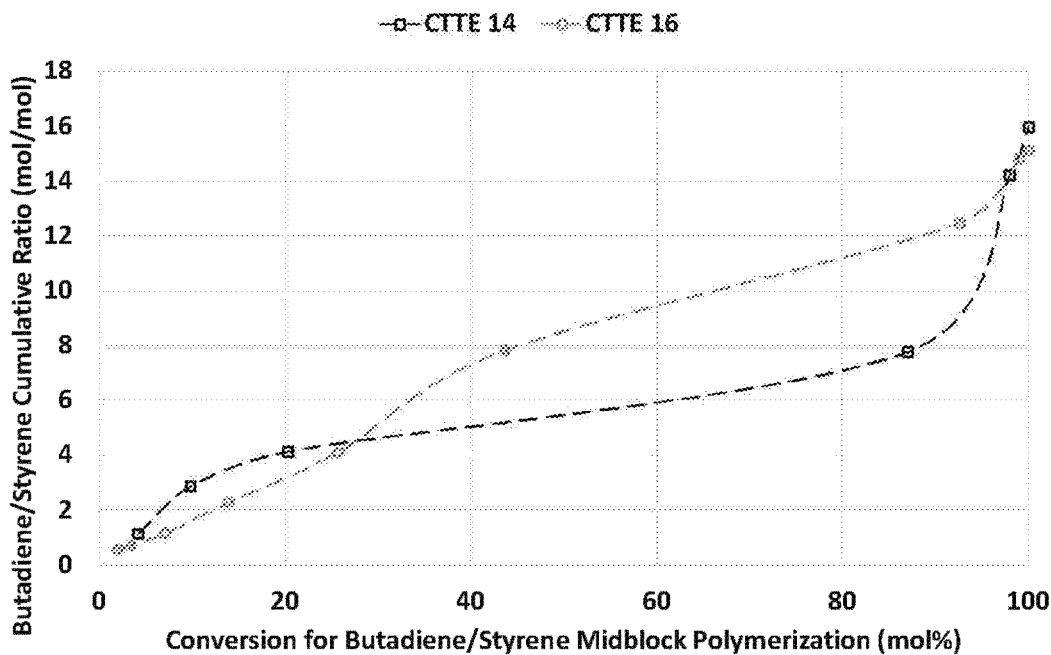
Figure 3. Monomer Distribution in [A/B] Midblock of Inventive Counter Tapered Thermoplastic Elastomers.
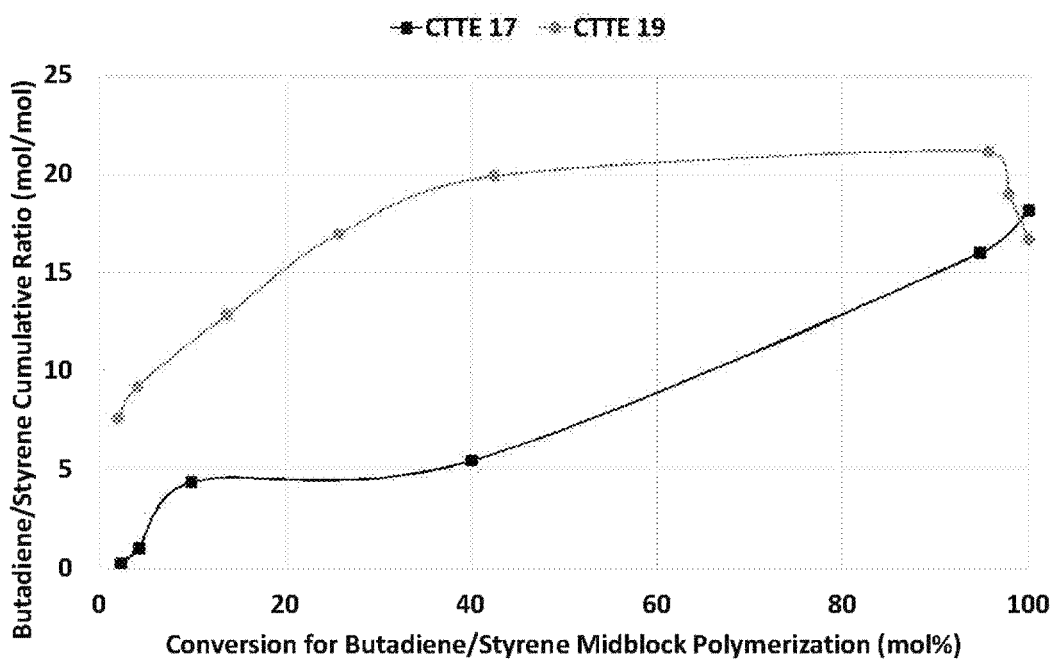
Figure 4. Monomer Distribution in [A/B] Midblock of Inventive Counter Tapered Thermoplastic Elastomers.

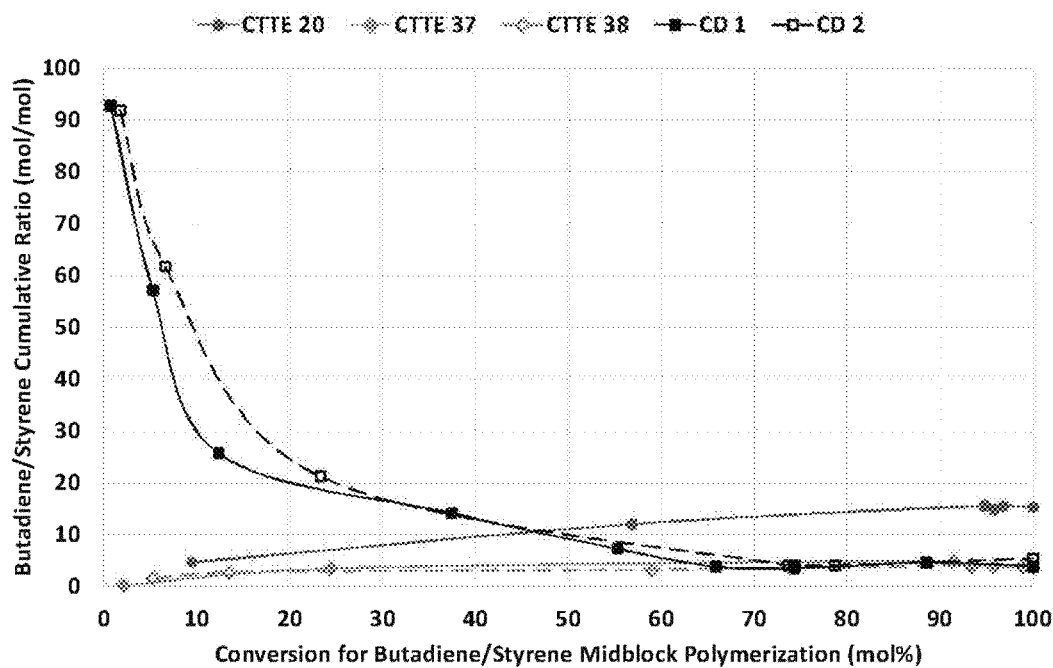
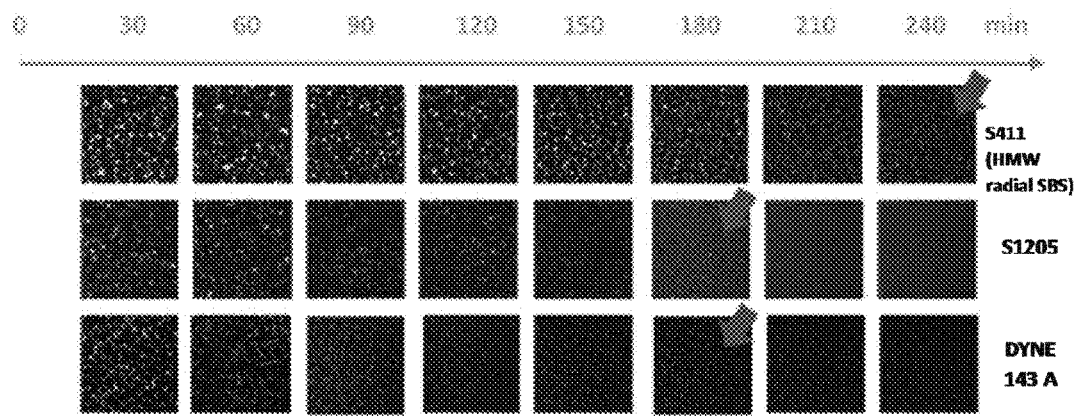
FIGURE 6

COUNTER TAPERED THERMOPLASTIC ELASTOMERS

CROSS-REFERENCE TO RELATED APPLICATION

This application claims priority to and the benefit of U.S. Provisional Patent Application Ser. No. 62/286,974 filed on Jan. 26, 2016, which is incorporated by reference.

BACKGROUND OF INVENTION

1. Field of the Invention

The invention relates to counter tapered thermoplastic elastomers, reinforced materials containing the polymers, and articles made from the reinforced materials.

2. Description of the Related Art

Anionic polymerization is a well-known technique for manufacturing elastomers. Commercial polymers commonly made through the anionic polymerization process include elastomers such as polybutadiene, polyisoprene and styrene-diene rubbers, and thermoplastic elastomers such as block copolymers of styrene, butadiene and/or isoprene with varying sizes and numbers of blocks.

Among the polymers prepared by anionic polymerization, commercially available styrene-diene rubbers such as tapered diblock copolymers of conjugated diene and monovinyl aromatic monomers have been of long-lasting commercial importance due to its processability performance in many applications and its unique properties. Special processing characteristics such as high extrudability and excellent flow combined with mechanical properties such as high hardness, low shrinkage and high abrasion resistance, have been a desirable polymer properties balance for many high-productivity applications. Also, commercially available thermoplastic elastomers such as triblock copolymers of styrene, butadiene and/or isoprene with varying macro- and microstructure (SBn, SBS, SIS, SIBS, etc.) have been widely used due to its reinforcement performance in many applications and its thermoplastic behavior.

The polymers prepared by anionic polymerization may be useful in their own right as elastomers for tires and other industries, adhesives, sealants and coatings. In addition, polymers prepared by anionic polymerization may be used to modify the characteristics of various materials such as asphalt, plastics and rubbers. For example, the polymers prepared by anionic polymerization may be used as compatibilizers and reinforcing agents in asphalt. However, many styrene/butadiene-based polymers prepared by anionic polymerization are insufficiently compatible and have met with limited success in the reinforcement of asphalt for paving and roofing applications. Although styrene/butadiene-based polymers, both linear and non-linear, are widely used in reinforcing asphalt, problems related to the dispersibility of the polymers prepared by anionic polymerization in the asphalt formulations and to the morphology stability of the resulting polymer modified asphalt blends ultimately have a negative effect on the storage and long-term performance of the modified asphalt such as performance grade PG for road paving, and high and low temperature properties for roofing applications. Similar problems have arisen where anionically polymerized polymers are used in the pressure and non-pressure sensitive hot melt and solvent based adhesives for tapes and labels, contact and sprayable applications.

The polymers prepared by anionic polymerization may be modified in order to improve their characteristics for their intended applications. Many modification routes have been developed over the years. The most common modifications routes include: molecular weight; molecular weight distribution; monomer composition; diene microstructure; monomer sequence length distribution; stereochemistry; monomer addition order and sequencing; chain coupling through reactions of multifunctional species with living anions to synthesize polymers with linear, radial, comb, arm-like, branched or hyper-branched structures; and combinations of the above modifications. More sophisticated modifications routes include: introducing chemical functionalities through end-capping reactions or functional initiators; polymerization with multifunctional initiators to directly synthesize polymers with linear, radial, comb, arm-like, branched or hyper-branched structures; hydrogenation of residual double bonds; and combinations of the above modifications.

However, it is still highly desirable to combine the unique processing properties of tapered diblock copolymers with the thermoplastic behavior of triblock copolymers in such a way as to improve on the balance between processability and reinforcement performance in many applications. It is desirable to further develop elastomer compositions and find a route by anionic polymerization to prepare those compositions in order to combine the best properties of the above commercially available polymers, which has typically been a compromise among polymer characteristics. Thus, it would be desirable to develop a method for preparing polymers by anionic polymerization to produce elastomer compositions that are more processable, dispersible and compatible with a wide variety of materials and other substrates, including asphalt, adhesive and sealant ingredients, and suitable to meet the reinforcement requirements for a broad range of applications such as road paving, roofing, shingles, waterproofing membranes, adhesive tapes and labels, contact and sprayable adhesives, and sealants.

It has now surprisingly been found a novel counter tapered thermoplastic elastomer composition that achieves a better balance between processability and reinforcement performance for various asphalt, adhesive and sealant applications. The novel counter tapered thermoplastic elastomer compositions provide the above mentioned applications with easy processing advantages such as short dispersion time, higher compatibility, low mixing temperature, low viscosity, excellent storage stability, and better reinforcement advantages such as high elastic response, wide range of performance grade, high adherence, higher filler loading capacity, excellent cohesive strength and shear resistance, and better compromise between high and low temperature properties.

SUMMARY OF THE INVENTION

The present invention provides counter tapered thermoplastic elastomer compositions, methods for producing the polymers, polymer blends and mixtures containing the polymers, reinforced materials containing the polymers and articles made from the reinforced materials.

One aspect of the invention provides novel counter tapered thermoplastic elastomer compositions made of conjugated diene monomers (B) and monovinyl aromatic monomers (A). The novel counter tapered thermoplastic elastomer compositions are characterized in having: (a) a counter tapered diblock A-[A/B] copolymer; (b) a block copolymer selected from the group consisting of linear triblock copolymers, multiarm coupled block copolymers, and mixtures thereof; and (c) wherein the ratio of (a) to (b) in the counter tapered thermoplastic elastomer composition is from about 1:5 to about 5:1. The novel counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, higher compatibility, low mixing temperature, low viscosity, excellent storage stability, and better reinforcement advantages such as high elastic response, wide range of performance grade, high adherence, higher filler loading capacity, excellent cohesive strength and shear resistance, and better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

The novel counter tapered thermoplastic elastomer compositions according to the present invention comprising:

(a) a counter tapered diblock A-[A/B] copolymer comprising at least one conjugated diene monomer and at least one monovinyl aromatic monomer, said diblock copolymer being further characterized in having: a peak molecular weight from 20,000 to 250,000; a monovinyl aromatic homopolymer block A with a peak molecular weight of at least 8,000; and a counter tapered copolymer block [A/B] with a vinyl content of at least 15 weight percent based on the amount of conjugated diene units in the diblock copolymer; and (b) a block copolymer comprising at least one conjugated diene monomer and at least one monovinyl aromatic monomer, said block copolymer being further characterized in having: at least two homopolymer blocks of monovinyl aromatic monomer and at least one copolymer block of monovinyl aromatic monomer and conjugated diene monomer; wherein the block copolymer is selected from the group consisting of linear triblock copolymers having a peak molecular weight that is at least about 1.5 times the peak molecular weight of the counter tapered diblock copolymer described in (a), multiarm coupled block copolymers having a peak molecular weight that is at least about 2.5 times the peak molecular weight of the counter tapered diblock copolymer described in (a), and mixtures thereof; wherein each block copolymer has monovinyl aromatic homopolymer blocks A with a peak molecular weight of at least 8,000, and counter tapered copolymer blocks [A/B] with a vinyl content of at least 15 weight percent based on the amount of conjugated diene units in the block copolymer; and (c) wherein the ratio of (a) to (b) in the counter tapered thermoplastic elastomer composition is from about 1:5 to about 5:1.

The novel counter tapered thermoplastic elastomer compositions according to the present invention are characterized by:

(a) the weight average molecular weight of the counter tapered thermoplastic elastomer composition is from about 30,000 to about 500,000 g/mol;

(b) the total amount of monovinyl aromatic monomer in the counter tapered thermoplastic elastomer composition is from about 10 percent weight to about 55 percent weight; and (c) the total vinyl configuration content is from about 15 percent weight to about 90 percent weight based on the total amount of conjugated diene in the counter tapered thermoplastic elastomer composition.

Another aspect of the present invention provides a process for making a counter tapered thermoplastic elastomer composition comprising: reacting at least one conjugated diene monomer and at least one monovinyl aromatic monomer under anionic polymerization conditions in the presence of a suitable polar modifier or combination of polar modifiers; and forming the composition of the present invention comprising:

(a) a counter tapered diblock A-[A/B] copolymer comprising at least one conjugated diene monomer and at least one monovinyl aromatic monomer, said diblock copolymer being further characterized in having: a peak molecular weight from 20,000 to 250,000; a monovinyl aromatic homopolymer block A with a peak molecular weight of at least 8,000; and a counter tapered copolymer block [A/B] with a vinyl content of at least 15 weight percent based on the amount of conjugated diene units in the diblock copolymer; and (b) a block copolymer comprising at least one conjugated diene monomer and at least one monovinyl aromatic monomer, said block copolymer being further characterized in having: at least two homopolymer blocks of monovinyl aromatic monomer and at least one copolymer block of monovinyl aromatic monomer and conjugated diene monomer; wherein the block copolymer is selected from the group consisting of linear triblock copolymers having a peak molecular weight that is at least about 1.5 times the peak molecular weight of the counter tapered diblock copolymer described in (a), multiarm coupled block copolymers having a peak molecular weight that is at least about 2.5 times the peak molecular weight of the counter tapered diblock copolymer described in (a), and mixtures thereof; wherein each block copolymer has monovinyl aromatic homopolymer blocks A with a peak molecular weight of at least 8,000, and counter tapered copolymer blocks [A/B] with a vinyl content of at least 15 weight percent based on the amount of conjugated diene units in the block copolymer; and (c) wherein the ratio of (a) to (b) in the counter tapered thermoplastic elastomer composition is from about 1:5 to about 5:1.

An additional embodiment of the present invention is a process for making a counter tapered thermoplastic elastomer composition comprising: adding a solvent, a polar modifier or combination of polar modifiers, and monovinyl aromatic monomer to a reactor to form an initial reaction mixture, wherein the amount of the polar modifier in the initial reaction mixture is less than 10 wt %; adding an organolithium initiator compound to the reactor and anionically polymerizing the monomer to form the monovinyl aromatic homopolymer block A with a peak molecular weight of at least 8,000; adding additional monovinyl aromatic monomer and simultaneously begin the dosification to the reactor of conjugated diene monomer at a predetermined dose rate for a predetermined time, and copolymerizing to form the counter tapered copolymer block [A/B] with a vinyl content of at least 15 weight percent based on the amount of conjugated diene units in the diblock copolymer, and obtain the counter tapered diblock A-[A/B] copolymer with a peak molecular weight from 20,000 to 250,000; and adding a coupling agent or combination of coupling agents to partially couple the counter tapered diblock A-[A/B] copolymer to form the block copolymer that is either a linear triblock copolymer, a multiarm coupled block copolymer, or mixtures thereof; wherein the solvent, the polar modifier, the conjugated diene monomer and the monovinyl aromatic monomers comprise a total reaction mixture, wherein the amount of the polar modifier is less than 5 wt % of the total reaction mixture, wherein the peak molecular weight of the linear triblock copolymer is at least about 1.5 times the peak molecular weight of the counter tapered diblock A-[A/B] copolymer, wherein the peak molecular weight of the multiarm coupled block copolymer is at least about 2.5 times the peak molecular weight of the counter tapered diblock A-[A/B] copolymer, and wherein the ratio of the counter tapered diblock A-[A/B] copolymer to the block copolymer is from about 1:5 to about 5:1 in the counter tapered thermoplastic elastomer composition.

Other aspects of the invention provide compositions and articles made from the novel counter tapered thermoplastic elastomer composition, reinforced materials made from a mixture of the novel counter tapered thermoplastic elastomer composition with a material to be reinforced and articles made from the reinforced materials. Other aspects of the invention provide novel counter tapered thermoplastic elastomer composition, and their blends with other block copolymers, with enhanced adhesion to specific substrates and articles made from the adhesion enhanced materials. The novel counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, higher compatibility, low mixing temperature, low viscosity, excellent storage stability, and better reinforcement advantages such as high elastic response, wide range of performance grade, high adherence, higher filler loading capacity, excellent cohesive strength and shear resistance, and better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

BRIEF DESCRIPTION OF THE DRAWINGS

FIG. 1 depicts the Monomer Distribution in [A/B] Midblock of (A-[A/B])n Counter Tapered Thermoplastic Elastomer CTTE 14.

FIG. 2 depicts the Monomer Distribution in [A/B] Midblock of Counter Tapered Thermoplastic Elastomer CTTE 16.

FIG. 3 depicts the Monomer Distribution in [A/B] Midblock of Inventive Counter Tapered Thermoplastic Elastomers CTTE 14 vs. CTTE 16.

FIG. 4 depicts the Monomer Distribution in [A/B] Midblock of Inventive Counter Tapered Thermoplastic Elastomers CTTE 17 vs. CTTE 19.

FIG. 5 depicts the Monomer Distribution in Inventive [A/B] Midblock of CTTE 20, 37 and 38 vs. Comparative [B/A] Controlled Distribution Midblock Examples of CD 1 and CD 2.

FIG. 6 depicts the 20× fluorescence microscopy images of several polymer modified asphalt (PMA) monitored throughout the mixing process at 190° C. and prepared with 2.3 wt % of polymer. Each arrow points at the image corresponding to the mixing time when complete polymer dispersion is observed for various PMA mixtures. The dispersion performance of CTTE prototype Dyne 143A in PMA is compared with PMA mixtures of commercially available polymers and described in Example 7.

DETAILED DESCRIPTION OF THE PREFERRED EMBODIMENTS

Figure 7:
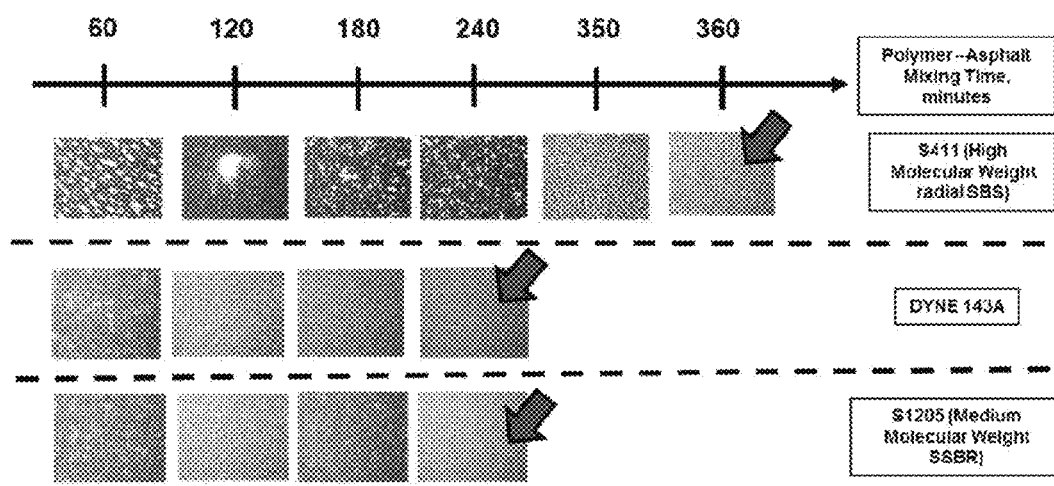
FIG. 7 depicts the 20× fluorescence microscopy images of several polymer modified asphalt (PMA) monitored throughout the mixing process at 190° C. and prepared with 6 wt % of polymer. Each arrow points at the image corresponding to the mixing time when complete polymer dispersion is observed for various PMA mixtures. The dispersion performance of CTTE prototype Dyne 143A in PMA is compared with PMA mixtures of commercially available polymers and described in Example 7.

The present invention provides counter tapered thermoplastic elastomer compositions, methods for producing the polymers, polymer blends and mixtures containing the polymers, reinforced materials containing the polymers and articles made from the reinforced materials.

One aspect of the invention provides novel counter tapered thermoplastic elastomer compositions made of conjugated diene monomers (B) and monovinyl aromatic monomers (A). The novel counter tapered thermoplastic elastomer compositions are characterized in having: (a) a counter tapered diblock A-[A/B] copolymer; (b) a block copolymer selected from the group consisting of linear triblock copolymers, multiarm coupled block copolymers, and mixtures thereof; and (c) wherein the ratio of (a) to (b) in the counter tapered thermoplastic elastomer composition is from about 1:5 to about 5:1. The novel counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, low mixing temperature, low viscosity, excellent storage stability, and better reinforcement advantages such as high elastic response, wide range of performance grade, high adherence, higher filler loading capacity, and better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

The novel counter tapered thermoplastic elastomer compositions according to the present invention comprising:

(a) a counter tapered diblock A-[A/B] copolymer comprising at least one conjugated diene monomer and at least one monovinyl aromatic monomer, said diblock copolymer being further characterized in having: a peak molecular weight from 20,000 to 250,000; a monovinyl aromatic homopolymer block A with a peak molecular weight of at least 8,000; and a counter tapered copolymer block [A/B] with a vinyl content of at least 15 weight percent based on the amount of conjugated diene units in the diblock copolymer; and (b) a block copolymer comprising at least one conjugated diene monomer and at least one monovinyl aromatic monomer, said block copolymer being further characterized in having: at least two homopolymer blocks of monovinyl aromatic monomer and at least one copolymer block of monovinyl aromatic monomer and conjugated diene monomer; wherein the block copolymer is selected from the group consisting of linear triblock copolymers having a peak molecular weight that is at least about 1.5 times the peak molecular weight of the counter tapered diblock copolymer described in (a), multiarm coupled block copolymers having a peak molecular weight that is at least about 2.5 times the peak molecular weight of the counter tapered diblock copolymer described in (a), and mixtures thereof; wherein each block copolymer has monovinyl aromatic homopolymer blocks A with a peak molecular weight of at least 8,000, and counter tapered copolymer blocks [A/B] with a vinyl content of at least 15 weight percent based on the amount of conjugated diene units in the block copolymer; and (c) wherein the ratio of (a) to (b) in the counter tapered thermoplastic elastomer composition is from about 1:5 to about 5:1.

The novel counter tapered thermoplastic elastomer compositions according to the present invention are characterized by:

(a) the weight average molecular weight of the counter tapered thermoplastic elastomer composition is from about 30,000 to about 500,000 g/mol;

(b) the total amount of monovinyl aromatic monomer in the counter tapered thermoplastic elastomer composition is from about 10 percent weight to about 55 percent weight; and (c) the total vinyl configuration content is from about 15 percent weight to about 90 percent weight based on the total amount of conjugated diene in the counter tapered thermoplastic elastomer composition.

Polymers prepared by anionic polymerization include thermoplastic, elastomeric, and thermoplastic-elastomeric polymers. The polymers may be homopolymers or copolymers, including tapered, random and block copolymers. Among the block copolymers prepared by anionic polymerization, tapered diblock copolymers of conjugated diene and monovinyl aromatic monomers have been of long-lasting commercial importance due to its performance in many applications and its unique properties. Special processing characteristics such as high extrudability and excellent flow combined with mechanical properties such as high hardness, low shrinkage and high abrasion resistance, have been a desirable polymer properties balance for many high-productivity applications. Also, commercially available thermoplastic elastomers such as triblock copolymers of styrene, butadiene and/or isoprene with varying macro- and microstructure (SBn, SBS, SIS, SIBS, etc.) have been widely used due to its reinforcement performance in many applications and its thermoplastic behavior. However, it is still highly desirable to combine the unique processing properties of tapered diblock copolymers with the thermoplastic behavior of triblock copolymers in such a way as to improve on the balance between processability and reinforcement performance in many applications.

Alkyllithium-initiated copolymerization of conjugated diene and monovinyl aromatic monomers in hydrocarbon solvents, in the absence of polar additives, yields an interesting type of structure with compositional heterogeneity along the copolymer chain, which is commonly known as tapered, gradual or gradient diblock copolymer structure. Relatively large differences between monomer reactivity ratios (i.e., $r_1>10$ and $r_2<0.1$) are observed despite the similar stabilities of the carbanionic chain ends corresponding to the conjugated diene (1) and monovinyl aromatic (2) monomers. Contrary to the observed faster homopolymerization of monovinyl aromatic monomers relative to conjugated diene monomers, in the initial stage of copolymerization the less reactive conjugated diene monomer is preferentially incorporated into the copolymer chain until it is nearly exhausted, forming a diene-rich, tapered block B with gradual change in composition, and then in the final stage most of the monovinyl aromatic monomer forms a terminal polystyrene block A.

B-(B/A)-A

Furthermore, during copolymerization in hydrocarbon solvents and in the absence of polar additives, a distinct intermediate stage occurs that forms a small, sharp and steep interphase -(B/A)- with sudden change in composition, which acts as a transition within the copolymer chain between two large A and B blocks. Lower melt viscosities of tapered diblock copolymers relative to pure diblock copolymers, with the same composition and molecular weight, are ascribed to the presence of this small interphase, which weakens the intrachain and interchain repulsion and enhances mixing between dissimilar adjacent blocks. Since alkyllithium-initiated copolymerization of conjugated diene and monovinyl aromatic monomers under the above conditions behaves statistically with a tendency toward random placement of the monomeric units (i.e., $r_1r_2 \sim 0.5$) mainly due to the large difference in monomer reactivity ratios, both the block B and the interphase -(B/A)- have a compositional drift along the copolymer chain that is directly dependent on the instantaneous relative monomer concentration. Therefore, the initial relatively small concentration of monovinyl aromatic monomer is incorporated into the diene-rich, tapered block B almost randomly and predominantly as isolated aromatic units. On the contrary, the intermediate relatively large concentration of monovinyl aromatic monomer is incorporated into the small, sharp and steep interphase -(B/A)- statistically and predominantly as long aromatic sequences that should rapidly become aromatic-rich segments with residual isolated diene units.

Copolymerization of conjugated diene and monovinyl aromatic monomers with alkyllithium in the absence of polar additives typically results in tapered diblock copolymers with low vinyl configuration content (1,2-diene microstructure). Polar additives simultaneously act as randomizing agents and microstructure modifiers during the copolymerization of conjugated diene and monovinyl aromatic monomers with alkyllithium initiators. The relatively large differences between monomer reactivity ratios decrease with increasing polar additive concentration, which gradually changes the copolymerization behavior from statistical to random, and transform the monomer sequence length distribution from tapered diblock to random diblock and then to a completely random copolymer structure. This randomization effect is typically accompanied by a corresponding modification effect that increases the vinyl configuration content. Although both effects are directly dependent on polar additive concentration, and moreover the modification effect is counterly dependent on polymerization temperature, the extent and specific behavior of each effect is particularly dependent on polar additive type and specific properties. It is possible to combine polar additives to overcome some handicaps and obtain synergistic or desired differentiated effects on monomer sequence length distribution and/or 1,2-diene microstructure.

By controlling the monomer addition order, polymerization sequence, feed rate, and feed composition; the polar additives combination, type, concentration, addition order and feed rate; the polymerization temperature behavior and conditions; and the relative block sizes and molecular weights, the design of the novel counter tapered thermoplastic elastomer compositions can be tailored to include the characteristics and features according to the present invention, i.e., (a) a counter tapered diblock A-[A/B] copolymer; (b) a block copolymer selected from the group consisting of linear triblock copolymers, multiarm coupled block copolymers, and mixtures thereof; and (c) wherein the ratio of (a) to (b) in the counter tapered thermoplastic elastomer composition is from about 1:5 to about 5:1. These design characteristics are suitable qualities to achieve the desired application overall performance in blends with a wide variety of materials and other substrates, including asphalt, adhesive and sealant ingredients, rubber and plastic. The desired application overall performance is a balance between maximized processing properties such as low melt viscosity, high dispersibility, high compatibility, high miscibility and/or high adhesion, and good elastomeric and thermoplastic properties. Particular applications for which the novel counter tapered thermoplastic elastomer compositions of the present invention are well suited include asphalt reinforcers, modifiers and morphology stabilizers. Other suitable applications include use as compatibilizers, viscosity modifiers, flow modifiers, process aids, rheology control agents, and impact modifiers for plastics and plastics blends and alloys, and composites. The novel counter tapered thermoplastic elastomer compositions may also be designed with tailored characteristics to provide highly processible adhesives with optimal adhesion to polar substrates, useful in typical adhesive and sealant applications. The novel counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, low mixing temperature, low viscosity, excellent storage stability, and better reinforcement advantages such as high elastic response, wide range of performance grade, high adherence, higher filler loading capacity, and better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

Another aspect of the present invention provides a process for making a counter tapered thermoplastic elastomer composition comprising: reacting at least one conjugated diene monomer and at least one monovinyl aromatic monomer under anionic polymerization conditions in the presence of a suitable polar modifier or combination of polar modifiers; and forming the composition of the present invention comprising:
  (a) a counter tapered diblock A-[A/B] copolymer comprising at least one conjugated diene monomer and at least one monovinyl aromatic monomer, said diblock copolymer being further characterized in having: a peak molecular weight from 20,000 to 250,000; a monovinyl aromatic homopolymer block A with a peak molecular weight of at least 8,000; and a counter tapered copolymer block [A/B] with a vinyl content of at least 15 weight percent based on the amount of conjugated diene units in the diblock copolymer; and
  (b) a block copolymer comprising at least one conjugated diene monomer and at least one monovinyl aromatic monomer, said block copolymer being further characterized in having: at least two homopolymer blocks of monovinyl aromatic monomer and at least one copolymer block of monovinyl aromatic monomer and conjugated diene monomer; wherein the block copolymer is selected from the group consisting of linear triblock copolymers having a peak molecular weight that is at least about 1.5 times the peak molecular weight of the counter tapered diblock copolymer described in (a), multiarm coupled block copolymers having a peak molecular weight that is at least about 2.5 times the peak molecular weight of the counter tapered diblock copolymer described in (a), and mixtures thereof; wherein each block copolymer has monovinyl aromatic homopolymer blocks A with a peak molecular weight of at least 8,000, and counter tapered copolymer blocks [A/B] with a vinyl content of at least 15 weight percent based on the amount of conjugated diene units in the block copolymer; and
  (c) wherein the ratio of (a) to (b) in the counter tapered thermoplastic elastomer composition is from about 1:5 to about 5:1.

An additional embodiment of the present invention is a process for making a counter tapered thermoplastic elastomer composition comprising: adding a solvent, a polar modifier or combination of polar modifiers, and monovinyl aromatic monomer to a reactor to form an initial reaction mixture, wherein the amount of the polar modifier in the initial reaction mixture is less than 10 wt %; adding an organolithium initiator compound to the reactor and anionically polymerizing the monomer to form the monovinyl aromatic homopolymer block A with a peak molecular weight of at least 8,000; adding additional monovinyl aromatic monomer and simultaneously begin the dosification to the reactor of conjugated diene monomer at a predetermined dose rate for a predetermined time, and copolymerizing to form the counter tapered copolymer block [A/B] with a vinyl content of at least 15 weight percent based on the amount of conjugated diene units in the diblock copolymer, and obtain the counter tapered diblock A-[A/B] copolymer with a peak molecular weight from 20,000 to 250,000; and adding a coupling agent or combination of coupling agents to partially couple the counter tapered diblock A-[A/B] copolymer to form the block copolymer that is either a linear triblock copolymer, a multiarm coupled block copolymer, or mixtures thereof; wherein the solvent, the polar modifier, the conjugated diene monomer and the monovinyl aromatic monomers comprise a total reaction mixture, wherein the amount of the polar modifier is less than 5 wt % of the total reaction mixture, wherein the peak molecular weight of the linear triblock copolymer is at least about 1.5 times the peak molecular weight of the counter tapered diblock A-[A/B] copolymer, wherein the peak molecular weight of the multiarm coupled block copolymer is at least about 2.5 times the peak molecular weight of the counter tapered diblock A-[A/B] copolymer, and wherein the ratio of the counter tapered diblock A-[A/B] copolymer to the block copolymer is from about 1:5 to about 5:1 in the counter tapered thermoplastic elastomer composition.

The present invention also provides a method for preparing the novel counter tapered thermoplastic elastomer compositions, which includes the step of reacting at least one conjugated diene monomer (B) and at least one monovinyl aromatic monomer (A) under anionic polymerization conditions in the presence of a suitable polar additive or combination of polar additives, in such a way as to form the counter tapered diblock copolymer A-[A/B] and then adding a suitable coupling agent to form a block copolymer with thermoplastic behavior, and finally obtain the counter tapered thermoplastic elastomer composition. Therefore, in a preferred embodiment of the present invention, the counter tapered diblock A-[A/B] copolymer is sequentially polymerized to independently manipulate the size, composition and microstructure of the desired counter tapered copolymer block [A/B], including the control of its monovinyl aromatic monomer sequence length and conjugated diene monomer vinyl distribution (1,2-diene microstructure). The sequential polymerization also makes possible to tailor the relative size of the monovinyl aromatic homopolymer block A and the relative order of the blocks in the copolymer, thus, the monovinyl aromatic homopolymer block A is first polymerized to be adjacent to the counter tapered copolymer block [A/B] in order to form the desired counter tapered diblock A-[A/B] copolymer.

The monovinyl aromatic monomer sequence length and conjugated diene monomer vinyl distribution of the counter tapered copolymer block [A/B] may be manipulated by controlling the temperature profile of polymerization. This polymerization step is allowed to proceed in either isothermal mode for a pre-established residence time or quasi-adiabatic mode up to a peak temperature. The isothermal mode may be used to manipulate a vinyl distribution that is uniform along the copolymer chain and to achieve a vinyl content that is maximized with respect to the added amount of polar additive and the temperature set for the polymerization mixture, and consequently, the monovinyl aromatic monomer sequence length depends only on the instantaneous relative monomer concentration. The quasi-adiabatic mode may be used to manipulate a vinyl distribution gradient along the copolymer chain, and therefore, the monovinyl aromatic monomer sequence length depends not only on the instantaneous relative monomer concentration but also on the actual temperature profile. The vinyl distribution gradient not only depends on the controlled temperature profile but also on the initial and final temperature of the polymerization mixture. The counter tapered copolymer block [A/B] is manipulated to tailor a desired tapered composition and a controlled vinyl distribution that contributes to maximize processing characteristics by increasing flow and reducing melt viscosity, and to optimize compatibility with materials, ingredients and/or substrates used in the desired applications.

In another embodiment of the present invention, the counter tapered copolymer block [A/B] is a statistically distributed copolymer block of at least one conjugated diene monomer (B) and at least one monovinyl aromatic monomer (A), where statistically distributed means the sequential distribution of the monomeric units obeys known statistical laws. The counter tapered copolymer block [A/B] has a microstructure with gradual change in composition, which mainly depends on the amount of the suitable polar additive added to the polymerization mixture and the temperature profile. Alternatively or concomitantly, the counter tapered copolymer block [A/B] may be prepared by adding the conjugated diene monomer at a controlled feed rate to the polymerization mixture while the monovinyl aromatic monomer is being polymerized. The dosification to the reactor of conjugated diene monomer at a predetermined dose rate for a predetermined time is performed in such a way as to control the instantaneous relative monomer concentration. This polymerization step is allowed to proceed in either isothermal mode for a pre-established residence time or quasi-adiabatic mode up to a peak temperature. The counter tapered copolymer block [A/B] is enlarged with respect to the small interphase -(B/A)- typical of copolymerization in the absence of polar additives. The enlarged counter tapered copolymer block [A/B] is manipulated to tailor its relative size with respect to the adjacent monovinyl aromatic homopolymer block A to contribute in minimizing repulsion, maximizing the compatibility, promoting interfacial mixing, and improve toughness and fracture strength. An optimum counter tapered copolymer block [A/B] is one that incorporated into the counter tapered thermoplastic elastomer compositions provides the best balance between processability and reinforcement performance for each application. People skilled in the art understand the differences in characteristics, properties and applicability of these different counter tapered thermoplastic elastomer compositions.

In an additional embodiment of the present invention, each A block is a monovinyl aromatic homopolymer block of at least one monovinyl aromatic monomer. Each A block is manipulated to tailor its relative size with respect to the counter tapered copolymer block [A/B] to contribute in achieving the desired application performance.

The novel counter tapered thermoplastic elastomer compositions for use in the present invention typically have a weight average molecular weight from about 30,000 to about 500,000 g/mol. This range includes monovinyl aromatic homopolymer blocks A having preferably a peak average molecular weight of at least about 8,000 g/mol, counter tapered diblock A-[A/B] copolymers having preferably a peak average molecular weight from about 20,000 to 250,000 g/mol and multiarm coupled block copolymers having preferably a peak average molecular weight from about 40,000 to 750,000 g/mol. Throughout this disclosure, the molecular weights cited are measured using gel permeation chromatography under ASTM D 3536 with linear polystyrene standards. The composition of vinyl aromatic monomer in the counter tapered thermoplastic elastomer compositions preferably ranges from about 10 to about 85 percent weight, more preferably from about 10 to about 70 percent weight, and even more preferably from about 10 to 55 percent weight. The vinyl configuration content of the novel counter tapered thermoplastic elastomer compositions, based on the total amount of conjugated diene monomer in the counter tapered copolymer block [A/B], may range preferably from about 15 to about 90 percent weight, more preferably from about 15 to about 85 percent weight, and even more preferably from about 15 to 80 percent weight. The invention is not limited to counter tapered thermoplastic elastomer compositions falling within the preferred molecular weight, composition and vinyl configuration ranges.

Examples of counter tapered thermoplastic elastomer compositions that may be made from anionically polymerizable monomers include, but are not limited to, elastomers and thermoplastic elastomers made from block copolymers or terpolymers of styrene (S), butadiene (B), and/or isoprene (I) of varying sizes and number of blocks. Examples of such elastomers and thermoplastic elastomers include: S-[B/S]m, S-[B/S]m-S, S-[B/S]m-X-[S/B]m-S, S-[I/S]m, S-[I/S]m-S, S-[I/S]m-X-[S/I]m-S, S-[B/I/S]m, S-[B/I/S]m-S, S-[B/I/S]m-X-[S/I/B]m-S, (S-[B/S]m)n-X, (S-[I/S]m)n-X, (S-[B/I/S]m)n-X, (wherein m is an integer; and wherein X is the residue of either a coupling agent or a multifunctional initiator and n is an integer from 2 to about 30), which may be used alone or in blends to obtain the counter tapered thermoplastic elastomer compositions as well as their hydrogenated, selectively hydrogenated, and partially hydrogenated counterparts.

The novel counter tapered thermoplastic elastomer compositions may be polymer blends obtained in situ by partial coupling and/or by partial initiation, with a coupling agent and/or a multifunctional initiator, or polymer blends of multiarm, branched or radial polymers obtained by total coupling and/or total initiation, and diblock copolymers prepared separately. The counter tapered thermoplastic elastomer compositions may be blends prepared in situ by adding a suitable amount of a coupling agent at the end of polymerization of the counter tapered diblock A-[A/B] copolymers of the present invention and form the desired (A-[A/B])n-X linear triblock and/or multiarm coupled block copolymers. The partial coupling is achieved by controlling the stoichiometric ratio of coupling agent to living polymer. The counter tapered thermoplastic elastomer compositions may also be blends prepared in situ by using a suitable multifunctional initiator combined with the typical monofunctional initiator, such as an alkyllithium, to initiate the polymerization of the counter tapered diblock [A/B]-A copolymers of the present invention and form the desired X-([A/B]-A)n linear triblock and/or multiarm coupled block copolymers. The partial initiation is achieved by controlling the stoichiometric ratio of multifunctional initiator to monofunctional initiator. The novel counter tapered thermoplastic elastomer compositions for use in the present invention may have from 2 to 30 anionically polymerized polymers chains (arms) per initiator or coupling agent molecule. These branched and radial, linear triblock and multiarm coupled block copolymers may have a peak average molecular weight from about 40,000 to about 750,000 g/mol. This includes counter tapered thermoplastic elastomer compositions having preferably a weight average molecular weight from about 30,000 to 500,000 g/mol. In some embodiments of the novel counter tapered thermoplastic elastomer compositions, the composition of vinyl aromatic monomer preferably ranges from about 10 to about 85 percent weight, more preferably from about 10 to about 70 percent weight, and even more preferably from about 10 to 55 percent weight. The vinyl configuration content of the novel counter tapered thermoplastic elastomer compositions, based on the total amount of conjugated diene monomer in the counter tapered copolymer block [A/B], may range preferably from about 15 to about 90 percent weight, more preferably from about 15 to about 85 percent weight, and even more preferably from about 15 to 80 percent weight. The invention is not limited to counter tapered thermoplastic elastomer compositions falling within the preferred molecular weight, composition and vinyl configuration ranges.

The anionically polymerized polymers can be made by any suitable method known in the art, such as those described in U.S. Pat. Nos. 3,281,383, and 3,753,936, which are incorporated herein in their entirety by reference. In these methods the anionically polymerized polymers are made by contacting anionically polymerizable monomers with an organolithium compound as an initiator. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Many anionic polymerization initiators are well known and commercially available. Monofunctional organolithium compounds, such as butyllithium, are examples of commonly used initiators. Specific examples of these initiators include methyllithium, ethyllithium, tert-butyllithium, sec-butyllithium, n-butyllithium, n-decyllithium, isopropyllithium, eicosyllithium, cycloalkyllithium compounds, such as cyclohexyllithium, and aryllithium compounds, such as phenyllithium, naphthllithium, p-toluyllithium, 1,1-diphenylhexyllithium, and the like. Monofunctional organolithium compounds substituted with protected polar functional groups may also be used as initiators for anionic polymerization.

The amount of initiator varies depending upon the desired molecular weight of the anionically polymerized polymer. Number average molecular weights between about 20,000 and 350,000 can be obtained by adding about 0.28 to 5.0 millimoles of the RLi initiator per mole of monomers corrected by the factor 100/(MW of monomer).

Multifunctional organolithium initiators may also be used as initiators to prepare branched and radial, linear triblock or multiarm block copolymers with a desired functionality range of 2 to about 30 anionically polymerized polymers chains (arms) per initiator molecule. Multifunctional organolithium initiators are readily prepared by direct addition reaction of a stoichiometric amount of a monofunctional organolithium compound to a polyvinyl compound such as 1,3-diisopropenyl benzene, 1,3,5-triisopropenyl benzene, 1,3-bis(1-phenylethenyl)benzene, 1,3,5-tris(1-phenylethenyl)benzene, 1,3-divinylbenzene, 1,3,5-trivinylbenzene, and the like. Oligomeric polyvinyl compounds may be used to prepare multifunctional organolithium initiators with high functionality. Monofunctional organolithium compounds, such as butyllithium, are examples of commonly used initiators for the above addition reaction. Specific examples of these commonly used initiators include tert-butyllithium, sec-butyllithium, and n-butyllithium. Monofunctional organolithium compounds substituted with protected polar functional groups may also be used to prepare multifunctional organolithium initiators. Multifunctional organolithium compounds may be combined among them and/or with monofunctional organolithium compounds to partially initiate anionic polymerization with the multifunctional organolithium compound. The partial initiation is achieved by controlling the stoichiometric ratio of multifunctional initiator to monofunctional initiator.

Anionic polymerization is typically carried out in inert hydrocarbon solvents at relatively low temperatures under vacuum or an inert atmosphere with highly purified reagents in order to prevent the premature termination of the polymerization reaction. The anionic polymerization reactions may take place in a variety of organic solvents. Examples of suitable solvents include, but are not limited to, pentane, hexane, heptane, octane, cyclopentane, cyclohexane, cycloheptane, benzene, naphthalene, toluene, xylene, methyl ether, methyl ethyl ether, diethyl ether, tetrahydrofuran, acetone, methyl ethyl ketone, and mixtures thereof. Cyclohexane in particular, is well suited for use as the solvent in anionic polymerizations.

The anionic polymerization is normally carried out at temperatures in the range from −100° C. to 150° C., preferably between −75° C. and 75° C. Normally 50 to 90% by weight of a reaction solvent is used to control the viscosity inside the reaction zone, preferably 70 to 85%. Typical residence times for anionic polymerization vary depending on the reaction temperature and initiator level between 0.1 and 5 hours, preferable from 0.2 to 2 hours.

Polar additives that are known in the art and may be used to prepare the counter tapered thermoplastic elastomer compositions of the present invention are Lewis bases such as ethers and tertiary amines, and Group Ia alkali metal alkoxides and combinations thereof. Specific examples of these suitable ether polar additives include monofunctional, multifunctional and oligomeric alkyl and cyclic ethers such as dimethyl ether, diethyl ether, ethyl methyl ether, ethyl propyl ether, di-n-propyl ether, tetramethylene oxide (tetrahydrofuran), 1,2-dimethoxyethane, bis-tetrahydrofuran, ditetrahydrofurylpropane (DTHFP), combinations thereof and the like. Specific examples of these suitable tertiary amine polar additives include monofunctional, multifunctional and oligomeric alkyl and cyclic tertiary amines such as dimethylethyl amine, trimethyl amine, triethyl amine, N,N,N',N'-tetramethyl ethylene diamine (TMEDA), N,N,N',N',N''-pentamethyl diethyl triamine, combinations thereof, and the like. Specific examples of these suitable Group Ia alkali metal alkoxides (lithium, sodium, potassium, rubidium and cesium salts) include monofunctional, multifunctional and oligomeric alkyl and cyclic metal alkoxides such as sodium tert-butoxide, sodium tert-amylate, sodium mentholate, potassium tert-butoxide, potassium tert-amylate, potassium mentholate, combinations thereof, and the like.

The amount of the suitable polar additive is in the range of 0.0005 to 50 weight percentage of the total reaction mixture and is preferably in the range of 0.0005 to 10.0 weight percentage of the total reaction mixture. A more preferred range is about 0.0005 to about 5.0 wt % of total reaction mixture. Most preferred Lewis bases are TMEDA, THF and DTHFP. A more preferred combination is one that combines two Lewis bases (i.e. one ether and one tertiary amine). A preferred combination is one that combines two alkali metal alkoxides (e.g., lithium and sodium, lithium and potassium). Preferred concentrations of polar additive or combination of polar additives depend on the type of polar additive or additives, and the desired monomer sequence length distribution, microstructure and properties of the counter tapered copolymer block [A/B]. The desired properties will, in turn, depend on the intended application of the counter tapered thermoplastic elastomer compositions.

Suitable conjugated dienes for use in building the counter tapered thermoplastic elastomer compositions of the present invention include, but are not limited to, 1,3 butadiene, isoprene, 1,3-pentadiene, methylpentadiene, phenylbutadiene, 2,3-dimethyl-1,3-butadiene, 2,4-hexadiene, 1,3-hexadiene, 1,3-cyclohexadiene, 3,4-dimethyl-1,3-hexadiene, 1,3-octadiene, 4,5-diethyl-1,3-octadiene and combinations thereof.

Suitable monovinyl aromatic monomers for use in building the novel counter tapered thermoplastic elastomer compositions of the present invention include, but are not limited to, styrene and styrene derivatives such as 3-methylstyrene, α-methyl styrene, p-methyl styrene, α,4-dimethylstyrene, t-butyl styrene, o-chlorostyrene, 2-butenyl naphthalene, 4-t-butoxystyrene, 3-isopropyl biphenyl, 4-vinylpyridine, 2-vinylpyridine and isopropenyl naphthalene, 4-n-propylstyrene, and combinations thereof.

In some embodiments of the methods provided here, the novel counter tapered thermoplastic elastomer compositions undergo total or partial coupling to prepare branched and radial, linear triblock or multiarm block copolymers. Partial coupling means that a portion of the total living anionically polymerized polymer chain-ends undergo coupling with coupling agents. The coupling agents desirably couple between 2 and 30 anionically polymerized polymer chains (arms), although coupling agents capable of coupling a greater number of chains may also be employed. Suitable coupling agents for use in the total or partial coupling step include, but are not limited to, tin halides, silicon halides, functionalized tin compounds, functionalized silicon compound such as a silane compound and functionalized oligomeric compounds such as the ones listed in U.S. Pat. No. 7,517,934. The entire disclosure of U.S. Pat. No. 7,517,934 is incorporated herein by reference. Silicon tetrachloride and tin tetrachloride are specific examples of suitable coupling agents, with silicon tetrachloride being particularly well-suited for this application. The partial coupling is achieved by controlling the stoichiometric ratio of coupling agent to living polymer. The partial coupling may provide a polymer blend with desired properties.

Organometallic compounds of different metals from Groups IIa, IIb and IIIa, including magnesium, zinc and aluminum, may be used as polymerization rate modifiers when mixed with alkyllithium initiators. Specific examples of suitable polymerization rate modifiers are dibutyl magnesium, diethyl zinc, triethyl aluminium and combinations thereof. The polymerization rate modifiers may be used to control the temperature profile of polymerization. The polymerization rate modifiers contribute to control a polymerization step in either isothermal mode for a pre-established residence time or quasi-adiabatic mode up to a peak temperature.

In some embodiments of the methods provided here, the novel counter tapered thermoplastic elastomer compositions are polymerized in batch, programmed-batch and/or semi-batch processes. As one of skill in the art would recognize, the described synthesis of the counter tapered thermoplastic elastomer compositions can occur in a reaction setting comprising a process operated at temperatures, solvent ratios and stream flow rates necessary to reach the described residence time and stoichiometry conditions.

Applications

Other aspects of the invention provide compositions and articles made from the novel counter tapered thermoplastic elastomer composition, reinforced materials made from a mixture of the novel counter tapered thermoplastic elastomer composition with a material to be reinforced and articles made from the reinforced materials. Other aspects of the invention provide novel counter tapered thermoplastic elastomer composition, and their blends with other block copolymers, with enhanced adhesion to specific substrates and articles made from the adhesion enhanced materials. The novel counter tapered thermoplastic elastomer composition achieves a better balance between processability and reinforcement performance for various asphalt, adhesive and sealant applications. The novel counter tapered thermoplastic elastomer compositions provide the above mentioned applications with easy processing advantages such as short dispersion time, low mixing temperature, low viscosity, excellent storage stability, and better reinforcement advantages such as high elastic response, wide range of performance grade, high adherence, higher filler loading capacity, and better compromise between high and low temperature properties. These processability and reinforcement advantages make the novel counter tapered thermoplastic elastomer compositions suitable to meet the requirements for a broad range of applications such as road paving, roofing, shingles, waterproofing membranes, adhesive tapes and labels, contact and sprayable adhesives, and sealants.

Among the desired commercial applications, some of the novel counter tapered thermoplastic elastomer compositions provided herein are well suited for use as adhesives and sealants, including pressure sensitive adhesives, non-pressure sensitive adhesives, hot melt adhesives, hot melt and solvent-based mastics and sealants. The counter tapered thermoplastic elastomer compositions may also be designed for use as compatibilizing or reinforcing agents in asphalt and in polymer blends. Asphalts which may benefit from the compatibilizing or reinforcing agents provided herein include those commonly used for road paving, roofing and sealant applications. Paving applications include reinforcement of asphalt cements/binders used for making asphalt concrete for road construction, as well as modification of materials for road rehabilitation, repair and maintenance, including chip sealing, resealing, resurface and recycling. Roofing applications include reinforcement of roof shingles, as well as modification of materials for roof waterproofing, repair and maintenance. Certain types of counter tapered thermoplastic elastomer compositions may also be used as reinforcing agents, viscosity modifiers, flow modifiers, processing aids and impact modifiers in rubbers and plastics. Non-polar plastics are types of plastic that may benefit from the counter tapered thermoplastic elastomer compositions. Non-polar plastics include, but are not limited to polyolefins, polystyrene and copolymers thereof.

As one of skill in the art would recognize, the optimal characteristics and properties of the counter tapered thermoplastic elastomer compositions will depend on the intended application. Several exemplary applications for the counter tapered thermoplastic elastomer compositions are provided below. These applications are provided only for illustrative purposes and are not intended to limit the scope of the invention.

Asphalt Reinforcement:

Asphalt modification with high molecular weight elastomers is typically used to prepare modified asphalt binders with improved performance over unmodified asphalt binders. Performance properties of asphaltic products that are improved with the addition of polymers are: a) flexibility at low temperatures; b) resistance to flow and deformation at high temperatures; c) temperature susceptibility; d) tensile strength; e) stiffness modulus at high temperatures; f) asphalt-aggregate adhesion; g) resistance to surface abrasion. Asphaltic products that benefit from modification with polymers are pavement binders, seal coats, highway joint sealants, waterproofing membranes, coatings, pipeline mastics, pipeline wrapping tapes, and others.

Since high molecular weight polymers have the tendency to be immiscible with asphalt, asphalt modification with elastomers based on monovinyl aromatic and conjugated diene monomers is complicated by limited phase stability, which results in asphalt-polymer separation that negatively affects the performance properties of the asphaltic products. Phase stability has been typically improved by either cross-linking the asphalt-polymer blend or by increasing the compatibility of the polymer with asphalt. High molecular weight polymers also adversely affect the processing characteristics of the modified asphalt binders by significantly increasing the melt viscosity of the asphalt-polymer blends. Modification of polymer composition and/or structure in prior art has been used to improve processing characteristics and reduce the cost of asphalt-polymer blends, but often performance properties are unfavorably modified.

The inventors have discovered that the addition of the counter tapered thermoplastic elastomer compositions provided herein into asphalt maximizes the processing characteristics, without diminishing the performance properties of the modified asphalt, when compared to modified asphalt formulated with prior art copolymers. The counter tapered thermoplastic elastomer compositions of the present invention provide the asphalt blends with lower melt viscosity and high flow; increased dispersibility and compatibility; higher blend stability; and good elastomeric and thermoplastic properties. It has also been discovered that the counter tapered thermoplastic elastomer compositions of the present invention can be used as compatibilizing or reinforcing agents. Asphalts which may benefit from the compatibilizing or reinforcing agents provided herein include those commonly used for road paving, roofing and sealant applications. Paving applications include reinforcement of asphalt cements/binders used for making asphalt concrete for road construction, as well as modification of materials for road rehabilitation, repair and maintenance, including chip sealing, resealing, resurface and recycling. Roofing applications include reinforcement of roof shingles, as well as modification of materials for roof waterproofing, repair and maintenance.

The inventors have also discovered that emulsions of asphalt previously modified with the counter tapered thermoplastic elastomer compositions of the present invention improve asphalt adherence to aggregate particles when used for road rehabilitation, repair and maintenance. It has also been discovered that the compatibilizing or reinforcing agents provided herein can be encapsulated and blended with commercially available block copolymers to improve phase stability and processing characteristics of the modified asphalt blend.

In countries such as the United States, modified asphalts are evaluated according to the standards of the American Association of State Highway and Transportation Officials (AASHTO), which rates asphalts according to performance grade (PG). The standards of the American Society for Testing and Materials (ASTM) are also used for asphalt evaluation. Among the properties evaluated in modified asphalts are the following:

a) Ring and ball softening point (RBSP), which may be measured in accordance with ASTM D 36, which indicates the temperature at which asphalt softens and becomes unsuitable for the subject application. The softening point or temperature is taken using a Ring and Ball apparatus, also known as R&B apparatus.

b) Penetration at 25° C., which is a parameter related to the rigidity of the modified asphalt. Penetration may be measured in accordance with ASTM D5 as the distance a weighted needle or cone will sink into the asphalt during a set period of time.

c) Brookfield Viscosity, which is a property relating to the stable stationary flow of asphalt. Brookfield Viscosity may be measured in accordance with ASTM D4402.

d) Resilience is a property that measures the elasticity of an asphalt material. Resilience may be measured in accordance with ASTM D 113.

e) Rutting factor: $G^*/\sin \delta$ at various temperatures (wherein $G^*$ is the complex modulus and $\delta$ is the phase angle) is useful for determining the performance of modified asphalt at high temperatures. This factor indicates how resistant a pavement is to the permanent deformation that can occur over time with repeated loads at high temperature, or when the pavement is subjected to a load much greater than the maximum allowed in the original design. Therefore, higher Rutting factor values at high temperatures indicate that the asphalt can withstand greater deformation than materials that have lower Rutting factors at the same test temperature. The Rutting factor may be measured in accordance with AASHTO TP5.

f) Upper temperature limit. By determining the Rutting factor, it is possible to determine the upper temperature limit in accordance with AASHTO standards. The upper temperature limit relates to the maximum temperature at which the asphalt may retain adequate rigidity to resist rutting.

g) Lower temperature limit. By determining the Rutting factor, it is possible to determine the lower temperature limit in accordance with AASHTO standards. The lower temperature limit relates to the minimum temperature at which the asphalt may retain adequate flexibility to resist thermal cracking.

h) Phase segregation is a critical factor in the modification of asphalt with elastomers, due to the aforementioned problems. The phase separation index is measured as the percent difference between the $T_{RBSP}$ measured at the top and bottom surfaces of a cylindrical probe, made in the interior of a sealed tube containing the formulated asphalt and aged at 163° C. for 48 hours in a vertical position without agitation, and frozen at 30° C. The percentage difference in $T_{RBSP}$ provides a measure of the compatibility between the asphalt-rich phase and the polymer-rich phase in an asphalt/polymer blend.

Two specific applications for which the reinforced asphalts may be used are road paving applications and roofing/waterproof coating applications. In some instances when the reinforced asphalt is used in a road paving application, 0.5 to 8 parts of the counter tapered thermoplastic elastomer compositions of the present invention, preferably 2 to 5 parts, may be mixed with 99.5 to 92 parts, preferably 98 to 95 parts, of an asphalt to improve the performance characteristics thereof. In some instances when the reinforced asphalt is used in a roofing or waterproof coating application, 3 to 25 parts of the counter tapered thermoplastic elastomer compositions of the present invention, preferably 6 to 16 parts, may be mixed with 97 to 75 parts, preferably 94 to 84 parts, of an asphalt to improve the performance characteristics thereof. Suitable asphalts for use with the counter tapered thermoplastic elastomer compositions of the present invention include, but are not limited to, PG 64-22 asphalt or other asphalt widely used in road paving and roofing applications such as native rock asphalts, lake asphalts, petroleum asphalts, air-blown asphalts, cracked asphalts, and residual asphalts.

In certain embodiments of the invention, the much lower viscosity of the asphalt formulations prepared with the counter tapered thermoplastic elastomer compositions provided herein, besides contributing to improve the dispersion into the asphalt, also facilitates the processing, handling and application of the modified asphalt blends by improving pumping capacity and/or decreasing the energy required to apply it. This also means an important cost reduction and a more environmentally-friendly process. The high softening point temperature of the asphalt modified with the counter tapered thermoplastic elastomer compositions of the present invention should provide a much better resistance to flow and deformation at high temperatures. Surprisingly, the asphalt modified with the counter tapered thermoplastic elastomer compositions of the present invention and formulated with low polymer content, provide similar performance properties ($T_{RBSP}$) and lower viscosity than the asphalt modified with prior art commercially available polymers. This also means an important cost reduction and an energy-saving process.

In certain embodiments of the invention, the counter tapered thermoplastic elastomer compositions provided herein may confer asphalt compositions with one or more of the following properties: a) maximum application temperature of about 50 to 100° C., measured as the temperature at which the Rutting Factor or Dynamic Shear Stiffness (G*/sin δ) takes a value of 1.0 KPa (measured as per AASHTO TP5); b) $T_{RBSP}$ (measured as per ASTM D36) of about 40 to 110° C.; c) asphalt penetration at 25° C. (as per ASTM D5) of about 30 to 75 dmm for road paving applications or about 50 to 100 for roofing and waterproof coating applications; and d) dynamic viscosity at 135° C. of about 500 to 3000 cP and desirably 1000 to 2000 cP for road paving applications or at 190° C. of about 1000 to 6000 cP and desirably 1500 to 4000 cP (as per ASTM D4402) for roofing and waterproof coating applications.

Adhesives, Sealants and Coatings:

High molecular weight elastomers are typically formulated in blends useful as adhesives, sealants and coatings to provide cohesive strength and adequate balance for each application between adhesive and cohesive properties. Elastomers based on monovinyl aromatic and conjugated diene monomers are extensively used as pressure-sensitive adhesives, spray and contact adhesives, panel and construction mastics, sealants and coatings. Isoprene-containing elastomers are preferred for hot melt pressure sensitive adhesives because they can be readily tackified at low cost. Butadiene-containing elastomers are generally preferred for construction or laminating adhesives because they can provide stiffness and cohesive strength. Hydrogenated versions of these elastomers are preferred for sealants because of their higher weather resistance. Performance properties that are required for successful formulation of adhesives, sealants and coatings products with elastomers are the following: a) tackifying resin compatibility with elastomer; b) continuous elastomer phase morphology for cohesive strength and shear resistance; c) soft and low modulus elastomer for tack development and energy dissipation; d) suitable tackifying resin that raises the glass transition temperature ($T_g$) of rubbery phase of the elastomer for increasing dissipation of strain energy.

High molecular weight polymers of the prior art adversely affect the processing characteristics of the adhesives, sealants and coatings formulations by significantly increasing the melt and solution viscosity of these blends. Modification of polymer composition and/or structure in prior art has been used to improve processing characteristics and to reduce the cost of formulations for adhesives, sealants and coatings applications, but often performance properties are unfavorably modified. Among the desired commercial applications, some of the novel counter tapered thermoplastic elastomer compositions provided herein are well suited for use as adhesives, sealants and coatings, including pressure sensitive adhesives, non-pressure sensitive adhesives, hot melt adhesives, hot melt and solvent-based mastics, sealants and coatings. The development of low melt viscosity and low solution viscosity is particularly important for pressure-sensitive adhesives, hot melt adhesives and solvent-based adhesives. The inventors have discovered that the addition of the novel counter tapered thermoplastic elastomer compositions provide outstanding processing characteristics to formulations without significantly affecting the desired performance properties of adhesives, sealants and coatings products. Remarkably, hot melt pressure sensitive adhesives prepared with these novel counter tapered thermoplastic elastomers show higher compatibility with various resins and excellent cohesive strength and extremely high shear resistance. It has also been discovered that the compatibilizing or reinforcing agents provided herein can be encapsulated and blended with commercially available block copolymers to improve phase stability and processing characteristics of the adhesive blends.

In some such applications, about 10 to 40, desirably 15 to 30, and more desirably 18 to 25, parts by weight of the novel counter tapered thermoplastic elastomer compositions, or its mixtures with commercially available block copolymers, are mixed with other conventional adhesive formulation components/additives, such as tackifying resins; plasticizers; coupling agents; crosslinking agents; photoinitiators; fillers; processing aids; stabilizers and antioxidants to confer such compositions with improved properties compared to adhesives formulated with prior art elastomers as suitable controls. Examples of suitable tackifiers include resins with high and low softening points which are compatible with the polymer. These include hydrogenated resins, rosin esters, polyterpene resins, terpene phenol resins, indene-coumarone resins and aliphatic hydrocarbon resins. In some illustrative embodiments, the amount of tackifying resins in the composition ranges from about 40 to 65% by weight. Plasticizers, generally known as extending oils, include mineral oils, paraffinic oils, and naphthenic oils. In some illustrative embodiments, the amount of plasticizer in the composition ranges from about 15 to 35% by weight. The antioxidants may be used to inhibit the thermal and UV oxidation processes, and are typically added to the adhesive composition in amounts of about 0.05 to 3% by weight. Examples of antioxidants include phenol compounds, phosphites, amines, and thio compounds. Some examples of commercially available adhesive components/additives are listed in Table A below.

TABLE A

Commercially Available Adhesive Components/Additives

RESINS

| Rosin esters: | Styrenated Terpenes: | Polyterpene resins: | Terpene phenolics: |
|---|---|---|---|
| Sylvalite RE100L[a] | Sylvares ZT5100[a] | Sylvares TR1100[a] | Sylvares TP2040[a] |
| Sylvalite RE115[a] | Sylvares ZT105LT[a] | Sylvares TR7115[a] | Sylvares TP115[a] |
| Sylvalite RE85L[a] | Sylvares ZT115LT[a] | | |
| Foral 85[b] | | | |
| Foral 105[b] | | | |
| Pentalyn H[b] | | | |
| Permalyn 3100[b] | | | |

| Aliphatic Hydrocarbon resins: | Hydrogenated Hydrocarbon Resins: |
|---|---|
| Piccotac 1100[b] | Eastotac H100[b] |
| Piccotac 115[b] | Eastotac H130[b] |
| Wingtack 95[a] | |

TABLE A-continued

Commercially Available Adhesive Components/Additives

PLASTICIZERS

| Naphthenic | Paraffinic |
|---|---|
| Shellflex 371[c] | Shellflex 210[c] |
| Shellflex 3271[c] | Shellflex 270[c] |
| RPO-104C[e] | Shellflex 330[c] |
| | Primol 352[d] |
| | RPO-138[e] |
| | P.OIL 50[e] |

ANTIOXIDANTS

| Phenolic | Phosphite | Thio | Blends |
|---|---|---|---|
| Irganox 1010[f] | Alkanox TNPP[g] | Lowinox DSTDP[g] | Ultranox 877A[h] |
| Irganox 1076[f] | Alkanox 240[g] | | |
| Irganox 565[f] | Ultranox 626[h] | | |
| Irganox 1520[f] | Weston 618F[h] | | |
| Irganox 1098[f] | | | |
| Anox 20[g] | | | |
| Ultranox 276[h] | | | |

Available from:
[a]Arizona Chemical;
[b]Eastman/Hercules;
[c]Shell;
[d]Esso, ExxonMobil;
[e]IPISA. Ingenieria y Procesos Industriales, S.A.;
[f]Ciba Specialty Chemicals, Inc.;
[g]Great Lakes Chemical Corporation;
[h]GE Specialty Chemicals.

The invention will be further described by reference to the following examples which are presented for the purpose of illustration only and are not intended to limit the scope of the invention.

EXAMPLES

Example 1

Preparation of Counter Tapered Thermoplastic Elastomers (CTTE)

In Example 1, several novel counter tapered thermoplastic elastomers (CTTE 1-19) were prepared according to the process claimed in the present invention. Polymers CTTE 1-14 and 17 were (A-[A/B])n-X block copolymers wherein the A-[A/B] diblock prior to coupling consisted of a monovinyl aromatic homopolymer block A block that was a polystyrene block (PS) and a counter tapered copolymer block [A/B] that was a styrene/butadiene copolymer block, which after coupling formed a [A/B]-X-[B/A] midblock having terminal regions that are rich in styrene units and a center region that is rich in butadiene units. CTTE 15, 16, 18, and 19 were polymers with only a counter tapered copolymer block [A/B] of styrene/butadiene prepared for illustrative purposes of the monomer distribution of the midblock copolymer chain prior to coupling.

The novel counter tapered thermoplastic elastomer (CTTE) compositions were characterized by GPC, $^1$H NMR and DSC methodologies to determine: molecular weight averages and molecular weight distribution characteristics such as peak average molecular weight (Mp) for linear diblocks and coupled modes, weight average molecular weight (Mw) and Diblock to Coupled Ratios; microstructural characteristics such as Total Styrene, Block Styrene, and Vinyl A/B block contents; and glass transition temperatures (Tg) for A/B counter tapered copolymer block. In addition, calculations of the Midblock Styrene and Midblock Blockiness were performed following the method used to characterize the polymer mid or "B" block as Calc. Mid PSC and Calc. Mid Blocky in US 2003/0176582 A1 patent application publication on Sep. 18, 2003 by KRATON Polymers U.S. LLC and Bening et al. Tables 1-2 enlist the analytical characterization results and Table 3 the polymerization conditions for CTTE 1-19. The following describes the general procedure used to prepare these novel counter tapered thermoplastic elastomers (CTTE) and to control the monomer distribution in the anionic copolymerization of 1,3-butadiene (B) and styrene (S) in the presence of ditetrahydrofurylpropane (DTHFP) as a suitable polar modifier and randomizing agent for the styrene/butadiene [S/B] counter tapered copolymer block. The abbreviations used in Table 3 below for the polymerization conditions are defined as follows: CHx=cyclohexane; STY=styrene; and BD=1,3-butadiene. For the novel counter tapered thermoplastic elastomers CTTE 1-14 and 17, silicon tetrachloride (SiCl4) was used as a coupling agent.

The novel counter tapered thermoplastic elastomer (CTTE 1-19) compositions of the present invention were prepared in a 5.3 Liter reactor system operated under inert nitrogen atmosphere in batch and/or semi-batch mode according to the teachings of this invention. Immediately before addition to the reactor system, solvent and monomers were thoroughly purified to decrease their moisture content to a maximum of 5 ppm by flowing through a set of columns packed with alumina and molecular sieves. For the first polymerization step, an appropriate amount of purified solvent (CHx) was charged into the reactor and heated to the initial reaction temperature (Ti) from about 60 to about 65° C. Once Ti was reached, a suitable polar modifier (randomizing agent) such as ditetrahydrofurylpropane (DTHFP) was added into the reactor followed by a first addition of monovinyl aromatic monomer (1st STY) of from about 0 to about 17.5 wt % of total monomer mixture. For CTTE 15, 16, 18 and 19, there was no first addition of styrene monomer in order to prepare isolated styrene/butadiene counter tapered copolymer blocks to analyze directly the Midblock Styrene, the Midblock Blockiness and the monomer distribution along the copolymer chain of the [A/B] counter tapered copolymer block by $^1$H NMR without the calculations needed to eliminate the interference of the monovinyl aromatic homopolymer block A (PS block) in CTTE 1-14 and 17, which was enabled by taking aliquots throughout the copolymerization and then performing NMR characterization. This reaction mixture was allowed to stabilize at Ti, and then n-butyllithium or another suitable initiator was added in a suitable solvent solution directly into the reactor mixture containing at least the amount of polar modifier necessary to efficiently initiate the anionic polymerization of the living polystyrene blocks. The amount of initiator was stoichiometrically calculated as described in the literature to form individual blocks with the desired molecular weight and to compensate for residual impurities. This first polymerization step was then allowed to proceed adiabatically up to complete conversion to form the monovinyl aromatic homopolymer block A with peak average molecular weight Mp about a target value of about 10,000.

For the second polymerization step, the addition of both monomers was simultaneously initiated, a second monovinyl aromatic monomer (2nd STY) addition of about 7.5 to about 9.1 wt % of total monomer mixture was rapidly charged into the reactor at a specified dose rate during a predetermined dosification time of about 1 min, and a conjugated diene monomer (BD) addition of about 75.0 to about 90.9 wt % of total monomer mixture was slowly charged into the reactor at a specified dose rate for a predetermined dosification time of from about 4 min to about 11 min. These monomer additions were carried out in a programmed batch and/or semi-batch mode, and the amount of polar modifier (randomizing agent) was adjusted from about 0.002 to about 0.013 wt % of total reaction mixture, in order to promote the formation of a statistically distributed tapered S/B copolymer block with gradual change in composition and vinyl microstructure (1,2-addition) along the copolymer chain. This second polymerization step was then allowed to proceed adiabatically up to complete conversion and the final peak temperature (Tp) was allowed to increase to from about 100 to about 105° C., thereby forming the counter tapered copolymer [A/B] block and thus obtaining the living counter tapered A-[A/B] diblock copolymer with peak average molecular weight Mp about a target value of from about 104,000 to about 122,000.

Finally, a suitable coupling agent such as silicon tetrachloride (SiCl4) in a sufficient amount of from about 0.003 to about 0.008 of total reaction mixture was added to the reactor to partially couple the living counter tapered A-[A/B] diblock copolymer to obtain the desired ratios of uncoupled linear diblock A-[A/B] to coupled radial (A-[A/B])n-X counter tapered thermoplastic elastomer compositions of the present invention, wherein X is the residual moiety (Si) from the coupling reaction process. The remaining living polymer chains were terminated by adding a 10 mol % excess over the stoichiometric amount of a suitable alcohol to the final reaction mixture.

Tables 1 and 2 list the analytical characterization results for the novel counter tapered thermoplastic elastomer compositions CTTE 1-19. All the average molecular weights (Mp and Mw) are given in units of 1000 (k) and calculated relative to polystyrene standards by GPC. The peak average molecular weights Mp for the monovinyl aromatic homopolymer block A or polystyrene block of CTTE 1-14 and 17 are from about 9.5 to about 11 kg/mol. The peak average molecular weights Mp for the A-[A/B] diblock copolymer or S-[S/B] styrene-butadiene diblock copolymer of CTTE 1-14 and 17 are from about 104 to about 122 kg/mol. The peak average molecular weights Mp for the [A/B] counter tapered copolymer or [S/B] styrene-butadiene copolymer of CTTE 15, 16, 18 and 19 are from about 94 to about 108 kg/mol. The ratios of Mp of coupled radial (A-[A/B])n-X to Mp of uncoupled linear diblock A-[A/B] of CTTE 1-14 and 17 are from about 3.3 to about 3.5. The weight average molecular weights Mw of CTTE 1-14 and 17 are from about 178 to about 267 kg/mol. The ratios of uncoupled linear diblock A-[A/B] to coupled radial (A-[A/B])n-X of CTTE 1-14 and 17 are from about 0.6 to about 2.8, which is the coupling efficiency as determined from GPC area. The vinyl [A/B] block contents of CTTE 1-19 are from about 13.7 to about 33.0 wt % based on total butadiene units. The glass transition temperatures of the [A/B] counter tapered copolymer block of the CTTE 6, 9, and 14-19 are from about −82.0 to about −71.9° C. The contents determined by NMR of CTTE 1-14 and 17 for: total styrene based on total copolymer are from about 23.2 to about 25.4 wt %; block styrene based on total styrene units are from about 68.8 to about 83.6 wt %; midblock styrene based on midblock copolymer are from about 7.9 to about 10.7 wt %, and midblock blockiness based on midblock styrene units are from about 12.1 to about 55.1 wt %.

FIGS. 1, 2, 3 and 4 depict the monomer distribution in [A/B] midblock segment prior to coupling of inventive counter tapered block copolymers CTTE 14, 16, 17 and 19, which was enabled by taking aliquots throughout the copolymerization and then performing NMR characterization. For CTTE 16 and 19, there was no first addition of styrene monomer in order to isolate the styrene/butadiene counter tapered copolymer block and analyze directly the monomer distribution along the copolymer chain in the [A/B] midblock segment by $^1$H NMR without the calculations needed to substract the monovinyl aromatic homopolymer block A (PS block) in CTTE 14 and 17. The calculations of the monomer distribution in CTTE 14 and 17 were performed following the method used to characterize the polymer mid or "B" block in US 2003/0176582 A1 patent application publication on Sep. 18, 2003 by KRATON Polymers U.S. LLC and Bening et al.

FIGS. 1 and 2 clearly show that the cumulative composition of incorporated styrene monomer in the [A/B] midblock segment of the CTTE 14 and 16 decreases gradually with increasing conversion of the butadiene/styrene midblock polymerization. After coupling, this [A/B] midblock segment forms a complete [A/B]-X-[B/A] midblock, which has terminal regions that are rich in styrene monomer units (low butadiene/styrene cumulative ratio) and a center region that is rich in butadiene monomer units (high butadiene/styrene cumulative ratio), which occurs exactly the opposite way in the controlled distribution compositions of the prior art. This is a surprising and unexpected result given the facts that both a relatively small amount of styrene monomer is present during the midblock segment copolymerization (about 10 wt % of monomer mixture) and a sufficient amount of polar modifier (randomizing agent) for preparing a mid vinyl styrene/butadiene copolymer (about 30 wt % vinyl) was used for these copolymerizations. In addition, the counter tapered A-[A/B]-X-[B/A]-A thermoplastic elastomer compositions of the present invention have a unique combination of high styrene (low butadiene/styrene ratio) and high vinyl at the terminal regions of the complete [A/B]-X-[B/A] styrene/butadiene midblock close to the interfaces with the monovinyl aromatic homopolymer blocks A or polystyrene blocks. It is significant to note that even though the terminal regions of the styrene/butadiene midblock are richer in styrene (low butadiene/styrene cumulative ratio), a low level of midblock blockiness can be attained. Also, it is shown that styrene incorporation into the counter tapered [A/B] midblock segment depends not only on the amounts of styrene monomer and randomizing agent, but also on the temperature profile of the copolymerization and the monomer dosification times. FIGS. 2 and 3 show a more gradual decrease of the styrene incorporation into the copolymer chain of the [A/B] midblock segment of CTTE 16 as a response to the longer dosification time for butadiene monomer. FIG. 4 shows a more dramatic change in styrene incorporation of [A/B] midblock segment between CTTE 17 and 19, in response to a change in butadiene monomer dosification time, when the amount of polar modifier (randomizing agent) is relatively smaller (lower vinyl).

TABLE 1

Counter Tapered Thermoplastic Elastomers Composition

| Polymer Name | Mp A block (kg/mol) | Mp A-A/B diblock (kg/mol) | Mp coupled/ Mp A-A/B diblock | Mw CTTE (kg/mol) | Ratio A-A/B diblock to coupled | Vinyl A/B block (wt %) | Tg (° C.) |
|---|---|---|---|---|---|---|---|
| CTTE 1 | 10.1 | 111 | 3.50 | 189 | 2.5 | 13.7 | |
| CTTE 2 | 10.4 | 112 | 3.49 | 179 | 2.8 | 18.7 | |
| CTTE 3 | 10.0 | 106 | 3.48 | 178 | 2.3 | 27.0 | |
| CTTE 4 | 10.3 | 109 | 3.49 | 185 | 2.3 | 27.6 | |
| CTTE 5 | 10.0 | 113 | 3.48 | 192 | 2.3 | 29.5 | |
| CTTE 6 | 10.7 | 114 | 3.48 | 189 | 2.4 | 29.6 | −71.9 |
| CTTE 7 | 11.0 | 122 | 3.45 | 202 | 2.7 | 33.0 | |
| CTTE 8 | 10.2 | 106 | 3.45 | 219 | 1.2 | 18.1 | |
| CTTE 9 | 9.5 | 108 | 3.39 | 252 | 0.8 | 19.7 | −78.0 |
| CTTE 10 | 10.3 | 104 | 3.40 | 234 | 1.0 | 19.8 | |
| CTTE 11 | 10.4 | 111 | 3.34 | 267 | 0.6 | 20.3 | |
| CTTE 12 | 10.3 | 104 | 3.36 | 243 | 0.8 | 20.7 | |
| CTTE 13 | 10.5 | 105 | 3.43 | 224 | 1.1 | 29.0 | |
| CTTE 14 | 10.5 | 110 | 3.47 | 194 | 2.1 | 30.8 | −71.9 |
| CTTE 15 | | 95 | | 95 | | 30.6 | −72.6 |
| CTTE 16 | | 99 | | 103 | | 29.3 | −72.9 |
| CTTE 17 | 10.9 | 107 | 3.31 | 262 | 1.7 | 18.9 | −82.0 |
| CTTE 18 | | 108 | | 108 | | 22.1 | −77.6 |
| CTTE 19 | | 94 | | 97 | | 17.6 | −80.8 |

$^a$ Molecular Weight averages relative to PS standards, Coupling Efficiency ratios based on % cumulative GPC areas;
$^b$ RMN $^1$H 300 MHz, Vinyl in wt % based on total butadiene units;
$^c$ Glass Transition Temperature (inflexion point) by DSC @ 10° C./min.

TABLE 2

Counter Tapered Thermoplastic Elastomers NMR Results

| Polymer Name | Total Styrene (wt %) | Block Styrene (wt %) | Midblock Styrene (wt %) | Midblock Blockiness (wt %) |
|---|---|---|---|---|
| CTTE 1 | 24.6 | 83.6 | 10.6 | 55.1 |
| CTTE 2 | 23.8 | 81.6 | 9.3 | 44.0 |
| CTTE 3 | 23.5 | 77.0 | 8.5 | 24.5 |
| CTTE 4 | 23.4 | 77.8 | 8.4 | 26.0 |
| CTTE 5 | 23.2 | 76.8 | 9.3 | 31.9 |
| CTTE 6 | 23.6 | 76.6 | 8.9 | 25.9 |
| CTTE 7 | 23.3 | 76.0 | 9.1 | 27.1 |
| CTTE 8 | 24.4 | 77.5 | 9.4 | 30.0 |
| CTTE 9 | 24.3 | 80.2 | 10.7 | 47.3 |
| CTTE 10 | 24.3 | 82.1 | 8.8 | 40.5 |
| CTTE 11 | 23.6 | 80.9 | 8.8 | 39.1 |
| CTTE 12 | 23.9 | 81.1 | 8.2 | 33.7 |
| CTTE 13 | 23.9 | 76.5 | 7.9 | 14.7 |
| CTTE 14 | 25.3 | 68.8 | 10.8 | 12.1 |
| CTTE 15 | 7.8 | 12.5 | 7.8 | 12.5 |
| CTTE 16 | 11.3 | 17.5 | 11.3 | 17.5 |

TABLE 2-continued

Counter Tapered Thermoplastic Elastomers NMR Results

| Polymer Name | Total Styrene (wt %) | Block Styrene (wt %) | Midblock Styrene (wt %) | Midblock Blockiness (wt %) |
|---|---|---|---|---|
| CTTE 17 | 25.4 | 76.8 | 9.6 | 25.6 |
| CTTE 18 | 9.9 | 18.1 | 9.9 | 18.1 |
| CTTE 19 | 10.3 | 20.8 | 10.3 | 20.8 |

[a]RMN $^1$H 300 MHz, Total Styrene in wt % based on total copolymer;
[b]RMN $^1$H 300 MHz, Block Styrene in wt % based on total styrene units;
[c]Calculated Midblock Styrene in wt % based on midblock copolymer;
[d]Calculated Midblock Blockiness in wt % based on midblock styrene units.

TABLE 3

Counter Tapered Thermoplastic Elastomers Process

| | CTTE 1 | CTTE 6 | CTTE 9 | CTTE 13 | CTTE 14 | CTTE 15 | CTTE 16 | CTTE 17 | CTTE 18 | CTTE 19 |
|---|---|---|---|---|---|---|---|---|---|---|
| CHx (wt %)[a] | 86.1 | 86.1 | 86.1 | 86.1 | 86.1 | 88.2 | 88.2 | 86.1 | 88.2 | 88.2 |
| Randomizing agent (wt %)[a] | 0.0022 | 0.0115 | 0.0043 | 0.0116 | 0.0120 | 0.0123 | 0.0123 | 0.0043 | 0.0044 | 0.0044 |
| 1st STY (wt %)[b] | 17.5 | 17.5 | 17.5 | 17.6 | 17.5 | 0.0 | 0.0 | 17.5 | 0.0 | 0.0 |
| Initial Temperature Ti (° C.) | 61 | 61 | 60 | 60 | 60.21 | 66 | 66 | 60.7 | 65 | 65.6 |
| BD (wt %)[b] | 75.0 | 75.0 | 75.0 | 74.9 | 75.0 | 90.9 | 90.9 | 75.0 | 90.9 | 90.9 |
| BD dose rate (g/min) | 55 | 60 | 51 | 67 | 47 | 47 | 27 | 55 | 55 | 30 |
| BD dosification time (min) | 5.5 | 5.0 | 5.9 | 4.5 | 6.45 | 6.45 | 11 | 5.43 | 5.43 | 10 |
| 2nd STY (wt %)[b] | 7.5 | 7.5 | 7.5 | 7.5 | 7.5 | 9.1 | 9.1 | 7.5 | 9.1 | 9.1 |
| 2nd STY dose rate (g/min) | 30 | 30 | 30 | 30 | 30 | 30 | 30 | 30 | 30 | 30 |
| STY dosification time (min) | 1 | 1 | 1 | 1 | 1 | 1 | 1 | 1 | 1 | 1 |
| Final Peak Temperature Tp (° C.) | 103 | 105 | 104 | 105 | 104.23 | 103.9 | 105.53 | 102.98 | 104.34 | 105.1 |
| Coupling agent (wt %)[a] | 0.0033 | 0.0033 | 0.0078 | 0.0056 | 0.0035 | 0.0000 | 0.0000 | 0.0078 | 0.0000 | 0.0000 |

[a]wt % of Total Reaction Mixture
[b]wt % of Total Monomer Mixture

One embodiment of the invention is a process for making a counter tapered thermoplastic elastomer composition comprising: adding a solvent, a polar modifier or combination of polar modifiers, and monovinyl aromatic monomer to a reactor to form an initial reaction mixture, wherein the amount of the polar modifier in the initial reaction mixture is less than 10 wt %; adding an organolithium initiator compound to the reactor and anionically polymerizing the monomer to form the monovinyl aromatic homopolymer block A with a peak molecular weight of at least 8,000; adding additional monovinyl aromatic monomer and simultaneously begin the dosification to the reactor of conjugated diene monomer at a predetermined dose rate for a predetermined time, and copolymerizing to form the counter tapered copolymer block A/B with a vinyl content of at least 15 weight percent based on the amount of conjugated diene units in the diblock copolymer, and obtain the counter tapered diblock A-A/B copolymer with a peak molecular weight from 20,000 to 250,000; and adding a coupling agent or combination of coupling agents to partially couple the counter tapered diblock A-A/B copolymer to form the block copolymer that is either a linear triblock copolymer, a multiarm coupled block copolymer, or mixtures thereof; wherein the solvent, the polar modifier, the conjugated diene monomer and the monovinyl aromatic monomers comprise a total reaction mixture, wherein the amount of the polar modifier is less than 5 wt % of the total reaction mixture, wherein the peak molecular weight of the linear triblock copolymer is at least about 1.5 times the peak molecular weight of the counter tapered diblock A-A/B copolymer, wherein the peak molecular weight of the multiarm coupled block copolymer is at least about 2.5 times the peak molecular weight of the counter tapered diblock A-A/B copolymer, and wherein the ratio of the counter tapered diblock A-A/B copolymer to the block copolymer is from about 1:5 to about 5:1 in the counter tapered thermoplastic elastomer composition.

One embodiment of the invention based on Example 1 and Table 3 is a process for making counter tapered thermoplastic elastomers in either batch or semi-batch mode, which comprises:

preferably and optionally purifying solvent and monomers to decrease their moisture content to a maximum of 50 ppm, preferably less than 25 ppm and more preferably less than 5 ppm;

loading the solvent into a reactor and heating the solvent to an initial reaction temperature (Ti), which is between 50 and 75° C., possibly between 55 and 70° C., preferably between 55 and 70° C. and more preferably between 60 and 66° C., which is more than 75 wt % of a total reaction mixture, preferably 80 to 90 wt %, more preferably 84 to 90 wt % and most preferably 86 to 89 wt % with values of 86 and 88 wt % being typical, where the solvent is preferably cyclohexane;

preferably adding a suitable polar modifier into the reactor, which is preferably ditetrahydrofurylpropane (DTHFP) or tetrahydrofuran (THF) and more preferably DTHFP;

adding a monovinyl aromatic monomer to the reactor, which is preferably styrene, which is typically 15 to 20 wt %, preferably 16 to 19 wt % and more preferably 17 to 18 wt % of a total monomer mixture with 17.5 wt % being most preferred;

preferably and optionally allowing the solvent, polar modifier and monovinyl aromatic monomer to stabilize at the temperature Ti plus or minus 10° C., preferably plus or minus 5° C. and more preferably plus or minus 2° C. with stabilization at Ti being most preferred;

adding a lithium-based initiator in a suitable solvent solution into the reactor mixture, preferably n-butyllithium, preferably where the amount of initiator is stoichiometrically calculated to form individual blocks and to compensate for impurities;

allowing reaction to preferably and optionally proceed to complete conversion, preferably to at least 90% conversion, more preferably to 95% conversion or more, to form a monovinyl aromatic homopolymer block A, optionally with a peak average molecular weight Mp of 5 to 15 kg/mol, preferably with a peak average molecular weight of 8 to 12 kg/mol and more preferably with a peak average molecular weight of 10 to 11 kg/mol;

preferably adding a second addition of a monovinyl aromatic monomer into the reactor, preferably styrene, typically 5 to 15 wt %, preferably 6 to 12 wt %, more preferably 7 to 9.5 wt % and most preferably at 7.5 to 9.1 wt % of the total monomer mixture with 7.5 wt % of the total monomer mixture being a preferred value, generally within a period of 5 min and preferably in less than 2 min;

dosing a conjugated diene monomer B into the reactor, preferably without an initial addition of a conjugated diene monomer and preferably without a wait time after an initial addition of a conjugated diene, where the total amount of the conjugated diene monomer dosed is more than 55 wt % of the total monomer mixture, typically between 60 and 90 wt %, generally between 65 and 85 wt %, preferably between 70 and 80 wt % with a preferred amount being 75 wt % of the total monomer mixture, where the conjugated diene monomer is dosed at a dose rate of 20 to 75 g/min, often at a dose rate of 30 to 70 g/min, generally at a dose rate of 45 to 68 g/min, usually at a dose rate of 47 to 67 g/min, preferably at a dose rate of 54 to 67 g/min, where the time in which the conjugated diene monomer is dosed is less than 90, 80, 70, 60, 50, 40, 30, 20 or 15 min and is generally less 13 min and is preferably dosed within a time period of 4 to 12 min, more preferably within 5 to 11 min, preferably where the conjugated diene is butadiene or isoprene and more preferably is 1,3-butadiene;

allowing reaction to proceed to at least 80% conversion, generally to over 90% conversion, preferably to at least 98% conversion, more preferably to at least 99% conversion and most preferably to complete conversion, preferably to a final peak temperature Tp of over 100° C., more preferably to 103 to 106° C. or 103 to 105° C., thereby forming a counter tapered copolymer block A/B and obtaining a living counter tapered diblock A-A/B copolymer, preferably in a single reactor and preferably without a need to use 2 reactors, generally where the peak average molecular weight of the counter tapered diblock A-A/B copolymer is between 70 and 140 kg/mol, preferably where the peak average molecular weight of the counter tapered diblock A-A/B copolymer is between 80 and 130 kg/mol and more preferably where the peak average molecular weight of the counter tapered diblock A-A/B copolymer is between 90 and 125 kg/mol with a range of 100 to 115 kg/mol being most typical.

An optional, but preferable, next step, which is preferably carried out in the same reactor without a transfer to a second reactor, comprises:

adding a suitable coupling agent or combination of coupling agents, preferably silicon tetrachloride, to the reactor to partially couple the living counter tapered diblock A-A/B copolymer to form counter tapered thermoplastic elastomers, where the amount of the coupling agent is 0.0020 to 0.0100 wt %, generally 0.0025 to 0.0085 wt % and preferably 0.0030 to 0.0080 wt % of the total reaction mixture, generally where the ratio of uncoupled linear diblock A-[A/B] to coupled radial (A-[A/B])n-X counter tapered thermoplastic elastomer is between 0.2 and 5.0, preferably where the ratio is between 0.3 and 4.0 and more preferably where the ratio is 0.5 to 3.0 or 0.4 to 3.0, generally where the weight average molecular weight Mw of the counter tapered thermoplastic elastomers is between 80 and 300 kg/mol, generally between 85 and 275 kg/mol, preferably between 90 and 270 kg/mol and more preferably between 95 and 267 kg/mol.

generally where the A/B-X-B/A midblock formed after coupling has a center region with a maximum ratio of butadiene units to styrene units, where the maximum cumulative B/S ratio is at least 3, preferably at least 5 and more preferably at least 10.

With reference to Table 2 and further to the embodiments described above, the coupled CTTE 1-14 has a total monovinyl aromatic monomer, preferably styrene, content of 15 to 35 wt %, generally 20 to 30 wt %, preferably 22 to 28 wt % and more preferably 23 to 26 wt %, with the remainder being conjugated diene monomer, preferably butadiene, content. Generally, coupled CTTE comprises 20 to 30 wt % monovinyl aromatic monomer units and 70 to 80 wt % conjugated diene monomer units, preferably 22 to 28 wt % monovinyl aromatic monomer units and 72 to 78 wt % conjugated diene monomer units, and more preferably 23 to 26 wt % monovinyl aromatic monomer units and 74 to 77 wt % conjugated diene monomer units. Further to the embodiment above, a linear diblock A-[A/B] is formed, which is living at the terminal B portion, and the coupling agent binds to the living terminal B portion and couples at least two of the linear diblock A-[A/B] units together to form (A-[A/B])-X-([B/A]-A) and/or the coupled radial (A-[A/B])n-X counter tapered thermoplastic elastomer. After coupling, the CTTE has a central block that comprises units of both monovinyl aromatic monomer, preferably styrene, and conjugated diene monomer, preferably butadiene and a block on each end that is a homopolymer of the monovinyl aromatic monomer, preferably polystyrene. The midblock is the [A/B]-X-[B/A] portion, which may be a combination of linear and radial units depending on whether two or more [A/B] units bind to the coupling agent. This midblock portion in Table 2 is 2 to 20 wt % monovinyl aromatic monomer, preferably styrene, and 80 to 98 wt % conjugated diene monomer, preferably butadiene, generally is 5 to 15 wt % monovinyl aromatic monomer, preferably styrene, and 85 to 95 wt % conjugated diene monomer, preferably butadiene, and preferably 6 to 12 wt % monovinyl aromatic monomer, preferably styrene, and 88 to 94 wt % conjugated diene monomer, preferably butadiene, with 7 to 11 wt % monovinyl aromatic monomer, preferably styrene, and 89 to 93 wt % conjugated diene monomer, preferably butadiene, being most preferred. The midblock blockiness in Table 2 for CTTE 1-14 ranges from 10 to 60 wt %, generally 10 to 56 wt %, and preferably 10 to 45 wt %.

Further to the embodiment above and with reference to FIGS. 1-4 and Table 2, the coupled CTTE 1-14 and 17, a linear diblock A-[A/B] is formed, which is living at the terminal B portion, and the coupling agent binds to the living terminal B portion and couples at least two of the linear diblock A-[A/B] units together to form (A-[A/B])-X-([B/A]-A) and/or the coupled radial (A-[A/B])n-X counter tapered thermoplastic elastomer. After coupling, the CTTE has a central block that comprises units of both monovinyl aromatic monomer, preferably styrene, and conjugated diene monomer, preferably butadiene and a block on each end that is a homopolymer of the monovinyl aromatic monomer, preferably polystyrene. The midblock is the [A/B]-X-[B/A] portion, which may be a combination of linear and radial units depending on whether two or more [A/B] units bind to the coupling agent. FIGS. 1-4 illustrated the monomer distribution along the copolymer chain of the midblock [A/B]-X-[B/A] portion prior to coupling of CTTE 14, 16, 17 and 19, which show that the midblock have terminal regions that are rich in styrene monomer units (low butadiene/styrene cumulative ratio) and a center region that is rich in butadiene monomer units (high butadiene/styrene cumulative ratio). CTTE 14 has a maximum butadiene/styrene B/S cumulative ratio of about 16.0 mol/mol for a midblock styrene of about 10.7 wt %; CTTE 16 has a maximum butadiene/styrene B/S cumulative ratio of about 15.1 mol/mol for a midblock styrene of about 11.3 wt %; CTTE 17 has a maximum butadiene/styrene B/S cumulative ratio of about 18.1 mol/mol for a midblock styrene of about 9.6 wt %; and CTTE 14 has a maximum butadiene/styrene B/S cumulative ratio of about 16.7 mol/mol for a midblock styrene of about 10.3 wt %. The CTTE maximum butadiene/styrene B/S cumulative ratio of the midblock portion in Table 2 is 5 to 30 mol/mol, generally is 8 to 25 mol/mol, and preferably 10 to 23 mol/mol, with 12 to 21 mol/mol, being most preferred. Generally where the A/B-X-B/A midblock formed after coupling has a center region with a maximum ratio of butadiene units to styrene units, where the maximum cumulative B/S ratio is at least 3, preferably at least 5 and more preferably at least 10.

EMBODIMENTS OF THE INVENTION

1. A process for making a counter tapered thermoplastic elastomer composition comprising:
    loading a solvent into a reactor and heating the solvent to an initial reaction temperature (Ti), which is preferably between 50 and 75° C., wherein the amount of solvent is preferably more than 75 wt % of a total reaction mixture, wherein the solvent is preferably cyclohexane;
    adding a polar modifier into the reactor, which is preferably ditetrahydrofurylpropane (DTHFP) or tetrahydrofuran (THF);
    adding first amount of a monovinyl aromatic monomer to the reactor, which is preferably styrene, wherein the first amount of monovinyl aromatic monomer is preferably between 15 and 20 wt % of a total monomer mixture;
    adding a lithium-based initiator into the reactor mixture;
    allowing a reaction to proceed and thereby forming a monovinyl aromatic homopolymer block A, wherein the peak average molecular weight Mp of block A is preferably between 5 to 15 kg/mol;
    adding a second amount of the or a monovinyl aromatic monomer into the reactor, wherein the second amount of monovinyl aromatic monomer is preferably between 2 and 15 wt % of the total monomer mixture, wherein the second amount is preferably added within a period of 5 min and more preferably in less than 2 min;
    dosing a conjugated diene monomer B into the reactor, preferably without an initial addition of a conjugated diene monomer and preferably without a wait time after an initial addition of a conjugated diene, wherein the total amount of the conjugated diene monomer dosed is preferably more than 55 wt % of the total monomer mixture and more preferably between 55 and 90 wt %, wherein the conjugated diene monomer is preferably dosed at a dose rate of 20 to 75 g/min, and wherein the time in which the conjugated diene monomer is dosed is preferably less than 55 min and more preferably in less than 25 min;
    allowing a reaction to proceed to at least 75% conversion, preferably to a final peak temperature Tp of over 80° C., thereby forming a counter tapered copolymer block A/B and obtaining a living counter tapered diblock A-NB copolymer, preferably in a single reactor and preferably without a need to use 2 reactors, wherein the peak average molecular weight of the counter tapered diblock A-A/B copolymer is preferably between 50 and 200 kg/mol.

2. The process for making a counter tapered thermoplastic elastomer composition of embodiment 1, further comprising:
    adding a coupling agent, which may be a single coupling agent, a combination of coupling agents, an acrylic oligomer or a combination of these, to the reactor to couple, preferably partially, the living counter tapered diblock A-A/B copolymer to form counter tapered thermoplastic elastomers, preferably carried out in the same reactor, preferably without a transfer to a second reactor, wherein the amount of the coupling agent is preferably 0.0005 to 0.0500 wt % of the total reaction mixture,
    wherein the ratio of uncoupled linear diblock A-[A/B] to coupled radial (A-[A/B])n-X counter tapered thermoplastic elastomer is preferably between 0.1 and 10.0,
    wherein the weight average molecular weight Mw of the counter tapered thermoplastic elastomers is preferably between 30 and 1,000 kg/mol, and
    wherein the A/B-X-B/A midblock formed after coupling preferably has a center region with a cumulative ratio of butadiene units to styrene units, wherein the cumulative B/S ratio is generally at least 1, usually at least 2.5 preferably at least 5 and more preferably at least 10.

3. The process for making a counter tapered thermoplastic elastomer composition of embodiment 1 or 2, wherein the total monovinyl aromatic monomer content of the final product is preferably between 10 to 48 wt %.

4. The process for making a counter tapered thermoplastic elastomer composition of embodiment 1, 2 or 3, with respect to a coupled CTTE, wherein the total monovinyl aromatic monomer content of the coupled CTTE is preferably between 10 to 40 wt %, and wherein the coupled CTTE preferably comprises between 60 to 90 wt % conjugated diene monomer units.

5. The process for making a counter tapered thermoplastic elastomer composition of any one of embodiments 1-4, with respect to the coupled CTTE, wherein a midblock portion of the CTTE is preferably between 2 to 20 wt % monovinyl aromatic monomer and preferably 80 to 98 wt % conjugated diene monomer, and wherein a midblock blockiness preferably ranges from 5 to 75 wt %.

Example 2

Applications in Polymer Modified Asphalt (PMA) for Road Paving

The low Mw counter tapered thermoplastic elastomers (CTTE 1-7) in Tables 1 and 2, prepared as described in Example 1, were used as asphalt modifiers or asphalt reinforcing agents in polymer modified asphalt (PMA) for road paving formulations. To this end, PG 64-22 neat asphalt (provided by PEMEX) was formulated by a hot mix and high shear rate process. For this process, a trigonal high shear mill was employed. First, neat asphalt was heated without agitation to 120° C. to soften the asphalt under a nitrogen atmosphere. During this stage very slow agitation was employed to prevent asphalt overheating and oxidation. Once the asphalt was soft, heating continued to 190° C.+/−5° C. and the mixer agitation was increased to 2500 RPM. As 190° C. was reached, the counter tapered thermoplastic elastomer (CTTE) composition was gradually added to the asphalt at a rate of about 10 g/min. The agitation was maintained for 120-180 minutes for the effective and total dispersion of the CTTE as reinforcing agent. To ensure that the same level of dispersion was achieved in all formulations, the CTTE dispersion in asphalt was monitored through fluorescence microscopy using a Zeiss microscope Axiotecy 20X model.

The CTTE polymer modified asphalt (PMA) mixtures thus obtained were characterized by Ring and Ball Softening Point Temperature ($T_{RBSP}$) according to ASTM D36. Penetration was measured according to ASTM D5 at 25° C., 10 seconds and 100 grams using a Koheler Penetrometer model K95500. Maximum application temperature ("Max use T") was measured as the temperature at which the Rutting Factor or Dynamic Shear Stiffness (G*/sin δ) takes the value of 1.0 kPa, where G* is the complex modulus and sin δ is the phase angle according to AASHTO TP5 by using a Paar Physica rheometer model MCR-300-SP, and AASHTO SUPERPAVE performance grade PG was determined. Dynamic viscosity at 135° C. was measured according to ASTM D4402 by using a Brookfield viscometer model RDVS-II+. Elastic recovery at 25° C. in torsion mode was measured according to AASHTO-TF31R. Elastic recovery at 25° C. and Ductility at 4° C. were measured by using a Ductilometer.

CTTE polymer modified asphalt (CTTE 1-7 PMA) results are given in Table 2a below and show the enhanced performance of the novel counter tapered thermoplastic elastomer compositions as asphalt modifiers for road paving at 2.2 wt % of CTTE polymer content based on total PMA mixture.

Example 1, were used as asphalt modifiers or asphalt reinforcing agents in polymer modified emulsions (PME) for road paving formulations. First, a PMA mixture for each CTTE composition was prepared as described in Example 2. Next, the aqueous emulsifier solution was prepared by first heating demineralized water to 45° C., then approximately 0.5 wt % of a polyamine type emulsifying agent (Redicote E4819, commercially available from Akzo Nobel) was added to the warm water while stirring gently, and followed by the addition of approximately 0.4 wt % of a concentrated mineral acid (HCl, 37%). The aqueous solution was stirred until complete emulsifier dissolution and the acidity was in the pH range of 2.0±0.1, which was ready for emulsification of the PMA mixture. Finally, the emulsification process was carried out atmospherically by using an IKA colloid mill. The PMA mixture at 150° C. and the aqueous emulsifier solution at 40° C. (65:35 wt:wt) were both pumped to the colloid mill operated at 90° C. to form the polymer modified asphalt emulsion (PME). Then, the freshly prepared PME was placed in an oven at 80° C. for 16 h. After cooling to ambient temperature, the PME was passed through a 20-mesh copper sieve and the amount of sieve residue was tested. The polymer modified asphalt emulsion (PME) thus obtained was then treated to separate water and recover the residual PMA mixture.

The CTTE polymer modified asphalt emulsions (PME) thus prepared were tested for 20-mesh Sieve Residue, Saybolt Furol Viscosity at 50° C., and Storage Stability at 5 days. Once the water was separated from the PME, the residual PMA mixture was characterized by Ring and Ball Softening Point Temperature ($T_{RBSP}$) according to ASTM D36, Penetration was measured according to ASTM D5 at 25° C., 10 seconds and 100 grams using a Koheler Penetrometer model K95500. Elastic recovery at 25° C. and Ductility at 4° C. were measured by using a Ductilometer.

TABLE 2a

Performance of Low Mw CTTE in Asphalt Reinforcement for Road Paving

| CTTE Polymer Modified Asphalt @ 2.2 wt % | CTTE 1 PMA | CTTE 2 PMA | CTTE 3 PMA | CTTE 4 PMA | CTTE 5 PMA | CTTE 6 PMA | CTTE 7 PMA |
|---|---|---|---|---|---|---|---|
| Brookfield Viscosity @ 135° C. (cP) | 1669 | 1479 | 1388 | 1431 | 1437 | 1436 | 1559 |
| Penetration @ 25° C. (dmm) | 42 | 44 | 50 | 45 | 46 | 45 | 41 |
| R&B Softening Point (° C.) | 64 | 63 | 60 | 63 | 62 | 62 | 68 |
| Ductility @ 4° C. (cm) | 8 | 8 | 10 | 9 | 9 | 9 | 6 |
| Elastic Recovery @ 25° C. by Torsion (%) | 30 | 30 | 28 | 32 | 32 | 31 | 35 |
| Elastic Recovery @ 25° C. by Ductilometer (%) | 59 | 50 | 58 | 65 | 64 | 63 | 67 |
| AASHTO SUPERPAVE Performance Grade PG | 82-10 | 82-10 | 82-16 | 82-16 | 82-16 | 82-16 | 82-16 |

Reviewing Table 2a, the results show a noticeably low viscosity, high elastic response, wide range of PG polymer modified asphalts, and good balance between high and low temperature properties. The much lower viscosity of the asphalt formulations besides contributing to facilitate the dispersion of the polymer into the asphalt and improve the time required for mixing, also facilitates the processing, handling and application of the modified asphalt mixtures by improving pumping capacity and/or decreasing the energy required to apply it. This also means an important cost reduction and a more environmentally-friendly process.

Example 3

Applications in Polymer Modified Asphalt Emulsions (PME) for Road Paving

The low Mw counter tapered thermoplastic elastomers (CTTE 3-6) in Tables 1 and 2, prepared as described in CTTE polymer modified asphalt emulsions (CTTE 3-6 PME) results are given in Table 3a below and show the enhanced performance of the novel counter tapered thermoplastic elastomer compositions as asphalt modifiers in emulsions for road paving.

TABLE 3a

Performance of Low Mw CTTE in Asphalt Reinforcement for Road Paving

| CTTE Polymer Modified Asphalt (Emulsion & Residual) | CTTE 3 PME | CTTE 4 PME | CTTE 5 PME | CTTE 6 PME |
|---|---|---|---|---|
| Saybolt Furol Viscosity @ 50° C. (SSF) | 56 | 64 | 63 | 62 |
| Storage Stability @ 5 days (%) | 1.7 | 2.0 | 1.9 | 2.0 |
| Sieve Test @ Mesh 20 (%) | 0.050 | 0.060 | 0.055 | 0.060 |
| Penetration @ 25° C. (dmm) | 85 | 75 | 74 | 73 |

TABLE 3a-continued

Performance of Low Mw CTTE in Asphalt Reinforcement for Road Paving

| CTTE Polymer Modified Asphalt (Emulsion & Residual) | CTTE 3 PME | CTTE 4 PME | CTTE 5 PME | CTTE 6 PME |
|---|---|---|---|---|
| R&B Softening Point (° C.) | 50 | 53 | 53 | 52 |
| Ductility @ 4° C. (cm) | 12 | 11 | 10 | 11 |
| Elastic Recovery @ 25° C. by Ductilometer (%) | 41 | 50 | 51 | 49 |
| Elastic Recovery @ 25° C. by Ductilometer Original (%) | 48 | 54 | 55 | 53 |

Reviewing Table 3a, the results for the PME show low viscosity, good storage stability, and acceptable sieve residue. Also, the results for the PMA show similar high elastic response before (original) and after the emulsification process (residual), and excellent balance between high and low temperature properties.

Example 4

Preparation of Counter Tapered Thermoplastic Elastomers (CTTE)

In Example 4, several novel counter tapered thermoplastic elastomers (CTTE 20-38) were prepared according to the process claimed in the present invention. Polymers CTTE 20-38 were (A-[A/B])n-X block copolymers wherein the A-[A/B] diblock prior to coupling consisted of a monovinyl aromatic homopolymer block A block that was a polystyrene block (PS) and a counter tapered copolymer block [A/B] that was a styrene/butadiene copolymer block, which after coupling formed a [A/B]-X-[B/A] midblock having terminal regions that are rich in styrene units and a center region that is rich in butadiene units. CD1 and CD2 were comparative examples of controlled distribution block copolymers of the prior art prepared by following a procedure similar to the one described in US 2003/0176582 A1 patent application publication on Sep. 18, 2003 by KRATON Polymers U.S. LLC and Bening et al. CD2 was a polymer prepared with only a counter tapered copolymer block [A/B] of styrene/butadiene for illustrative purposes of the monomer distribution of the midblock copolymer chain prior to coupling.

These novel counter tapered thermoplastic elastomer (CTTE 20-38) compositions were characterized by GPC, $^1$H NMR and DSC methodologies to determine: molecular weight averages and molecular weight distribution characteristics such as peak average molecular weight (Mp) for linear diblocks and coupled modes, weight average molecular weight (Mw) and Diblock to Coupled Ratios; microstructural characteristics such as Total Styrene, Block Styrene, and Vinyl A/B block contents; glass transition temperatures (Tg) for A/B counter tapered copolymer block; and melt flow rates (MFI) of the CTTE counter tapered thermoplastic compositions. In addition, calculations of the Midblock Styrene and Midblock Blockiness were also performed following the method used to characterize the polymer mid or "B" block as Calc. Mid PSC and Calc. Mid Blocky in US 2003/0176582 A1 patent application publication on Sep. 18, 2003 by KRATON Polymers U.S. LLC and Bening et al. Tables 4-5 enlist the analytical characterization results and Table 6 the polymerization conditions for CTTE 20-38 and CD 1-2. The following describes a general procedure, similar to the one described in example 1, used to prepare these novel counter tapered thermoplastic elastomers (CTTE 20-38) and to control the monomer distribution in the anionic copolymerization of 1,3-butadiene (B) and styrene (S) in the presence of ditetrahydrofurylpropane (DTHFP) or tetrahydrofuran (THF) as a suitable polar modifier and randomizing agent for the styrene/butadiene [S/B] counter tapered copolymer block. The abbreviations used in Table 6 below for the polymerization conditions are defined as follows: CHx=cyclohexane; STY=styrene; and BD=1,3-butadiene. For the novel counter tapered thermoplastic elastomers CTTE 20-32 and 37-38 and also for CD 1 comparative example, silicon tetrachloride (SiCl4) was used as a coupling agent. For CTTE 33-36, an acrylic oligomer similar to the one described in U.S. Pat. No. 8,981,008 was used as a coupling agent.

The novel counter tapered thermoplastic elastomer (CTTE 20-38) compositions of the present invention and controlled distribution comparative examples CD 1-2 were prepared in a 7.57 Liter reactor system operated under inert nitrogen atmosphere in batch and/or semi-batch mode according to the teachings of this invention. Immediately before addition to the reactor system, solvent and monomers were thoroughly purified to decrease their moisture content to a maximum of 5 ppm by flowing through a set of columns packed with alumina and molecular sieves. For the first polymerization step, an appropriate amount of purified solvent (CHx) was charged into the reactor and heated to the initial reaction temperature (Ti) of about 50° C. Ti was set to a lower temperature of about 30° C. for CD 1 polymer. Once Ti was reached, a suitable polar modifier (randomizing agent) such as ditetrahydrofurylpropane (DTHFP) or tetrahydrofuran (THF) was added into the reactor followed by a first addition of monovinyl aromatic monomer (1st STY) of from about 17.5 to about 30.0 wt % of total monomer mixture. For CD1, the first addition of monovinyl aromatic monomer (1st STY) of about 27 wt % of total monomer mixture was similar to CTTE 37-38 in order to directly compare and differentiate our composition/process to prior art. For CD 2, there was no first addition of styrene monomer in order to prepare isolated styrene/butadiene counter tapered copolymer blocks to analyze directly the Midblock Styrene, the Midblock Blockiness and the monomer distribution along the copolymer chain of the [A/B] counter tapered copolymer block by $^1$H NMR without the calculations needed to eliminate the interference of the monovinyl aromatic homopolymer block A (PS block) in CTTE 20-38 and CD 1, which was enabled by taking aliquots throughout the copolymerization and then performing NMR characterization. This reaction mixture was allowed to stabilize at Ti, and then n-butyllithium or another suitable initiator was added in a suitable solvent solution directly into the reactor mixture containing at least the amount of polar modifier necessary to efficiently initiate the anionic polymerization of the living polystyrene blocks. The amount of initiator was stoichiometrically calculated as described in the literature to form individual blocks with the desired molecular weight and to compensate for residual impurities. This first polymerization step was then allowed to proceed adiabatically up to complete conversion to form the monovinyl aromatic homopolymer block A with peak average molecular weight Mp about a target value of from about 10,000 to about 20,000.

For the second polymerization step, the addition of both monomers was simultaneously initiated for CTTE 20-38, a second monovinyl aromatic monomer (2nd STY) addition of about 6.3 to about 22 wt % of total monomer mixture was rapidly charged into the reactor at a specified dose rate of from about 41 to 146 g/min during a predetermined dosification time of about 1 min, and a conjugated diene monomer (BD) addition of about 50 to about 70 wt % of total monomer mixture was slowly charged into the reactor at a specified dose rate of from about 48 to about 70 g/min for a predetermined dosification time of from about 6.5 min to about 7 min. These monomer additions were carried out in a programmed batch and/or semi-batch mode, and the amount of polar modifier (randomizing agent) was adjusted from about 0.01 to about 0.20 wt % of total reaction mixture, in order to promote the formation of a statistically distributed tapered S/B copolymer block with gradual change in composition and vinyl microstructure (1,2-addition) along the copolymer chain. This second polymerization step was then allowed to proceed adiabatically up to complete conversion and the final peak temperature (Tp) was allowed to increase to from about 96 to about 107° C., thereby forming the counter tapered copolymer [A/B] block and thus obtaining the living counter tapered A-[A/B] diblock copolymer with peak average molecular weight Mp about a target value of from about 70,000 to about 213,000. For the second polymerization step of the controlled distribution comparative examples CD 1-2, the addition of styrene monomer was initiated 1 min after the addition of butadiene monomer started, thus a second monovinyl aromatic monomer (2nd STY) addition of about 22 to about 30 wt % of total monomer mixture was slowly charged into the reactor at a specified dose rate of from about 9 to 10 g/min during a predetermined dosification time of from about 15 to about 16 min, and a conjugated diene monomer (BD) addition of about 50 to about 70 wt % of total monomer mixture was very slowly charged into the reactor at a specified dose rate of from about 10 to about 11 g/min for a predetermined dosification time of from about 31 min to about 33 min. These monomer additions were carried out in a programmed batch and/or semi-batch mode, and the amount of polar modifier (randomizing agent) was adjusted from about 0.047 to about 0.048 wt % of total reaction mixture, in order to promote the formation of a statistically distributed tapered S/B copolymer block with gradual change in composition and low vinyl microstructure (1,2-addition) along the copolymer chain. This second polymerization step was then allowed to proceed adiabatically up to complete conversion and the final peak temperature (Tp) was allowed to increase to from about 80 to about 82° C., thereby forming the controlled distribution [B/A] block and thus obtaining the living controlled distribution A-[B/A] diblock copolymer with peak average molecular weight Mp about a target value of from about 95,000 to about 124,000.

Finally, a suitable coupling agent such as silicon tetrachloride (SiCl4) or an acrylic oligomer in a sufficient amount of from about 0.0027 to about 0.032 of total reaction mixture was added to the reactor to partially couple the living counter tapered A-[A/B] diblock copolymer to obtain the desired ratios of uncoupled linear diblock A-[A/B] to coupled radial (A-[A/B])n-X counter tapered thermoplastic elastomer compositions of the present invention, wherein X is the residual moiety from the coupling reaction process. The remaining living polymer chains were terminated by adding a 10 mol % excess over the stoichiometric amount of a suitable alcohol to the final reaction mixture. A similar procedure was followed for coupling the controlled distribution styrene/butadiene copolymer diblock of CD 1 comparative example.

Tables 4 and 5 list the analytical characterization results for the novel counter tapered thermoplastic elastomer compositions CTTE 20-38. All the average molecular weights (Mp and Mw) are given in units of 1000 (k) and calculated relative to polystyrene standards by GPC. The peak average molecular weights Mp for the monovinyl aromatic homopolymer block A or polystyrene block of CTTE 20-38 are from about 10.2 to about 19.8 kg/mol. The peak average molecular weights Mp for the A-[A/B] diblock copolymer or S-[S/B] styrene-butadiene diblock copolymer of CTTE 20-38 are from about 70 to about 213 kg/mol. The peak average molecular weights Mp for the [B/A] controlled distribution copolymer or [B/S] styrene-butadiene copolymer of CD 1-2 are from about 95 to about 124 kg/mol. The ratios of Mp of coupled radial (A-[A/B])n-X to Mp of uncoupled linear diblock A-[A/B] of CTTE 20-38 are from about 3.1 to about 11.9. The weight average molecular weights Mw of CTTE 20-38 are from about 179 to about 521 kg/mol. The ratios of uncoupled linear diblock A-[A/B] to coupled radial (A-[A/B])n-X of CTTE 20-38 are from about 0.2 to about 3.2, which is the coupling efficiency as determined from GPC area. The vinyl [A/B] block contents of CTTE 20-38 are from about 18.5 to about 54.0 wt % based on total butadiene units. The glass transition temperatures of the [A/B] counter tapered copolymer block of CTTE 20-38 are from about −81.9 to about −47.8° C. The melt flow rates (MFI) of the CTTE 20-38 compositions are from about 0 (NF) to about 94.9 g/10 min. The contents determined by NMR of CTTE 20-38 for: total styrene based on total copolymer are from about 14.1 to about 49.5 wt %; block styrene based on total styrene units are from about 53.2 to about 91.0 wt %; midblock styrene based on midblock copolymer are from about 5.2 to about 34.4 wt %, and midblock blockiness based on midblock styrene units are from about 6.6 to about 73.8 wt %.

FIG. 5 depict the monomer distribution in [A/B] midblock segment prior to coupling of inventive counter tapered block copolymers CTTE 20, 37 and 38, and the monomer distribution in [B/A] midblock segment prior to coupling of comparative controlled distribution examples CD 1 and 2, which were enabled by taking aliquots throughout the copolymerization and then performing NMR characterization. For CD 2, there was no first addition of styrene monomer in order to isolate the styrene/butadiene controlled distribution copolymer block and analyze directly the monomer distribution along the copolymer chain in the [B/A] midblock segment by $^1$H NMR without the calculations needed to substract the monovinyl aromatic homopolymer block A (PS block) in CTTE 37-38 and CD 1. The calculations of the monomer distribution in CTTE 37-38 and CD 1 were performed following the method used to characterize the polymer mid or "B" block in US 2003/0176582 A1 patent application publication on Sep. 18, 2003 by KRATON Polymers U.S. LLC and Bening et al.

FIG. 5 clearly show that the cumulative composition of incorporated styrene monomer in the [A/B] midblock segment of the CTTE 37-38 decreases gradually with increasing conversion of the butadiene/styrene midblock polymerization. After coupling, this [A/B] midblock segment forms a complete [A/B]-X-[B/A] midblock, which has terminal regions that are rich in styrene monomer units (low butadiene/styrene cumulative ratio) and a center region that is rich in butadiene monomer units (high butadiene/styrene cumulative ratio), which occurs exactly the opposite way in the controlled distribution compositions of the prior art and more significantly in our comparative examples CD 1 and CD 2 of controlled distribution compositions. This is also a surprising and unexpected result given the facts that both a relatively large amount of styrene monomer is present during the midblock segment copolymerization (about 30 wt % of monomer mixture) and a relatively low amount of polar modifier (randomizing agent) for preparing a low vinyl styrene/butadiene copolymer (about 20 wt % vinyl) was used for these copolymerizations. It is also significant to note that even though the terminal regions of the styrene/butadiene midblock are richer in styrene (low butadiene/styrene cumulative ratio), a low level of midblock blockiness can be attained. Also, it is shown that styrene incorporation into the counter tapered [A/B] midblock segment depends not only on the amount of styrene monomer and the amount and type of randomizing agent, but also on the temperature profile of the copolymerization and the monomer dosification times. FIG. 5 shows a generally higher styrene incorporation into the copolymer chain of the [A/B] midblock segment of CTTE 37 and 38 as compared to CTTE 20. FIG. 5 also shows a more dramatic and opposite change in styrene incorporation of [B/A] midblock segment of CD 1 and CD 2, in response to a significant increase in both butadiene and styrene monomer dosification times combined with the use of THF as randomizing agent at lower temperatures, when the amount of polar modifier (randomizing agent) is relatively small (low vinyl).

TABLE 4

Counter Tapered Thermoplastic Elastomers Composition

| Polymer Name | Mp A block (kg/mol) | Mp A-A/B diblock (kg/mol) | Mp coupled/ Mp A-A/B diblock | Mw CTTE (kg/mol) | Ratio A-A/B diblock to coupled | Vinyl A/B block (wt %) | Tg (° C.) | MFI @ 200° C., 5 kg (g/10 min) |
|---|---|---|---|---|---|---|---|---|
| CTTE 20 | 11.5 | 126 | 3.61 | 231 | 1.9 | 28.8 | −73.2 | |
| CTTE 21 | 10.2 | 112 | 3.57 | 287 | 0.7 | 18.5 | −81.9 | |
| CTTE 22 | 11.9 | 125 | 3.64 | 221 | 2.1 | 27.4 | −62.2 | 2.0 |
| CTTE 23 | 11.7 | 120 | 3.64 | 216 | 2.1 | 27.8 | −60.4 | 7.8 |
| CTTE 24 | 11.7 | 112 | 3.75 | 206 | 2.3 | 30.4 | −59.4 | 5.3 |
| CTTE 25 | 10.6 | 110 | 3.55 | 179 | 2.7 | 53.3 | −55.4 | |
| CTTE 26 | 10.6 | 110 | 3.59 | 184 | 2.7 | 54.0 | −47.8 | 7.4 |
| CTTE 27 | 11.3 | 213 | 3.87 | 374 | 2.5 | 28.0 | −77.6 | |
| CTTE 28 | 10.2 | 197 | 3.27 | 514 | 0.6 | 31.4 | −75.6 | |
| CTTE 29 | 11.1 | 210 | 3.83 | 368 | 2.4 | 31.9 | −71.4 | |
| CTTE 30 | 11.2 | 210 | 3.55 | 521 | 0.8 | 32.3 | −71.3 | |
| CTTE 31 | 19.8 | 117 | 3.38 | 309 | 0.6 | 28.4 | −73.9 | |
| CTTE 32 | 19.0 | 115 | 3.10 | 342 | 0.2 | 33.0 | −70.4 | |
| CTTE 33 | 11.4 | 70 | 9.54 | 242 | 2.2 | 32.1 | −72.2 | 94.9 |
| CTTE 34 | 11.7 | 72 | 9.63 | 365 | 1.1 | 31.2 | −73.5 | 28.9 |
| CTTE 35 | 10.7 | 119 | 11.92 | 285 | 3.2 | 30.7 | −71.8 | |
| CTTE 36 | 11.0 | 117 | 11.66 | 344 | 2.4 | 52.6 | −57.0 | |
| CTTE 37 | 19.1 | 123 | 3.31 | 344 | 0.4 | 20.6 | −67.8 | NF |
| CTTE 38 | 18.0 | 122 | 3.21 | 356 | 0.3 | 26.1 | −55.4 | NF |
| CD1 | 19.3 | 124 | 3.13 | 306 | 0.5 | 20.4 | −62.5 | NF |
| CD2 | | 95 | | 98 | | 20.9 | | |

[a] Molecular Weight averages relative to PS standards, Coupling Efficiency ratios based on % cumulative GPC areas;
[b] RMN [1]H 300 MHz, Vinyl in wt % based on total butadiene units;
[c] Glass Transition Temperature (inflexion point) by DSC @ 10° C./min;
[d] NF: Non-flow observation for melt flow index testing.

TABLE 5

Counter Tapered Thermoplastic Elastomers NMR Results

| Polymer Name | Total Styrene (wt %) | Block Styrene (wt %) | Midblock Styrene (wt %) | Midblock Blockiness (wt %) |
|---|---|---|---|---|
| CTTE 20 | 25.1 | 70.8 | 11.1 | 21.7 |
| CTTE 21 | 23.9 | 91.0 | 9.7 | 73.8 |
| CTTE 22 | 30.4 | 60.5 | 17.2 | 17.3 |
| CTTE 23 | 34.0 | 53.2 | 21.5 | 12.3 |
| CTTE 24 | 34.4 | 53.9 | 20.9 | 8.8 |
| CTTE 25 | 30.0 | 63.9 | 16.5 | 21.7 |
| CTTE 26 | 33.8 | 55.3 | 21.4 | 16.2 |
| CTTE 27 | 14.7 | 68.3 | 5.6 | 8.2 |
| CTTE 28 | 14.1 | 69.6 | 5.2 | 8.3 |
| CTTE 29 | 19.1 | 54.5 | 10.7 | 10.6 |
| CTTE 30 | 19.0 | 55.9 | 10.5 | 12.3 |
| CTTE 31 | 37.5 | 75.1 | 14.3 | 10.7 |

TABLE 5-continued

Counter Tapered Thermoplastic Elastomers NMR Results

| Polymer Name | Total Styrene (wt %) | Block Styrene (wt %) | Midblock Styrene (wt %) | Midblock Blockiness (wt %) |
|---|---|---|---|---|
| CTTE 32 | 37.0 | 74.6 | 14.3 | 10.9 |
| CTTE 33 | 35.8 | 78.2 | 13.2 | 20.1 |
| CTTE 34 | 35.9 | 78.0 | 13.1 | 18.1 |
| CTTE 35 | 25.3 | 66.0 | 11.7 | 13.1 |
| CTTE 36 | 25.6 | 65.2 | 11.3 | 6.6 |
| CTTE 37 | 49.5 | 69.9 | 34.4 | 43.8 |
| CTTE 38 | 48.8 | 55.2 | 34.4 | 18.4 |
| CD1 | 48.3 | 59.6 | 32.7 | 22.3 |
| CD2 | 26.1 | 35.9 | 26.1 | 35.9 |

[a] RMN $^1$H 300 MHz, Total Styrene in wt % based on total copolymer;
[b] RMN $^1$H 300 MHz, Block Styrene in wt % based on total styrene units;
[c] Calculated Midblock Styrene in wt % based on midblock copolymer;
[d] Calculated Midblock Blockiness in wt % based on midblock styrene units.

TABLE 6

Counter Tapered Thermoplastic Elastomers Process

| | CTTE 23 | CTTE 24 | CTTE 25 | CTTE 26 | CTTE 32 | CTTE 33 | CTTE 34 | CTTE 37 | CTTE 38 | CD1 | CD2 |
|---|---|---|---|---|---|---|---|---|---|---|---|
| CHx (wt %)[a] | 85.7 | 85.7 | 85.6 | 85.6 | 85.7 | 85.6 | 85.6 | 85.5 | 85.3 | 85.4 | 89.1 |
| Randomizing agent (wt %)[a] | 0.0106 | 0.0106 | 0.0324 | 0.0318 | 0.0105 | 0.0165 | 0.0165 | 0.0019 | 0.1958 | 0.0471 | 0.0484 |
| 1st STY (wt %)[b] | 17.5 | 17.5 | 17.6 | 17.5 | 30.0 | 30.0 | 30.0 | 27.0 | 27.0 | 27.0 | 0.0 |
| Initial Temperature Ti (° C.) | 50.2 | 50.1 | 50.4 | 50.0 | 50.3 | 50.3 | 49.8 | 50.2 | 50.3 | 30.1 | 50.4 |
| BD (wt %)[b] | 65.9 | 65.9 | 70.1 | 65.9 | 63.7 | 63.7 | 63.7 | 50.9 | 50.9 | 50.9 | 69.7 |
| BD dose rate (g/min) | 66 | 61 | 70 | 66 | 59 | 59 | 59 | 48 | 48 | 11 | 10 |
| BD dosification time (min) | 6.5 | 7 | 6.5 | 6.5 | 7 | 7 | 7 | 7 | 7 | 31 | 33 |
| 2nd STY (wt %)[b] | 16.5 | 16.5 | 12.4 | 16.5 | 6.3 | 6.3 | 6.3 | 22.1 | 22.1 | 22.1 | 30.3 |
| 2nd STY dose rate (g/min) | 107 | 107 | 80 | 107 | 41 | 41 | 41 | 146 | 146 | 9 | 10 |
| STY dosification time (min) | 1 | 1 | 1 | 1 | 1 | 1 | 1 | 1 | 1 | 16 | 15 |
| Final Peak Temperature Tp (° C.) | 106.8 | 102.9 | 100.0 | 99.2 | 96.2 | 102.9 | 103.9 | 101.5 | 100.5 | 82.4 | 80.4 |
| Coupling agent (wt %)[a] | 0.0027 | 0.0000 | 0.0027 | 0.0027 | 0.0097 | 0.0190 | 0.0316 | 0.0092 | 0.0097 | 0.0053 | 0.0000 |

[a] wt % of Total Reaction Mixture
[b] wt % of Total Monomer Mixture

One embodiment of the invention based on Example 4 and Table 6 is a process for making counter tapered thermoplastic elastomers in either batch or semi-batch mode, which comprises: preferably and optionally purifying solvent and monomers to decrease their moisture content to a maximum of 50 ppm, preferably less than 25 ppm and more preferably less than 5 ppm; loading the solvent into a reactor and heating the solvent to an initial reaction temperature (Ti), which is between 40 and 60° C., possibly between 45 and 55° C., preferably between 47 and 53° C. and more preferably between 48 and 52° C. and about 50° C., which is more than 75 wt % of a total reaction mixture, preferably 80 to 95 wt %, more preferably 84 to 90 wt % and most preferably 85 to 87 wt % with values of about 85 or 86 wt % being typical, where the solvent is preferably cyclohexane;

preferably adding a suitable polar modifier into the reactor, which is preferably ditetrahydrofurylpropane (DTHFP) or tetrahydrofuran (THF) and more preferably DTHFP;

adding a monovinyl aromatic monomer to the reactor, which is preferably styrene, which is typically 10 to 35 wt %, preferably 15 to 33 wt % and more preferably 16 to 31 wt % of a total monomer mixture with 17.5, 27.0 and 30.0 wt % being possible amounts;

preferably and optionally allowing the solvent, polar modifier and monovinyl aromatic monomer to stabilize at the temperature Ti plus or minus 10° C., preferably plus or minus 5° C. and more preferably plus or minus 2° C. with stabilization at Ti being most preferred;

adding a lithium-based initiator in a suitable solvent solution into the reactor mixture, preferably n-butyllithium, preferably where the amount of initiator is stoichiometrically calculated to form individual blocks and to compensate for impurities;

allowing the reaction to preferably and optionally proceed to complete conversion, preferably to at least 90% conversion, more preferably to 95% conversion or more, to form a monovinyl aromatic homopolymer block A, optionally with a peak average molecular weight Mp of 5 to 25 kg/mol, preferably with a peak average molecular weight of 8 to 22 kg/mol and more preferably with a peak average molecular weight of 10 to 20 kg/mol;

preferably adding a second addition of a monovinyl aromatic monomer into the reactor, preferably styrene, typically 5 to 25 wt %, preferably 6 to 22 wt %, with values of 6.3, 12.4, 16.5 and 22.1 wt % of the total monomer mixture being possible suitable values, generally within a period of 5 min, preferably in less than 2 min and more preferably within a time period of about 1 min;

dosing a conjugated diene monomer B into the reactor, preferably beginning at the same time as the second addition of a monovinyl aromatic monomer is added, preferably without an initial addition of a conjugated diene monomer and preferably without a wait time after an initial addition of a conjugated diene, where the total amount of the conjugated diene monomer dosed is more than 40 wt % of the total monomer mixture, typically between 45 and 90 wt %, generally between 45 and 80 wt %, preferably between 50 and 72 wt % of the total monomer mixture, where the conjugated diene monomer is dosed at a dose rate of 30 to 90 g/min, often at a dose rate of 35 to 80 g/min, generally at a dose rate of 45 to 75 g/min, and preferably at a dose rate of 48 to 70 g/min, where the time in which the conjugated diene monomer is dosed is less than 90, 80, 70, 60, 50, 40, 30, 20 or 15 min and is generally less 13 min and is generally dosed within a time period of 4 to 12 min, preferably within 5 to 9 min, more preferably within 6.5 to 7 min, preferably where the conjugated diene is butadiene or isoprene and more preferably is 1,3-butadiene;

allowing the reaction to proceed to at least 80% conversion, generally to over 90% conversion, preferably to at least 98% conversion, more preferably to at least 99% conversion and most preferably to complete conversion, preferably to a final peak temperature Tp of over 90° C., more preferably to 95 to 110° C. or 100 to 105° C., thereby forming a counter tapered copolymer block A/B and obtaining a living counter tapered diblock A-A/B copolymer, preferably in a single reactor and preferably without a need to use 2 reactors, generally where the peak average molecular weight of the counter tapered diblock A-NB copolymer is between 60 and 230 kg/mol, preferably where the peak average molecular weight of the counter tapered diblock A-NB copolymer is between 65 and 220 kg/mol and more preferably where the peak average molecular weight of the counter tapered diblock A-NB copolymer is between 70 and 215 kg/mol with a range of 100 to 130 kg/mol being most typical.

An optional, but preferable, next step, which is preferably carried out in the same reactor without a transfer to a second reactor, comprises:

adding a suitable coupling agent or combination of coupling agents, preferably silicon tetrachloride or an acrylic oligomer, to the reactor to partially couple the living counter tapered diblock A-NB copolymer to form counter tapered thermoplastic elastomers, where the amount of the coupling agent is 0.0020 to 0.050 wt %, generally 0.0023 to 0.040 wt % and preferably 0.0025 to 0.0350 wt % of the total reaction mixture, generally where the ratio of uncoupled linear diblock A-[A/B] to coupled radial (A-[A/B])n-X counter tapered thermoplastic elastomer is between 0.1 and 4.5, preferably where the ratio is between 0.1 and 4.0 and more preferably where the ratio is 0.2 to 2.7, generally where the weight average molecular weight Mw of the counter tapered thermoplastic elastomers is between 100 and 500 kg/mol, generally between 150 and 400 kg/mol and preferably between 170 and 375 kg/mol.

generally where the A/B-X-B/A midblock formed after coupling has a center region with a maximum ratio of butadiene units to styrene units, where the maximum cumulative B/S ratio is at least 3, preferably at least 5 and more preferably at least 10.

With reference to Table 5 and further to the embodiments described above, the coupled CTTE 20-38 has a total monovinyl aromatic monomer, preferably styrene, content of 10 to 55 wt %, generally 14 to 50 wt %, preferably 17 to 45 wt % and more preferably 20 to 40 wt %, with the remainder being conjugated diene monomer, preferably butadiene, content. Generally, coupled CTTE comprises 14 to 50 wt % monovinyl aromatic monomer units and 50 to 86 wt % conjugated diene monomer units, preferably 17 to 45 wt % monovinyl aromatic monomer units and 55 to 83 wt % conjugated diene monomer units, and more preferably 20 to 40 wt % monovinyl aromatic monomer units and 60 to 80 wt % conjugated diene monomer units. Further to the embodiment above, a linear diblock A-[A/B] is formed, which is living at the terminal B portion, and the coupling agent binds to the living terminal B portion and couples at least two of the linear diblock A-[A/B] units together to form (A-[A/B])-X-([B/A]-A) and/or the coupled radial (A-[A/B])n-X counter tapered thermoplastic elastomer. After coupling, the CTTE has a central block that comprises units of both monovinyl aromatic monomer, preferably styrene, and conjugated diene monomer, preferably butadiene and a block on each end that is a homopolymer of the monovinyl aromatic monomer, preferably polystyrene. The midblock is the [A/B]-X-[B/A] portion, which may be a combination of linear and radial units depending on whether two or more [A/B] units bind to the coupling agent. This midblock portion in Table 5 is 4 to 40 wt % monovinyl aromatic monomer, preferably styrene, and 60 to 96 wt % conjugated diene monomer, preferably butadiene, generally is 5 to 35 wt % monovinyl aromatic monomer, preferably styrene, and 65 to 95 wt % conjugated diene monomer, preferably butadiene, and preferably 5 to 32 wt % monovinyl aromatic monomer, preferably styrene, and 68 to 95 wt % conjugated diene monomer, preferably butadiene, with 5 to 30 wt % monovinyl aromatic monomer, preferably styrene, and 70 to 95 wt % conjugated diene monomer, preferably butadiene, being most preferred. The midblock blockiness in Table 5 for CTTE 20-38 ranges from 5 to 80 wt %, generally 6 to 75 wt %, and preferably 6 to 45 wt %.

Further to the embodiment above and with reference to FIG. 5 and Table 4, the coupled CTTE 20-38, a linear diblock A-[A/B] is formed, which is living at the terminal B portion, and the coupling agent binds to the living terminal B portion and couples at least two of the linear diblock A-[A/B] units together to form (A-[A/B])-X-([B/A]-A) and/or the coupled radial (A-[A/B])n-X counter tapered thermoplastic elastomer. After coupling, the CTTE has a central block that comprises units of both monovinyl aromatic monomer, preferably styrene, and conjugated diene monomer, preferably butadiene and a block on each end that is a homopolymer of the monovinyl aromatic monomer, preferably polystyrene. The midblock is the [A/B]-X-[B/A] portion, which may be a combination of linear and radial units depending on whether two or more [A/B] units bind to the coupling agent. FIGS. 1-4 illustrated the monomer distribution along the copolymer chain of the midblock [A/B]-X-[B/A] portion prior to coupling of CTTE 37 and 38, which show that the midblock have terminal regions that are rich in styrene monomer units (low butadiene/styrene cumulative ratio) and a center region that is rich in butadiene monomer units (high butadiene/styrene cumulative ratio). CTTE 37 has a maximum butadiene/styrene B/S cumulative ratio of about 3.7 mol/mol for a midblock styrene of about 34.4 wt %; and CTTE 38 has a maximum butadiene/styrene B/S cumulative ratio of about 3.7 mol/mol for a midblock styrene of about 34.3 wt %. The CTTE maximum butadiene/styrene B/S cumulative ratio of the midblock portion in Table 4 is 2 to 30 mol/mol, generally is 3 to 25 mol/mol, and preferably 3 to 23 mol/mol, with 3 to 21 mol/mol, being most preferred. Generally where the A/B-X-B/A midblock formed after coupling has a center region with a maximum ratio of butadiene units to styrene units, where the maximum cumulative B/S ratio is at least 3, preferably at least 5 and more preferably at least 10.

EMBODIMENTS OF THE INVENTION

6. A process for making a counter tapered thermoplastic elastomer composition comprising:
    loading a solvent into a reactor and heating the solvent to an initial reaction temperature (Ti), which is preferably between 50 and 75° C., wherein the amount of solvent is preferably more than 75 wt % of a total reaction mixture, wherein the solvent is preferably cyclohexane;
    adding a polar modifier into the reactor, which is preferably ditetrahydrofurylpropane (DTHFP) or tetrahydrofuran (THF);
    adding first amount of a monovinyl aromatic monomer to the reactor, which is preferably styrene, wherein the first amount of monovinyl aromatic monomer is preferably between 5 and 40 wt % of a total monomer mixture;
    adding a lithium-based initiator into the reactor mixture;
    allowing a reaction to proceed and thereby forming a monovinyl aromatic homopolymer block A, wherein the peak average molecular weight Mp of block A is preferably between 5 to 30 kg/mol;
    adding a second amount of the or a monovinyl aromatic monomer into the reactor, wherein the second amount of monovinyl aromatic monomer is preferably between 2 and 35 wt % of the total monomer mixture, wherein the second amount is preferably added within a period of 5 min and more preferably in less than 2 min;
    dosing a conjugated diene monomer B into the reactor, preferably without an initial addition of a conjugated diene monomer and preferably without a wait time after an initial addition of a conjugated diene, preferably beginning concurrently with the addition of the second amount of monovinyl aromatic monomer, wherein the total amount of the conjugated diene monomer dosed is preferably more than 35 wt % of the total monomer mixture and more preferably between 40 and 95 wt %,
    wherein the conjugated diene monomer is preferably dosed at a dose rate of 20 to 95 g/min, and
    wherein the time in which the conjugated diene monomer is dosed is preferably less than 45 min and more preferably in less than 22 min;
    allowing a reaction to proceed to at least 75% conversion, preferably to a final peak temperature Tp of over 75° C., thereby forming a counter tapered copolymer block A/B and obtaining a living counter tapered diblock A-NB copolymer, preferably in a single reactor and preferably without a need to use 2 reactors, wherein the peak average molecular weight of the counter tapered diblock A-A/B copolymer is preferably between 40 and 400 kg/mol and more preferably between 50 and 300 kg/mol.
7. The process for making a counter tapered thermoplastic elastomer composition of embodiment 6, further comprising:
    adding a coupling agent, which may be a single coupling agent, a combination of coupling agents, an acrylic oligomer or a combination of these, to the reactor to couple, preferably partially, the living counter tapered diblock A-A/B copolymer to form counter tapered thermoplastic elastomers, preferably carried out in the same reactor, preferably without a transfer to a second reactor, wherein the amount of the coupling agent is preferably 0.0005 to 0.0900 wt % of the total reaction mixture,
    wherein the ratio of uncoupled linear diblock A-[A/B] to coupled radial (A-[A/B])n-X counter tapered thermoplastic elastomer is preferably between 0.05 and 15.0,
    wherein the weight average molecular weight Mw of the counter tapered thermoplastic elastomers is preferably between 30 and 1,000 kg/mol, and
    wherein the A/B-X-B/A midblock formed after coupling preferably has a center region with a cumulative ratio of butadiene units to styrene units, wherein the cumulative B/S ratio is generally at least 1, usually at least 2.5 preferably at least 5 and more preferably at least 10.
8. The process for making a counter tapered thermoplastic elastomer composition of embodiment 6 or 7, wherein the total monovinyl aromatic monomer content of the final product is preferably between 5 to 75 wt % and more preferably between 10 and 55 wt %.
9. The process for making a counter tapered thermoplastic elastomer composition of embodiment 6, 7 or 8, with respect to a coupled CTTE, wherein the total monovinyl aromatic monomer content of the coupled CTTE is preferably between 5 to 70 wt %, and wherein the coupled CTTE preferably comprises between 30 to 95 wt % conjugated diene monomer units.
10. The process for making a counter tapered thermoplastic elastomer composition of any one of embodiments 6-9, with respect to the coupled CTTE, wherein a midblock portion of the coupled CTTE is preferably between 2 to 60 wt % monovinyl aromatic monomer and preferably 40 to 98 wt % conjugated diene monomer, and wherein a midblock blockiness preferably ranges from 5 to 80 wt %.
11. The process for making a counter tapered thermoplastic elastomer composition of any one of embodiments 6-10, wherein the proportion of monovinyl aromatic monomer in the midblock decreases as the midblock is formed.

Example 5

Applications in Polymer Modified Asphalt (PMA) for Road Paving

The high Mw counter tapered thermoplastic elastomer compositions (CTTE 8-13) in Table 1 and 2, prepared as described in Example 1, were used as asphalt modifiers or asphalt reinforcing agents in polymer modified asphalt (PMA) for road paving formulations. CTTE 8-13 PMA formulations were prepared and characterized following the procedures described in Example 2.

CTTE polymer modified asphalt (CTTE 8-13 PMA) results are given in Table 5a below and show the enhanced performance of the novel counter tapered thermoplastic elastomer compositions as asphalt modifiers for road paving at 2.2 wt % of CTTE polymer content based on total PMA mixture.

TABLE 5a

Performance of High Mw CTTE in Asphalt Reinforcement for Road Paving

| CTTE Polymer Modified Asphalt @ 2.2 wt % | CTTE 8 PMA | CTTE 9 PMA | CTTE 10 PMA | CTTE 11 PMA | CTTE 12 PMA | CTTE 13 PMA |
|---|---|---|---|---|---|---|
| Brookfield Viscosity @ 135° C. (cP) | 1820 | 1899 | 1639 | 1989 | 1830 | 1780 |
| Penetration @ 25° C. (dmm) | 44 | 43 | 54 | 39 | 45 | 46 |
| R&B Softening Point (° C.) | 65 | 66 | 63 | 70 | 67 | 64 |
| Ductility @ 4° C. (cm) | 6.5 | 6 | 7 | 4 | 6 | 7 |
| Elastic Recovery @ 25° C. by Torsion (%) | 34 | 37 | 35 | 39 | 36 | 32 |
| Elastic Recovery @ 25° C. by Ductilometer (%) | 65 | 69 | 59 | 71 | 67 | 64 |
| AASHTO SUPERPAVE Performance Grade PG | 82-10 | 82-16 | 82-16 | 82-16 | 82-16 | 82-10 |

Reviewing Table 5a, the results show low viscosity, higher elastic response, wide range of PG polymer modified asphalts, and excellent balance between high and low temperature properties. The combination of low viscosity with high elastic response of the asphalt formulations with CTTE compositions provides a desirable balance between processability and reinforcement performance.

Example 6

Applications in Polymer Modified Asphalt (PMA) for Roofing and Waterproofing Membranes The high Mw counter tapered thermoplastic elastomer compositions (CTTE 8-13) in Table 1 and 2, prepared as described in Example 1, were used as asphalt modifiers or asphalt reinforcing agents in polymer modified asphalt (PMA) for roofing and waterproofing membranes formulations. CTTE 8-13 polymer modified asphalt (PMA) formulations were prepared following the procedures described in Example 2.

The CTTE 8-13 polymer modified asphalt (PMA) mixtures thus obtained were characterized by Ring and Ball Softening Point Temperature ($T_{RBSP}$) according to ASTM D36. Penetration was measured according to ASTM D5 at 60° C., 10 seconds and 100 grams using a Koheler Penetrometer model K95500. Dynamic viscosity at 160 and 190° C. was measured according to ASTM D4402 by using a Brookfield viscometer model RDVS-II+. Flexibility at low temperature was determined by measuring BDA Cold Bending Temperature.

CTTE polymer modified asphalt (CTTE 8-13 PMA) results are given in Table 6a below and show the enhanced performance of the novel counter tapered thermoplastic elastomer compositions as asphalt modifiers for roofing and waterproofing membranes at 8 wt % of CTTE polymer content based on total PMA mixture.

Reviewing Table 6a, the results show low viscosity, high softening point, improved flexibility at low temperature, and excellent balance between high and low temperature properties. The combination of low viscosity with high softening point of the asphalt formulations with CTTE compositions provides a very desirable balance between processability and reinforcement performance.

Example 7

Applications in Polymer Modified Asphalt (PMA) for Road Paving and Roofing Membranes High Mw counter tapered thermoplastic elastomer compositions were prepared in a 180 Liter reactor system operated under inert nitrogen atmosphere in batch or semi-batch mode according to the teachings of this invention. CTTE Prototype Dyne 143A was obtained following the procedure described in Example 1 and used as asphalt modifier or asphalt reinforcing agent in polymer modified asphalt (PMA) for road paving and roofing membranes formulations. CTTE Prototype Dyne 143A PMA formulations were prepared and characterized following the procedures described in Example 2 and Example 6.

CTTE Prototype Dyne 143A PMA results are given in Table 7 below and show the enhanced performance of the novel counter tapered thermoplastic elastomer compositions as asphalt modifiers for road paving at 2.3 wt % and roofing membranes at 6 and 12 wt % of CTTE polymer content based on total PMA mixture. The CTTE Prototype Dyne 143A PMA processability performance is compared with PMA mixtures of two commercially available block copolymers, Solprene 411 and Solprene 1205. Solprene 411 is a multiarm highly-coupled block copolymer (also known as radial SBn thermoplastic elastomer) with about 30 wt % total styrene content as pure block and no tapered characteristics. Solprene 1205 is a normal tapered diblock B/S-S TABLE 6a Performance of High Mw CTTE in Asphalt Reinforcement for Roofing and Waterproofing Membranes

| CTTE Polymer Modified Asphalt @ 8 wt % | CTTE 8 PMA | CTTE 9 PMA | CTTE 10 PMA | CTTE 11 PMA | CTTE 12 PMA | CTTE 13 PMA |
|---|---|---|---|---|---|---|
| Brookfield Viscosity @ 160° C. (cP) | 8938 | 10150 | 9972 | 11247 | 10095 | 8160 |
| Brookfield Viscosity @ 190° C. (cP) | 2660 | 3083 | 2933 | 3975 | 3105 | 2510 |
| Penetration @ 60° C. (dmm) | 152 | 133 | 152 | 121 | 140 | 146 |
| R&B Softening Point Temperature (° C.) | 94 | 102 | 99 | 104 | 102 | 92 |
| BDA Cold Bending Temperature (° C.) | −14 | −12 | −14 | −10 | −12 | −14 | copolymer (also known as gradual SBR) with about 25 wt % total styrene content and about 17.5 wt % block styrene content.

TABLE 7

Performance of High Mw CTTE in Asphalt Reinforcement for Road Paving and Roofing Membranes

| CTTE Polymer Modified Asphalt Mixtures | Neat Asphalt PG 64-22 | PMA Polymer Content (wt %) | CTTE Prototype | | |
|---|---|---|---|---|---|
| | | | Solprene 411 PMA | Dyne 143A PMA | Solprene 1205 PMA |
| Dispersion Time, min | — | 2.3 | 240 | 180 | 180 |
| Dispersion Time, min | — | 6 | 360 | 240 | 240 |
| Brookfield Viscosity @ 135° C. (cP) | 556 | 2.3 | 2359 | 1856 | 1350 |
| Brookfield Viscosity @ 160° C. (cP) | 556 | 12 | 22100 | 13165 | 11509 |

In addition to Table 7, FIGS. 6 and 7 depict the 20× fluorescence microscopy images of CTTE Prototype Dyne 143A PMA monitored throughout the mixing process at 190° C. and prepared with 2.3 and 6 wt % of polymer, respectively. Each arrow points at the image corresponding to the mixing time when complete polymer dispersion is observed for each PMA mixture. The dispersion performance of CTTE prototype Dyne 143A in PMA is compared with PMA mixtures of commercially available polymers, Solprene 411 and Solprene 1205. The fluorescence microscopy images allow to observe the morphology of both polymer-rich phase and asphalt-rich phase. The polymer-rich phase is observed as the brighter regions and asphalt rich phase as the darker regions. A qualitative comparison of the fluorescent microscopy images in FIG. 6 for the corresponding PMA mixing time of CTTE prototype Dyne 143A versus Solprene 411 and Solprene 1205, revealed that the polymer-rich phase in CTTE prototype Dyne 143A PMA at 2.3 wt % was completely dispersed at 180 min, which is much shorter (about 25%) than the dispersion time in Solprene 411 PMA and the same dispersion time as required in Solprene 1205 PMA. The reduction in particle size is evidence of enhanced compatibility with asphalt, in agreement with the findings of L. H. Lewandowski (1994), Rubber Chemistry and Technology, Rubber Reviews, Vol. 67, No. 3, pp. 447-480. A qualitative comparison of the images in FIG. 7 corresponding to PMA at 6 wt %, revealed a relatively similar mixing behavior but longer dispersion times, the polymer-rich phase in CTTE prototype Dyne 143A PMA at 6 wt % was completely dispersed at 240 min, which is even much shorter (about 33%) than the dispersion time in Solprene 411 PMA and the same dispersion time as required in Solprene 1205 PMA. CTTE prototype Dyne 143A has a PMA dispersion performance dependence on polymer concentration similar to Solprene 1205.

Reviewing Table 7, the results show a low viscosity at 135° C. for CTTE prototype Dyne 143A PMA at 2.3 wt %, which is intermediate between a higher (about 30%) viscosity for Solprene 411 PMA and a lower (about 30%) viscosity for Solprene 1205 PMA. Surprisingly, viscosity at 160° C. for CTTE prototype Dyne 143A PMA at 12 wt %, which is also intermediate but between a much higher (about 70%) viscosity for Solprene 411 PMA and a much closer (about 10%) viscosity for Solprene 1205 PMA. CTTE prototype Dyne 143A has a PMA viscosity development dependence on polymer concentration similar to Solprene 1205. Low viscosity also provides an advantage for mixing and compaction of hot mix asphalt used in road paving.

Figure 8:
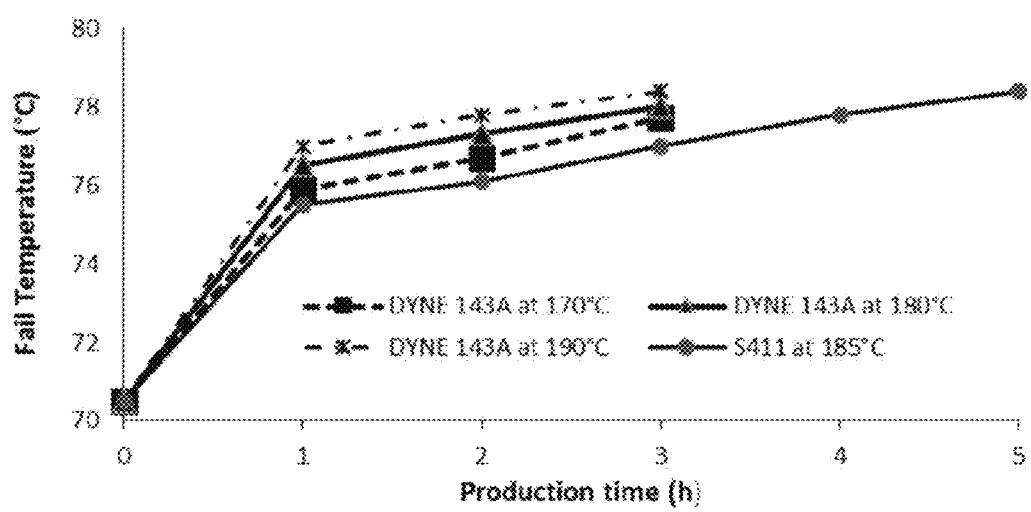
FIG. 8 depicts the maximum performance grade (AASHTO Standards PG) temperatures of several polymer modified asphalt (PMA) monitored throughout the mixing process at different temperatures (170-190° C.) and prepared with 2.3 wt % of polymer. Fail temperature performance with increasing production (mixing) time of CTTE prototype Dyne 143A PMA is compared with PMA mixtures of commercially available polymers and described in Example 7.

FIG. 8 depicts the maximum performance grade (AASHTO Standards PG) temperatures of several polymer modified asphalt (PMA) monitored throughout the mixing process at different temperatures and prepared with 2.3 wt % of polymer. The reinforcement performance of CTTE Prototype Dyne 143A PMA mixed at 170, 180 and 190° C. is compared with a commercially available block copolymer Solprene 411 PMA mixed at 185° C. Reviewing FIG. 8, the results show higher fail temperature (maximum performance grade temperature) of CTTE prototype Dyne 143A PMA throughout the mixing process than Solprene 411 PMA, at every mixing temperature, even when mixed at 15° C. lower mixing temperature (170° C.). Surprisingly, CTTE prototype Dyne 143A PMA provides a similar reinforcement performance to Solprene 411 PMA combined with an important cost and/or processing advantage.

In summary, the results described in Example 7 show that the novel counter tapered thermoplastic elastomer composition provides a novel polymer modified asphalt CTTE prototype Dyne 143A PMA with: a dispersion performance dependence on polymer concentration similar to Solprene 1205; a viscosity development dependence on polymer concentration similar to Solprene 1205; and surprisingly, with a similar reinforcement performance to Solprene 411 PMA combined with an important cost and/or processing advantage. The surprising combination of CTTE Prototype Dyne 143A PMA processability and reinforcement performance provides a very desirable balance for the asphalt modification industry, for both road paving and roofing membranes applications. On top of the outstanding reinforcement performance of the resulting PMA mixtures, the much lower viscosity of the asphalt formulations besides contributing to facilitate the dispersion of the polymer into the asphalt and improve the time required for mixing, even at lower temperature, also facilitates the processing, handling and application of the modified asphalt mixtures by improving pumping capacity and/or decreasing the energy required to apply it, and/or by promoting thermal storage stability. This also means an important cost reduction and a more environmentally-friendly process.

Example 8

Applications in Polymer Modified Asphalt (PMA) for Road Paving

The High Mw CTTE Prototype Dyne 143A described in Example 7 was used as asphalt modifier or asphalt reinforcing agent in polymer modified asphalt (PMA) for road paving formulations. CTTE Prototype Dyne 143A PMA formulations were prepared and characterized following the procedures described in Example 2.

CTTE Prototype Dyne 143A PMA results are given in Table 8 below and show the enhanced performance of the novel counter tapered thermoplastic elastomer compositions as asphalt modifiers for road paving at 2.3, 2.5 and 2.8 wt % of CTTE polymer content based on total PMA mixture. The CTTE Prototype Dyne 143A PMA reinforcement performance is compared with PMA mixtures of two commercially available block copolymers, Solprene 411 and Solprene 1205.

TABLE 8

Performance of High Mw CTTE in Asphalt Reinforcement for Road Paving

| CTTE Polymer Modified Asphalt Mixtures | Neat Asphalt | PMA Polymer Content (wt %) | CTTE Prototype Solprene 411 PMA | CTTE Prototype Dyne 143A PMA | CTTE Prototype Solprene 1205 PMA |
|---|---|---|---|---|---|
| Elastic Recovery @ 25° C. by Torsion (%) | — | 2.5 | 45 | 41 | 30 |
| Elastic Recovery @ 25° C. by Ductilometer (%) | — | 2.5 | 65 | 68 | 44 |
| AASHTO SUPERPAVE Performance Grade PG | 64-22 | 2.3 | 76-22 | 88-22 | 70-22 |
| AASHTO SUPERPAVE Performance Grade PG | 64-22 | 2.8 | 76-22 | 88-22 | 76-22 |

Reviewing Table 8, surprisingly the results show a high elastic response at 25° C. for CTTE prototype Dyne 143A PMA at 2.5 wt %, which is similar to that for Solprene 411 PMA and much higher (about 35%) than that for Solprene 1205 PMA. Also surprisingly, a wide range of performance grade PG is achieved for CTTE prototype Dyne 143A PMA mixtures at 2.3 and 2.8 wt %, which is even wider than the ranges for Solprene 411 PMA and Solprene 1205 PMA. CTTE prototype Dyne 143A provides better PMA reinforcement performance and improved high temperature properties than both Solprene 411 and Solprene 1205 for road paving applications, which translates into high plastic deformation resistance, high fatigue resistance and lower thermal cracking.

Example 9

Applications in Polymer Modified Asphalt (PMA) for Roofing and Waterproofing Membranes The High Mw CTTE Prototype Dyne 143A described in Example 7 was used as asphalt modifier or asphalt reinforcing agent in polymer modified asphalt (PMA) for roofing and waterproofing membrane formulations. CTTE Prototype Dyne 143A PMA formulations were prepared and characterized following the procedures described in Example 2 and Example 6.

CTTE Prototype Dyne 143A PMA results are given in Table 9 below and show the enhanced performance of the novel counter tapered thermoplastic elastomer compositions as asphalt modifiers for roofing and waterproofing membranes at 6 wt % of CTTE polymer content based on total PMA mixture, loaded with 20 and 30 wt % lime filler content. The CTTE Prototype Dyne 143A PMA processability performance is compared with that of the PMA mixture of a commercially available block copolymer Solprene 411.

TABLE 9

Performance of High Mw CTTE in Asphalt Reinforcement for Roofing and Waterproofing Membranes

| CTTE Polymer Modified Asphalt Mixtures | PMA Filler Content (wt %) | CTTE Prototype Solprene 411 PMA | CTTE Prototype Dyne 143A PMA |
|---|---|---|---|
| Brookfield Viscosity @ 160° C. (cP) | 20 | 18356 | 13060 |
| Brookfield Viscosity @ 190° C. (cP) | 20 | 9480 | 6069 |
| Brookfield Viscosity @ 160° C. (cP) | 30 | — | 18098 |
| Brookfield Viscosity @ 190° C. (cP) | 30 | — | 9408 |

Reviewing Table 9, the results show low viscosities at 160 and 190° C. for CTTE prototype Dyne 143A PMA loaded with 20 wt % lime filler, which are much lower (about 35-45%) than those for Solprene 411 PMA at same filler load. Also, viscosities at 160 and 190° C. similar to those for Solprene 411 PMA at 20 wt % filler load are developed for CTTE prototype Dyne 143A PMA loaded with higher (about 50%) filler load (30 wt % lime filler). CTTE prototype Dyne 143A provides better filled PMA processability performance than Solprene 411, which allows for higher filler load PMA formulations, and therefore important cost reduction and higher deformation resistance for roofing, shingles and waterproofing membrane applications.

Example 10

Applications in Polymer Modified Asphalt (PMA) for Roofing and Waterproofing Membranes The High Mw CTTE Prototype Dyne 143A described in Example 7 was used as asphalt modifier or asphalt reinforcing agent in polymer modified asphalt (PMA) for roofing and waterproofing membrane formulations. CTTE Prototype Dyne 143A PMA formulations were prepared and characterized following the procedures described in Example 2 and Example 6.

CTTE Prototype Dyne 143A PMA results are given in Table 10 below and show the enhanced performance of the novel counter tapered thermoplastic elastomer compositions as asphalt modifiers for roofing and waterproofing membranes at 4 and 5 wt % of CTTE polymer content based on total PMA mixture. The CTTE Prototype Dyne 143A PMA reinforcement performance is compared with that of the PMA mixture of a commercially available block copolymer Solprene 411.

TABLE 10

Performance of High Mw CTTE in Asphalt Reinforcement for Roofing and Waterproofing Membranes

| CTTE Polymer Modified Asphalt Mixtures | PMA Polymer Content (wt %) | CTTE Prototype Solprene 411 PMA | CTTE Prototype Dyne 143A PMA |
|---|---|---|---|
| R&B Softening Point Temperature (° C.) | 4 | 109 | 102 |
| BDA Cold Bending Temperature (° C.) | 4 | −9 | −12 |
| R&B Softening Point Temperature (° C.) | 5 | — | 109 |
| BDA Cold Bending Temperature (° C.) | 5 | — | −11 |

Reviewing Table 10, the results show an improved balance between high (softening point) and low temperature (cold bending) performance for CTTE prototype Dyne 143A PMA, which is better at low temperature and acceptable at high temperature than that for Solprene 411 PMA at same (4 wt %) polymer content. Surprisingly, an excellent balance between high (softening point) and low temperature (cold bending) performance for CTTE prototype Dyne 143A PMA is achieved at about 20% higher (5 wt %) polymer content, which is better at low temperature and similar at high temperature than that for Solprene 411 PMA prepared at lower (4 wt %) polymer content. The novel high Mw CTTE prototype Dyne 143A provides improved PMA reinforcement performance than Solprene 411, which allows for good workability at high temperature and better flexibility (improved fracture resistance) at low temperature for roofing, shingles and waterproofing membrane applications.

Example 11

Applications in Polymer Modified Asphalt (PMA) for Road Paving

Low Mw counter tapered thermoplastic elastomer compositions were prepared in a 180 Liter reactor system operated under inert nitrogen atmosphere in batch or semi-batch mode according to the teachings of this invention. The low Mw CTTE Prototype Dyne 143C was obtained following the procedure described in Example 1 and used as asphalt modifier or asphalt reinforcing agent in polymer modified asphalt (PMA) for road paving formulations. CTTE Prototype Dyne 143C PMA formulations were prepared and characterized following the procedures described in Example 2.

CTTE Prototype Dyne 143C PMA results are given in Table 11 below and show the enhanced performance of the novel counter tapered thermoplastic elastomer compositions as asphalt modifiers for road paving at 2.3, 2.5 and 2.8 wt % of CTTE polymer content based on total PMA mixture. The CTTE Prototype Dyne 143C PMA processability and reinforcement performance is compared with PMA mixtures of two commercially available block copolymers, Solprene 1205 and Kraton D1192. The former has already been described in Example 7, and the latter is described as a full sequential triblock copolymer high vinyl SBS with about 30 wt % total styrene as a pure polystyrene block with no tapered characteristics.

TABLE 11

Performance of Low Mw CTTE in Asphalt Reinforcement for Road Paving

| CTTE Polymer Modified Asphalt Mixtures | Neat Asphalt | PMA Polymer Content (wt %) | CTTE Prototype Solprene 1205 PMA | Dyne 143C PMA | Kraton D1192 PMA |
|---|---|---|---|---|---|
| Brookfield Viscosity @ 135° C. (cP) | 556 | 2.3 | 1350 | 1405 | 1375 |
| Elastic Recovery @ 25° C. by Torsion (%) | — | 2.5 | 30 | 40 | 31 |
| Elastic Recovery @ 25° C. by Ductilometer (%) | — | 2.5 | 44 | 62 | 48 |
| AASHTO SUPERPAVE Performance Grade PG | 64-22 | 2.3 | 70-22 | 70-22 | 70-22 |
| AASHTO SUPERPAVE Performance Grade PG | 64-22 | 2.8 | 76-22 | 76-22 | 76-22 |

Reviewing Table 11, the results show a very low viscosity at 135° C. for CTTE prototype Dyne 143C PMA at 2.3 wt %, which is surprisingly similar to those of both Solprene 1205 and Kraton D1192 PMA mixtures. More surprisingly, higher (about 20-40%) elastic response at 25° C. for CTTE prototype Dyne 143C PMA at 2.5 wt % than those of both Solprene 1205 and Kraton D1192 PMA mixtures. CTTE prototype Dyne 143C is expected to provide PMA viscosity development dependence on polymer concentration similar to those for Solprene 1205 and Kraton D1192 PMA mixtures, which is advantageous for processing and handling of PMA concentrates in the asphalt industry, and for mixing and compaction of hot mix asphalt used in road paving.

Also surprisingly, a wide range of performance grade PG is achieved for CTTE prototype Dyne 143C PMA mixtures at 2.3 and 2.8 wt %, which is the same range as those for Solprene 1205 and Kraton D1192 PMA mixtures. The novel CTTE prototype Dyne 143C provides PMA with a processability and reinforcement performance balance similar to those for Solprene 1205 and Kraton D1192 PMA mixtures for road paving applications, which translates into high plastic deformation resistance, high fatigue resistance and lower thermal cracking.

Example 12

Applications in Polymer Modified Asphalt (PMA) for Road Paving

The Low Mw CTTE Prototype Dyne 143C described in Example 11 was used as asphalt modifier or asphalt reinforcing agent in polymer modified asphalt (PMA) for road paving formulations. CTTE Prototype Dyne 143C PMA formulations were prepared following the procedures described in Example 2. The adhesive strength was measured at standard temperature and moisture laboratory conditions by using a TA.XTPlus texture analyzer from Stable Micro Systems.

CTTE Prototype Dyne 143C PMA results are given in Table 12 below and show the enhanced performance of the novel counter tapered thermoplastic elastomer compositions as asphalt modifiers for road paving at 2.3 wt % of CTTE polymer content based on total PMA mixture. The CTTE Prototype Dyne 143C PMA reinforcement performance is compared with PMA mixtures of two commercially available block copolymers, Solprene 411 and Solprene 1205.

TABLE 12

Performance of Low Mw CTTE in Asphalt Reinforcement for Road Paving

| CTTE Polymer Modified Asphalt Mixtures | CTTE Prototype | | |
|---|---|---|---|
| Adhesive Strength (Load in kg) | Solprene 1205 PMA | Dyne 143C PMA | Solprene 411 PMA |
| Test # 1 | 3559 | 3394 | 2050 |
| Test # 2 | 3920 | 3870 | 2125 |
| Test # 3 | 3570 | 3831 | 2189 |
| Test # 4 | 3879 | 3377 | 2224 |
| Test # 5 | 3466 | 3457 | 1990 |
| Test # 6 | 3670 | 3647 | 2187 |
| Test # 7 | 3957 | 3696 | 1995 |

TABLE 12-continued

Performance of Low Mw CTTE in Asphalt Reinforcement for Road Paving

| CTTE Polymer Modified Asphalt Mixtures | CTTE Prototype | | |
|---|---|---|---|
| Adhesive Strength (Load in kg) | Solprene 1205 PMA | Dyne 143C PMA | Solprene 411 PMA |
| Test # 8 | 3427 | 3893 | 2357 |
| Test # 9 | 3663 | 3479 | 2167 |
| Test # 10 | 3525 | 3816 | 2290 |
| Average | 3664 | 3646 | 2158 |

Reviewing Table 12, surprisingly the results show an average adhesive strength for CTTE prototype Dyne 143C PMA, which is very similar to that for Solprene 1205 PMA and much higher (about 70%) than that for Solprene 411 PMA. CTTE prototype Dyne 143C provides a PMA reinforcement performance with improved adherence properties similar to Solprene 1205 PMA mixture, which is an important characteristic in asphalt-aggregate surface interactions for road paving applications.

Example 13

Applications in Polymer Modified Asphalt Emulsions (PME) for Road Paving

The Low Mw CTTE Prototype Dyne 143C described in Example 11 was used as asphalt modifier or asphalt reinforcing agent in polymer modified asphalt emulsions (PME) for road paving formulations. CTTE Prototype Dyne 143C PME formulations were prepared according to the US standard specification RS-1P and characterized following the procedures described in Example 3. Original CTTE Prototype Dyne 143C PMA was mixed at 170° C. before the emulsification process.

CTTE Prototype Dyne 143C PME results are given in Table 13 below and show the enhanced performance of the novel counter tapered thermoplastic elastomer compositions as asphalt modifiers in emulsions for road paving at 3 wt % of CTTE polymer dry basis content based on total PMA residual, and PG 64-22 base asphalt fluxed with 5% aromatic flux. The CTTE Prototype Dyne 143C PME processability and reinforcement performance is compared with PME of two commercially available block copolymers, Solprene 4318 and Solprene 1205, and PME of a commercially available high-solids aqueous polymeric dispersion, 24 wt % styrene content SBR latex Butonal 4190.

TABLE 13

Performance of Low Mw CTTE in Asphalt Reinforcement for Road Paving

| CTTE Polymer Modified Asphalt (Emulsion & Residual) | US Standard Specification RS-1P | CTTE Prototype | | | |
|---|---|---|---|---|---|
| | | Butonal 4190 PME | Solprene 1205 PME | Solprene 4318 PME | Dyne 143C PME |
| Saybolt Furol Viscosity @ 50° C. (SSF) | 50 to 200 | 70 | 53 | 79 | 62 |
| Storage Stability @ 1 day (%) | 1 maximum | 0.9 | 0.5 | 0.6 | 0.6 |
| Sieve Test (%) | 0.1 maximum | 0.090 | 0.050 | 0.065 | 0.060 |
| Residue (%) | 65% minimum | 65 | 65 | 65 | 65 |
| Penetration @ 25° C. (dmm) | 225 to 300 | 293 | 280 | 251 | 230 |
| Softening Point (° F.) | | 52 | 50 | 53 | 52 |
| Ductility @ 4° C. (cm) | 50 minimum | 39 | 55 | 50 | 53 |
| Elastic Recovery @ 10° C. (%) | 55 minimum | 48 | 48 | 55 | 55 |

Reviewing Table 13, the results show low viscosity, excellent storage stability and excellent sieve residue for the polymer modified asphalt emulsion CTTE prototype Dyne 143C PME. The mixing at low temperature (170° C.) of CTTE prototype Dyne 143C PMA before the emulsification process at 150° C., provides an important processing advantage by reducing the PMA cooling time required by half, from about 6-8 h to about 3-4 h. Also, the results show high elastic response at 10° C., and better balance between high (softening point) and low (ductility) temperature properties for the polymer modified asphalt residual CTTE prototype Dyne 143C PMA. CTTE prototype Dyne 143C provides a PME processability and PMA reinforcement performance with improved balance of properties that is very competitive against PME prepared with commercially available polymers, which also meets the US standard specification RS-1P for PME road paving applications such as chip seal, tack coat and cold mix. The CTTE prototype Dyne 143C PMA improved adhesive strength described in Example 12 is expected to provide polymer modified asphalt emulsions (PME) with the adherence required for surface treatments such as chip seal application.

What is claimed is:

1. A counter tapered thermoplastic elastomer composition comprising:
    a counter tapered diblock A-[A/B] copolymer comprising at least one conjugated diene monomer B and at least one monovinyl aromatic monomer A, wherein counter tapered means that the ratio of B to A in the [A/B] block is lower proximal to the A block relative to the ratio of B to A distal to the A block, said diblock copolymer being further characterized in having: a peak molecular weight from 20,000 to 250,000; a monovinyl aromatic homopolymer block A with a peak molecular weight of at least 8,000; and a counter tapered copolymer block [A/B] with a vinyl content of at least 15 weight percent based on the amount of conjugated diene units in the diblock copolymer; and a block copolymer comprising at least two of said counter tapered diblock A-[A/B] copolymers, said block copolymer being further characterized in having: at least two homopolymer blocks A of the monovinyl aromatic monomer A and at least one copolymer block [A/B] of the monovinyl aromatic monomer A and the conjugated diene monomer B; wherein the block copolymer is selected from the group consisting of linear triblock copolymers having a peak molecular weight that is at least about 1.5 times the peak molecular weight of the counter tapered diblock A-[A/B] copolymer, multiarm block copolymers having a peak molecular weight that is at least about 2.5 times the peak molecular weight of the counter tapered diblock A-[A/B] copolymer, and mixtures thereof.

2. The composition of claim 1, wherein the weight average molecular weight of the counter tapered thermoplastic elastomer composition is from about 30,000 to about 500,000 g/mol;
the total amount of monovinyl aromatic monomer units in the counter tapered thermoplastic elastomer composition is from about 10 percent weight to about 48 percent weight; and
the total vinyl configuration content is from about 15 percent weight to about 90 percent weight based on the total amount of conjugated diene units in the counter tapered thermoplastic elastomer composition.

3. The composition of claim 1, wherein said counter tapered thermoplastic elastomer composition is either partially coupled with a coupling agent or partially initiated with a multifunctional initiator, and wherein the ratio of the counter tapered diblock A-[A/B] copolymer to the block copolymer in the counter tapered thermoplastic elastomer composition is from about 1:5 to about 5:1.

4. The composition of claim 1, wherein the block copolymer has the general configuration (A-[A/B])n-X or X-([A/B]-A)n where X is the residue of either a coupling agent or a multifunctional initiator and n is an integer from 2 to about 30, and mixtures thereof, wherein:
the peak molecular weight of the block copolymer is from about 40,000 to about 750,000 g/mol;
the amount of monovinyl aromatic monomer in the block copolymer is from about 10 percent weight to about 48 percent weight;
the vinyl configuration content is from about 15 percent weight to about 90 percent weight based on the total amount of conjugated diene in the block copolymer,
and wherein the vinyl content is higher proximal to the A block relative to the vinyl content distal to the A block in the counter tapered diblock A-[A/B] copolymer.

5. The composition of claim 1, wherein the vinyl content is higher proximal to the A block relative to the vinyl content distal to the A block in the counter tapered diblock A-[A/B] copolymer.

6. The composition of claim 1, wherein said conjugated diene units are selectively, partially or fully hydrogenated.

7. A process for making the counter tapered thermoplastic elastomer composition of claim 4, comprising: forming a block using at least one monovinyl aromatic monomer; and then reacting at least one conjugated diene monomer and at least one monovinyl aromatic monomer under anionic polymerization conditions in the presence of a polar modifier or combination of polar modifiers to form a second block, wherein the at least one conjugated diene monomer is added by dosing; and initiating polymerization with a monofunctional and/or a multifunctional initiator and/or adding a coupling agent or a combination of coupling agents and partially coupling the counter tapered diblock A-[A/B] copolymer, thereby forming the composition of claim 4.

8. A process for making a counter tapered thermoplastic elastomer composition comprising:
adding a solvent, a polar modifier or combination of polar modifiers, and monovinyl aromatic monomer to a reactor to form an initial reaction mixture, wherein the amount of the polar modifier in the initial reaction mixture is less than 10 wt %;
adding an organolithium initiator compound to the reactor and anionically polymerizing the monomer to form a monovinyl aromatic homopolymer block A with a peak molecular weight of at least 8,000;
adding additional monovinyl aromatic monomer and simultaneously beginning to dose to the reactor a conjugated diene monomer at a predetermined dose rate for a predetermined time, and copolymerizing to form and add a counter tapered copolymer block [A/B] to block A, thereby forming a counter tapered diblock A-[A/B] copolymer that has a vinyl content of at least 15 weight percent based on the amount of conjugated diene units in the diblock copolymer and a peak molecular weight from 20,000 to 250,000; and
adding a coupling agent or combination of coupling agents to partially couple the counter tapered diblock A-[A/B] copolymer to form a block copolymer that is either a linear triblock copolymer, a multiarm coupled block copolymer, or mixtures thereof;
wherein the solvent, the polar modifier, the conjugated diene monomer and the monovinyl aromatic monomers comprise a total reaction mixture, wherein the amount of the polar modifier is less than 5 wt % of the total reaction mixture,
wherein the peak molecular weight of the linear triblock copolymer is at least about 1.5 times the peak molecular weight of the counter tapered diblock A-[A/B] copolymer,
wherein the peak molecular weight of the multiarm coupled block copolymer is at least about 2.5 times the peak molecular weight of the counter tapered diblock A-[A/B] copolymer, and
wherein the ratio of the counter tapered diblock A-[A/B] copolymer to the block copolymer is from about 1:5 to about 5:1 in the counter tapered thermoplastic elastomer composition.

9. A process according to claim 8, wherein said counter tapered thermoplastic elastomer composition is presented in the form of a bale, free-flowing pellets, powder, emulsion latex, or encapsulated pellets.

10. A bituminous composition comprising:
at least one bitumen;
at least one additive selected from the group consisting of plasticizers; fillers; crosslinking agents; flow resins; tackifying resins; processing aids; antiozonants; and antioxidants; and
at least one counter tapered thermoplastic elastomer composition according to claim 1, wherein the bituminous composition includes from about 0.5 to about 25 percent weight of said counter tapered thermoplastic elastomer composition.

11. A bituminous composition according to claim 10, useful for road paving applications, wherein the bituminous composition includes from about 0.5 to about 8 percent weight of said counter tapered thermoplastic elastomer composition.

12. A bituminous composition according to claim 11, further comprising at least one emulsifying agent, wherein said bituminous composition is emulsified in water.

13. A bituminous composition according to claim 10, useful for roofing, shingles and waterproofing membrane applications, wherein the bituminous composition includes from about 3 to about 25 percent weight of said counter tapered thermoplastic elastomer composition.

14. An adhesive composition, comprising:
at least one additive selected from the group consisting of tackifying resins; plasticizers; solvent; coupling agents; crosslinking agents; photoinitiators; and antioxidants; and
at least one counter tapered thermoplastic elastomer composition according to claim 1, wherein the adhesive composition includes from about 0.5 to about 50 percent weight of said counter tapered thermoplastic elastomer composition.

15. A sealant composition, comprising:
at least one additive selected from the group consisting of tackifying resins; plasticizers; fillers; coupling agents; processing aids; and antioxidants; and
at least one counter tapered thermoplastic elastomer composition according to claim 1, wherein the sealant composition includes from about 0.5 to about 50 percent weight of said counter tapered thermoplastic elastomer composition.

16. The composition of claim 1, wherein the counter tapered thermoplastic elastomer composition includes the linear triblock copolymers, wherein the linear triblock copolymers have a midblock portion, and wherein the cumulative ratio of conjugated diene monomer units to monovinyl aromatic monomer units in the midblock portion is 2 to 30 mol/mol.

17. The composition of claim 16, wherein the cumulative ratio of conjugated diene monomer units to monovinyl aromatic monomer units in the midblock portion is at least 5.

18. A process for making a counter tapered thermoplastic elastomer composition, comprising:
loading a solvent into a reactor and heating the solvent to an initial reaction temperature (Ti);
adding a polar modifier into the reactor;
adding a first amount of a monovinyl aromatic monomer to the reactor, wherein the first amount of monovinyl aromatic monomer is between 15 and 20 wt % of a total monomer mixture;
adding an initiator into the reactor;
allowing a reaction to proceed and thereby forming a monovinyl aromatic homopolymer block A, wherein the peak average molecular weight Mp of block A is between 5 to 45 kg/mol;
adding a second amount of the or a monovinyl aromatic monomer into the reactor, wherein the second amount of monovinyl aromatic monomer is between 2 and 30 wt % of the total monomer mixture;
dosing a conjugated diene monomer B into the reactor without an initial addition of a conjugated diene monomer followed by a wait time, wherein the total amount of the conjugated diene monomer dosed is more than 50 wt % of the total monomer mixture,
wherein the time in which the conjugated diene monomer is dosed is less than 1 hour; and
allowing a reaction to proceed and thereby forming a counter tapered copolymer block [A/B] and obtaining a living counter tapered diblock A-[A/B] copolymer in a single reactor.

19. The process of claim 18, further comprising:
adding a coupling agent to the reactor to couple a portion of the living counter tapered diblock A-[A/B] copolymer to form counter tapered thermoplastic elastomers,
wherein the ratio of uncoupled linear diblock A-[A/B] to coupled radial (A-[A/B])n-X counter tapered thermoplastic elastomer is between 0.1 and 10.0,
wherein the weight average molecular weight Mw of the counter tapered thermoplastic elastomers is between 30 and 1,000 kg/mol, and
wherein the [A/B]-X-[B/A] midblock formed after coupling has a center region with a maximum ratio of butadiene units to styrene units of at least 2.5.

20. The process of claim 19, wherein the total monovinyl aromatic monomer content of the counter tapered thermoplastic elastomers is between 10 and 55 wt %.

21. A counter tapered thermoplastic elastomer composition, comprising:
a counter tapered diblock A-[A/B] copolymer comprising at least one monovinyl aromatic monomer A and at least one conjugated diene monomer B, wherein counter tapered means that the ratio of B to A in the A/B block is lower proximal to the A block relative to the ratio of B to A distal to the A block; and
a block copolymer made from the counter tapered diblock A-[A/B] copolymer with a coupling agent and/or with a multifunctional initiator, wherein the block copolymer comprises at least two of the counter tapered diblock A-[A/B] copolymers.

22. The composition of claim 21, wherein the composition includes a triblock copolymer formed by partially coupling the counter tapered diblock A-[A/B] copolymer, wherein the triblock copolymer has the general configuration A-[A/B]-X-[B/A]-A where X is the residue of a coupling agent, wherein the triblock copolymer has end blocks that are essentially homopolymers of A and a midblock between and bound directly to the end blocks that has the general configuration of -[A/B]-X-[B/A]-, wherein the midblock has a central region between opposing end regions, wherein the central region has a higher cumulative ratio of B to A than the end regions, and wherein the vinyl content is higher proximal to the A block relative to the vinyl content distal to the A block.

23. The composition of claim 22, wherein the counter tapered diblock A-[A/B] copolymer has a vinyl content of at least 15 weight percent based on the amount of conjugated diene units in the diblock copolymer, and wherein the central region has a lower vinyl content than the end regions.

24. A counter tapered diblock copolymer composition, comprising:
units of at least one monovinyl aromatic monomer A polymerized with units of at least one conjugated diene monomer B to form the structure A-[A/B], wherein the A block comprises a homopolymer of the monovinyl aromatic monomer units, wherein the [A/B] block is a copolymer of the monovinyl aromatic monomer units and the conjugated diene monomer units, wherein the [AB] block is counter tapered such that the ratio of B to A is lower proximal to the A block relative to the ratio of B to A distal to the A block, and wherein the counter tapered diblock A-[A/B] copolymer has a vinyl content of at least 15 weight percent based on the amount of conjugated diene units in the diblock copolymer.

25. The composition of claim 24, wherein the vinyl content is higher proximal to the A block relative to the vinyl content distal to the A block.

26. A counter tapered thermoplastic elastomer (CTTE) composition, comprising:
units of at least one monovinyl aromatic monomer A and units of at least one conjugated diene monomer B and having a linear structure (A-[A/B])-X-([B/A]-A) and/or a coupled radial and/or multiarm structure (A-[A/B]) n-X, wherein X is the residue of a coupling agent, wherein n is an integer from 2 to about 30,
wherein the CTTE composition has outer blocks and/or end blocks A that are a polymer of the monovinyl aromatic monomer units A,
wherein the CTTE composition has a midblock that is a copolymer of the monovinyl aromatic monomer units A and the conjugated diene monomer units B, wherein the midblock has a center region between terminal regions, and wherein the B/A ratio is higher and the vinyl content is lower in the center region than in the terminal regions.

27. A composition, comprising a mixture of the counter tapered diblock copolymer composition of claim 25 with the CTTE composition of claim 26.

28. A counter tapered thermoplastic elastomer (CTTE) composition, comprising units of at least one monovinyl aromatic monomer A and units of at least one conjugated diene monomer B and having a structure X-([A/B]-A) and/or a linear structure (A-[B/A])-X-([A/B]-A) and/or a coupled radial and/or multiarm structure X-([A/B]-A)n, wherein X is the residue of a monofunctional and/or a multifunctional initiator, wherein n is an integer from 1 to about 30,
wherein the CTTE composition has outer blocks and/or end blocks A that are a polymer of the monovinyl aromatic monomer units A,
wherein the CTTE composition has a midblock that is a copolymer of the monovinyl aromatic monomer units A and the conjugated diene monomer units B, wherein the midblock has a center region between terminal regions, and wherein the B/A ratio is lower and the vinyl content is higher in the center region than in the terminal regions.

29. A counter tapered thermoplastic elastomer (CTTE) composition, comprising:
a counter tapered diblock A-[A/B] copolymer comprising at least one monovinyl aromatic monomer A and at least one conjugated diene monomer B, wherein the [A/B] block is counter tapered such that the ratio of B to A is lower proximal to the A block relative to the ratio of B to A distal to the A block, and wherein the counter tapered diblock A-[A/B] copolymer has a vinyl content of at least 15 weight percent based on the amount of conjugated diene units in the diblock copolymer; and
a block copolymer made by partially coupling the counter tapered diblock A-[A/B] copolymer with a coupling agent, wherein the block copolymer has a linear structure (A-[A/B])-X-([B/A]-A) and/or a coupled radial and/or multiarm structure (A-[A/B])n-X, wherein X is the residue of the coupling agent, wherein n is an integer from 2 to about 30,
wherein the CTTE composition has outer blocks and/or end blocks A that are a polymer of the monovinyl aromatic monomer units A,
wherein the CTTE composition has a midblock that is a copolymer of the monovinyl aromatic monomer units A and the conjugated diene monomer units B, wherein the midblock has a center region between terminal regions, and wherein the B/A ratio is higher and the vinyl content is lower in the center region than in the terminal regions.

30. A bituminous composition, comprising:
at least one bitumen;
at least one additive selected from the group consisting of: plasticizers; fillers; crosslinking agents; flow resins; tackifying resins; processing aids; antiozonants; and antioxidants; and
the CTTE composition of claim 29, wherein the bituminous composition includes from about 0.5 to about 25 percent weight of the CTTE composition.

31. The bituminous composition of claim 30, further comprising at least one emulsifying agent, wherein the bituminous composition is emulsified in water.

32. The bituminous composition of claim 30, further comprising a commercially-available polymer.

33. An adhesive composition, comprising:
at least one additive selected from the group consisting of: tackifying resins; plasticizers; solvent; coupling agents; crosslinking agents; photoinitiators; and antioxidants; and
the CTTE composition of claim 29, wherein the adhesive composition includes from about 0.5 to about 50 percent weight of the CTTE composition.

34. The adhesive composition of claim 33, further comprising a commercially-available polymer.

35. A sealant composition, comprising:
at least one additive selected from the group consisting of: tackifying resins; plasticizers; fillers; coupling agents; processing aids; and antioxidants; and
the CTTE composition of claim 29, wherein the sealant composition includes from about 0.5 to about 50 percent weight of the CTTE composition.

36. The sealant composition of claim 35, further comprising a commercially-available polymer.

37. A plastic composition, comprising:
a polymeric composition; and
the CTTE composition of claim 29, wherein the CTTE composition is mixed into the polymeric composition.

38. The plastic composition of claim 37, further comprising a commercially-available polymer.

39. A composition, comprising: the CTTE composition of claim 29; and a bitumen, an adhesive, a sealant or a polymeric composition, wherein the conjugated diene units in the CTTE composition are selectively, partially or fully hydrogenated.

40. The composition of claim 29, wherein the total monovinyl aromatic monomer content of the composition is between 10 and 40 wt %, and wherein the total conjugated diene monomer content of the composition is between 60 and 90 wt %.

41. The composition of claim 29, wherein the CTTE composition includes a triblock copolymer formed by partially coupling the counter tapered diblock A-[A/B] copolymer, wherein the triblock copolymer has the general configuration A-[A/B])-X-[B/A]-A where X is the residue of a coupling agent, wherein the triblock copolymer has end blocks that are essentially homopolymers of A and a midblock between and bound directly to the end blocks that has the general configuration of -[A/B])-X-[B/A]-, wherein the midblock has a central region between opposing end regions, wherein the central region has a higher cumulative ratio of B to A than the end regions, wherein midblock of the composition comprises between 2 and 20 wt % monovinyl aromatic monomer and between 80 to 98 wt % conjugated diene monomer.

42. The composition of claim 41, wherein the central region has a lower vinyl content than the end regions.

43. A polymer-modified asphalt (PMA) composition, comprising:
a bitumen; and
the counter tapered thermoplastic elastomer composition of claim 21.

44. The PMA composition of claim 43, further comprising a commercially-available polymer.

45. The PMA composition of claim 43, wherein the PMA composition has at least one of the following properties:
  a) a maximum application temperature of 50 to 100° C., measured as the temperature at which the Rutting Factor or Dynamic Shear Stiffness (G*/sin δ) takes a value of 1.0 KPa (measured as per AASHTO TP5);
  b) TRBSP of 40 to 110° C. measured as per ASTM D36; and
  c) asphalt penetration at 25° C. of 30 to 100 dmm measured as per ASTM D5.

46. The PMA composition of claim 45, wherein the PMA composition has a dynamic viscosity at 135° C. of about 500 to 3,000 cP measured as per ASTM D4402.

47. The PMA composition of claim 45, wherein the PMA composition has a dynamic viscosity at 190° C. of about 1,000 to 6,000 cP measured as per ASTM D4402.

48. A polymer-modified asphalt emulsion (PME) composition, comprising: the PMA composition of claim 43; and an aqueous emulsifier solution, wherein the PME composition has a Saybolt Furol Viscosity at 50° C. of about 56 to about 64 Saybolt Furol Seconds (SFS).

49. The PME composition of claim 48, wherein the PME composition has a Saybolt Furol Viscosity at 50° C. of about 62 SFS.

50. A polymer-modified asphalt emulsion residual (PMA residual) composition, comprising: the PMA composition of claim 43 after an aqueous emulsifier solution is added to the PMA composition of claim 43 to form a polymer-modified asphalt emulsion (PME) composition and after water is removed from the PME composition to form the PMA residual composition, wherein the PMA residual composition has an elastic recovery at 25° C. by ductilometer of about 41 to about 51%.

51. The PMA residual composition of claim 50, wherein the PMA residual composition has an elastic recovery at 10° C. of about 55%.

52. An asphalt composition, comprising:
an asphalt;
at least one additive selected from the group consisting of: plasticizers, fillers, crosslinking agents, flow resins, tackifying resins, processing aids, antiozonants, and antioxidants; and
the counter tapered thermoplastic elastomer (CTTE) composition of claim 21, wherein the asphalt composition includes from about 0.5 to about 25 percent weight of the CTTE composition, wherein the asphalt composition has at least one of the following properties:
  a) a maximum application temperature of 50 to 100° C., measured as the temperature at which the Rutting Factor or Dynamic Shear Stiffness (G*/sin δ) takes a value of 1.0 KPa (measured as per AASHTO TP5);
  b) TRBSP of 40 to 110° C. measured as per ASTM D36;
  c) asphalt penetration at 25° C. of 30 to 100 dmm measured as per ASTM D5;
  d) a dynamic viscosity at 135° C. of about 500 to 3000 cP measured as per ASTM D4402;
  e) a dynamic viscosity at 190° C. of about 1,000 to 6,000 cP measured as per ASTM D4402;
  f) a Brookfield viscosity at 135° C. of 1388 to 1989 cP,
  g) an elastic recovery at 25° C. by Torsion as measured according to AASHTO-TF31R of 28 to 39%;
  h) an elastic recovery at 25° C. by ductilometer of 50 to 71%;
  j) an average adhesive strength of about 3646 kg;
  k) a Brookfield viscosity at 190° C. of 2510 to 3975 cP;
  l) an R&B Softening Point Temperature of between 92 to 104° C., and a BDA Cold Bending Temperature of between −14 to −10° C.

53. A process for making a polymer-modified asphalt (PMA) composition, comprising:
heating an asphalt to soften the asphalt, wherein the asphalt is agitated while being heated; and
adding and dispersing the counter tapered thermoplastic elastomer composition of claim 21 in the asphalt, thereby forming the PMA composition.

54. The process of claim 53, wherein the counter tapered thermoplastic elastomer composition is dispersed in the asphalt in less than 240 minutes.

55. The process of claim 53, wherein the PMA composition has a Brookfield viscosity at 135° C. of 1388 to 1989 cP, or (wherein the PMA composition has an elastic recovery at 25° C. by torsion as measured according to AASHTO-TF31R of 28 to 39%, or wherein the asphalt composition has an elastic recovery at 25° C. by ductilometer of 50 to 71%).

56. The process of claim 53, wherein the PMA composition has an average adhesive strength of about 3646 kg.

57. The process of claim 53, wherein the PMA composition has a Brookfield viscosity at 190° C. of 2510 to 3975 cP, wherein the asphalt composition has an R&B Softening Point Temperature of between 92 to 104° C., and wherein the PMA has a BDA cold bending temperature of -14 to −10° C.

58. The process of claim 53, further comprising:
heating water in a vessel;
mixing an emulsifying agent into the water in the vessel;
adding an acid into the vessel, thereby forming an aqueous emulsifier solution;
mixing the aqueous emulsifier solution with the PMA composition of claim 53, thereby forming a polymer modified asphalt emulsion (PME); and
recovering a PMA residual.

59. The process of claim 58, wherein the PME has a Saybolt Furol Viscosity at 50° C. of about 56 to about 64 SFS, and wherein the PMA residual has an elastic recovery at 25° C. by ductilometer of about 41 to about 51%.

60. The process of claim 58, wherein the PME has a Saybolt Furol Viscosity at 50° C. of about 62 SFS, and wherein the PMA residual has an elastic recovery at 10° C. of about 55%.

61. The process of claim 58, wherein the PMA composition of claim 53 is formed at a temperature of about 170° C., and wherein the PMA composition of claim 53 is cooled for less than about 4 hours before mixing with the aqueous emulsifier solution.

62. A method for treating a pavement surface, comprising:
heating an asphalt to soften the asphalt, wherein the asphalt is agitated while being heated;

adding and dispersing the counter tapered thermoplastic elastomer composition of claim 21 in the asphalt, thereby forming a PMA composition;
heating water in a vessel;
mixing an emulsifying agent into the water in the vessel;
adding an acid into the vessel, thereby forming an aqueous emulsifier solution;
mixing the aqueous emulsifier solution with the PMA composition, thereby forming a polymer modified asphalt emulsion (PME);
applying at least one layer of the PME to at least one layer of aggregate on the pavement surface;
depositing a PMA residual by controlling the PME breaking and setting conditions; and
eliminating water from the pavement surface.

63. The method for treating a pavement surface of claim 62, wherein the PMA composition has an average adhesive strength of about 3646 kg; wherein the PME has a Saybolt Furol Viscosity at 50° C. of about 56 to about 64 SFS, and the PMA residual has an elastic recovery at 25° C. by ductilometer of about 41 to about 51%; or wherein the PME has a Saybolt Furol Viscosity at 50° C. of about 62 SFS, and the PMA residual has an elastic recovery at 10° C. of about 55%.

64. The method for treating a pavement surface of claim 62, wherein the PMA composition is formed in the absence of crosslinking agents.

65. A first thermoplastic elastomer composition, comprising:
units of at least one monovinyl aromatic monomer A polymerized with units of at least one conjugated diene monomer B to form a diblock copolymer having the structure A-[A/B], wherein the A block comprises a polymer of the monovinyl aromatic units, wherein the [A/B] block is a copolymer of the monovinyl aromatic monomer units and the conjugated diene monomer units, and wherein the [A/B] block is counter tapered such that after coupling the diblock copolymer, the [A/B] block forms a complete [A/B]-X-[B/A] midblock, wherein the midblock has a cumulative ratio of conjugated diene (CD) monomer to monovinyl aromatic (MVA) monomer, wherein the [A/B]-X-[B/A] midblock has terminal regions that are rich in MVA monomer units (low CD/MVA cumulative ratio) relative to a center region that is rich in CD monomer units (high CD/MVA cumulative ratio).

66. A second thermoplastic elastomer composition, comprising:
the first thermoplastic elastomer composition of claim 65 and (a coupling agent and/or or a multifunctional initiator), wherein the second thermoplastic elastomer composition has a linear structure (A-[A/B])-X-([B/A]-A) and/or a coupled radial and/or multiarm structure (A-[A/B])n-X, and wherein X is the residue of the coupling agent or the multifunctional initiator.

67. A counter tapered thermoplastic elastomer composition, comprising:
a mixture of the first thermoplastic elastomer composition of claim 65 and the second thermoplastic elastomer composition of claim 66.

68. The first thermoplastic elastomer composition of claim 65, wherein the vinyl content is higher proximal to the A block relative to the vinyl content distal to the A block after coupling the diblock copolymer.

69. A second thermoplastic elastomer composition, comprising:
the first thermoplastic elastomer composition of claim 68 and (a coupling agent and/or or a multifunctional initiator), wherein the second thermoplastic elastomer composition has a linear structure (A-[A/B])-X-([B/A]-A) and/or a coupled radial and/or multiarm structure (A-[A/B])n-X, and wherein X is the residue of the coupling agent or the multifunctional initiator.

70. A counter tapered thermoplastic elastomer composition, comprising:
a mixture of the first thermoplastic elastomer composition of claim 68 and the second thermoplastic elastomer composition of claim 69.

* * * * *